US012149959B2

United States Patent
Ma et al.

(10) Patent No.: US 12,149,959 B2
(45) Date of Patent: Nov. 19, 2024

(54) DATA PROCESSING METHOD AND DEVICE IN WIRELESS COMMUNICATION NETWORK

(71) Applicant: Samsung Electronics Co., Ltd., Suwon-si (KR)

(72) Inventors: Xiaoning Ma, Beijing (CN); Yanru Wang, Beijing (CN); Weiwei Wang, Beijing (CN); Hong Wang, Beijing (CN); Lixiang Xu, Beijing (CN); Lisi Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/574,801

(22) Filed: Jan. 13, 2022

(65) Prior Publication Data
US 2022/0225126 A1    Jul. 14, 2022

(30) Foreign Application Priority Data

Jan. 13, 2021  (CN) ......................... 202110044518.5
Jun. 25, 2021  (CN) ......................... 202110710332.9

(51) Int. Cl.
*H04W 24/02*    (2009.01)
(52) U.S. Cl.
CPC .................................. *H04W 24/02* (2013.01)
(58) Field of Classification Search
None
See application file for complete search history.

(56) References Cited

U.S. PATENT DOCUMENTS

| 10,841,853 | B1 | 11/2020 | Yousefi'zadeh et al. |
| 2010/0097991 | A1* | 4/2010 | Morimoto ............... H04W 8/02 370/328 |
| 2010/0149983 | A1* | 6/2010 | Lee ......................... H04L 45/48 370/235 |

FOREIGN PATENT DOCUMENTS

| WO | 2020/064134 A1 | 4/2020 |
| WO | 2020/079678 A1 | 4/2020 |
| WO | 2023/069534 A1 | 4/2023 |

OTHER PUBLICATIONS

ZTE et al., 'Initial Analyse on the Interface Impact with AI-based RAN Architecture', R3-206092, 3GPP TSG RAN WG3 Meeting #110-e, Oct. 23, 2020 sections 2.1-2.3; and figures 1-3, Oct. 23, 2020.
Samsung, 'Discussion on Use Cases for Artificial Intelligence in RAN and Potential Benefits', R3-206042, 3GPP TSG RAN WG3 Meeting #110-e, Oct. 23, 2020 section 2, Oct. 23, 2020.
International Search Report and Written Opinion dated Apr. 27, 2022, issued in International Patent Application No. PCT/KR2022/000621.

(Continued)

*Primary Examiner* — Frantz Bataille
(74) *Attorney, Agent, or Firm* — Jefferson IP Law, LLP

(57) ABSTRACT

The disclosure relates to a pre-5th generation (5G) or 5G communication system to be provided for supporting higher data rates beyond 4th generation (4G) communication system such as long term evolution (LTE). A method for data processing in a wireless communication network is provided. The method includes obtaining, by a first node, data, and generating, by the first node, information for self optimization according to the data.

20 Claims, 23 Drawing Sheets

(56) References Cited

OTHER PUBLICATIONS

3rd Generation Partnership Project; Technical Specification Group Radio Access Network; NG-RAN; Xn application protocol (XnAP) (Release 16), 3GPP TS 38.423 V16.4.0 (Jan. 2021), Jan. 4, 2021, pp. 1-457, XP051999712.
3rd Generation Partnership Project; Technical Specification Group RAN; Evolved Universal Terrestrial Radio Access (E-UTRA) and NR; Study on enhancement for Data Collection for NR and EN-DC (Release 17), 3GPP TR 37.817 V0.1.0 (Jan. 2021), Jan. 4, 2021, pp. 1-8, XP051999634.
Extended European Search Report dated May 21, 2024, issued in European Patent Application No. 22739700.7.

\* cited by examiner

DATA PROCESSING METHOD AND DEVICE IN WIRELESS COMMUNICATION NETWORK

CROSS-REFERENCE TO RELATED APPLICATION(S)

This application is based on and claims priority under 35 U.S.C. § 119(a) of a Chinese patent application number 202110044518.5, filed on Jan. 13, 2021, in the Chinese Intellectual Property Office, and of a Chinese patent application number 202110710332.9, filed on Jun. 25, 2021, in the Chinese Intellectual Property Office, the disclosure of each of which is incorporated by reference herein in its entirety.

BACKGROUND

1. Field

The disclosure relates to wireless communication technology. More particularly, the disclosure relates to a method and device for data processing in a wireless communication network.

2. Description of Related Art

In order to meet an increasing demand for wireless data communication services since a deployment of 4th generation (4G) communication system, efforts have been made to develop an improved 5th generation (5G) or pre-5G communication system. Therefore, the 5G or pre-5G communication system is also called "beyond 4G network" or "post long term evolution (LTE) system".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

Different entities in wireless communication network can be divided into user equipment (UE), access node, mobility management function entity, session management function entity, data plane function entity and so on according to the tasks they undertake.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for data processing, in particular to a method for data processing in a wireless communication network.

Additional aspects will be set forth in part in the description which follows and, in part, will be apparent from the description, or may be learned by practice of the presented embodiments.

In accordance with an aspect of the disclosure, a method for data processing in a wireless communication network is provided. The method includes a first node obtains data, and the first node generates information for self optimization based on the data.

In accordance with another aspect of the disclosure, a method for data processing in a wireless communication network is provided. The method includes obtaining, by a first node, data, and using, by the first node, a model for data processing to generate information for self-optimization according to the data, wherein the model for data processing may be an artificial intelligence (AI) model.

In accordance with another aspect of the disclosure, a method for data processing in a wireless communication network is provided. The method includes an entity in a wireless communication system, such as an access node, reports its ability to support the deployment of AI model to other entities, and other entities decide whether to install, update or delete the deployed AI model on the entity according to the ability, or whether to obtain the output parameters of the deployed AI model from the entity.

The ability to support the deployment of AI model may be a list of information of the AI model deployed on the node, and/or an indication information.

The indication information is used to indicate whether the node supports the deployment of AI model.

The information of the AI model includes but is not limited to at least one of the following information:
  index/identity of AI model,
  name of AI model,
  purpose of AI model,
  type of AI model, which is used to represent the model
    type of machine learning. This type can include, but is
    not limited to, perceptron, feedforward neural network,
    radial basis network, deep feedforward network, recurrent neural network, long/short-term memory network,
    gated recurrent unit, auto encoder, and variational auto
    encoder, denoising auto encoder, sparse auto encoder,
    Markov chain, Hopfield network, Boltzmann machine,
    restricted Boltzmann machine, deep belief network,
    deep convolutional network, deconvolutional network, deep convolutional inverse graphics network, generative adversarial network, liquid state machine, extreme learning machine, echo state network, deep residual network, Kohonen network, support vector machine, neural turing machine, convolutional neural network, artificial neural network, recurrent neural network, deep neural network, etc., characteristic parameters of AI model.

The purpose of the AI model can be, for example, to predict the load conditions of the node, or a cell on the node, or a beam of a cell on the node, or a network slice on the node and/or a cell on the node, or the public land mobile network (PLMN) on the node and/or a cell on the node, within a certain time. The load condition includes but is not limited to at least one of the following information: wireless resource usage, transport network layer (TNL) resource usage, hardware resource usage, the number of UEs being served, and the number of radio resource control (RRC) connections. Each kind of information included in the load condition may be the maximum value of the information available to be used, and/or the value of the information currently used, and/or the value currently available to be used, and/or the ratio of the value of the information currently used to the maximum value of the information available to be used, and/or the ratio of the value currently available to be used to the maximum value of the information available to be used.

The characteristic parameters of the AI model include but are not limited to at least one of the following information:

the number of layers, which is used to represent the number of layers of the neural network, the number of neurons in each layer, which is used to represent the number of neurons in each layer of the neural network, weight, which is used to represent the weight of a neuron in the neural network.

When configuring the connection between the access node and the core network entity, such as AMF, or other access nodes, the access node can report the ability of the access node to support the deployment AI model to the core network entity or other access nodes using Ng or S1 or Xn or X2 interface message. The Ng message can be at least one of the following messages: NG SETUP REQUEST, RAN CONFIGURATION UPDATE, AMF CONFIGURATION UPDATE ACKNOWLEDGE, and a newly defined Ng message. The S1 message can be at least one of the following messages: S1 SETUP REQUEST, ENB CONFIGURATION UPDATE, MME CONFIGURATION UPDATE ACKNOWLEDGE, and a newly defined S1 message. The Xn message can be at least one of the following messages: XN SETUP REQUEST, XN SETUP RESPONSE, NG-RAN NODE CONFIGURATION UPDATE, NG-RAN NODE CONFIGURATION UPDATE ACKNOWLEDGE, and a newly defined Xn message. The X2 message can be at least one of the following messages: X2 SETUP REQUEST, X2 SETUP RESPONSE, ENB CONFIGURATION UPDATE, ENB CONFIGURATION UPDATE ACKNOWLEDGE, EN-DC X2 SETUP REQUEST, EN-DC X2 SETUP RESPONSE, EN-DC CONFIGURATION UPDATE, EN-DC CONFIGURATION UPDATE ACKNOWLEDGE, a newly defined X2 message.

When the access node is composed of Centralized Unit-Control Plane (CU-CP), Centralized Unit-User Plane (CU-UP) and Distributed Unit (DU), when the connection between CU-CP and CU-UP or between CU-CP and DU is configured, the ability to support the deployment AI model can be exchanged by E1 or F1 interface message between CU-CP and CU-UP or between CU-CP and DU. The E1 message can be at least one of the following messages: GNB-CU-UP E1 SETUP REQUEST, GNB-CU-UP E1 SETUP RESPONSE, GNB-CU-CP E1 SETUP REQUEST, GNB-CU-CP E1 SETUP RESPONSE, GNB-CU-UP CONFIGURATION UPDATE, GNB-CU-UP CONFIGURATION UPDATE ACKNOWLEDGE, GNB-CU-CP CONFIGURATION UPDATE, GNB-CU-CP CONFIGURATION UPDATE ACKNOWLEDGE, a newly defined E1 message. The F1 message can be at least one of the following messages: F1 SETUP REQUEST, F1 SETUP RESPONSE, GNB-DU CONFIGURATION UPDATE, GNB-DU CONFIGURATION UPDATE ACKNOWLEDGE, GNB-CU CONFIGURATION UPDATE, GNB-CU CONFIGURATION UPDATE ACKNOWLEDGE, a newly defined F1 message.

In accordance with another aspect of the disclosure, a method for data processing in a wireless communication network is provided. The method includes an entity in a wireless communication system, such as an access node, obtains permission to collect data of a specific UE, and the entity starts collecting the data of the UE after obtaining the permission to collect the data of the specific UE.

The permission to collect the data of the specific UE includes but is not limited to at least one of the following information: a list of PLMNs that are allowed to collect data of a specific UE, a list of network slices that are allowed to collect data of a specific UE, and a list of identifiers of non-public networks (NPNs) that are allowed to collect data of a specific UE. The permission to collect the data of the specific UE can be stored in a core network entity, such as policy control function (PCF) or Unified Data Manager (UDM) or home subscriber server (HSS).

When the UE is connected to the core network through the access node, the access node can request permission to collect the data of the specific UE to the core network entity, such as Access and Mobility Management function (AMF) or Mobility Management Entity (MME) through Ng or S1 interface message. The Ng message may be at least one of the following messages: RETRIEVE UE INFORMATION, UE CONTEXT RESUME REQUEST, INITIAL UE MESSAGE, UPLINK NAS TRANSPORT, and a newly defined Ng message. The S1 message may be at least one of the following messages: UE CONTEXT MODIFICATION INDICATION, UE CONTEXT RESUME REQUEST, RETRIEVE UE INFORMATION, INITIAL UE MESSAGE, UPLINK NAS TRANSPORT, and a newly defined S1 message.

The core network entity can send the permission to collect the data of the specific UE to the access node through the Ng or S1 interface message. The Ng message can be at least one of the following messages: INITIAL CONTEXT SETUP REQUEST, UE CONTEXT MODIFICATION REQUEST, UE CONTEXT SUSPEND RESPONSE, UE CONTEXT RESUME RESPONSE, and a newly defined ng message. The S1 message can be at least one of the following messages: INITIAL CONTEXT SETUP REQUEST, UE CONTEXT MODIFICATION REQUEST, UE CONTEXT MODIFICATION CONFIRM, UE CONTEXT SUSPEND RESPONSE, UE CONTEXT RESUME RESPONSE, a newly defined S1 message.

The access node determines whether the data of the UE can be collected according to the received permission to collect the data of the specific UE.

When the UE hand over from the source access node to the target access node or when the UE is connecting to the target access node in RRC INACTIVE state, the target access node can request permission to collect data of a specific UE from the core network entity by using the Ng or S1 interface message. The Ng message can be at least one of the following messages: HANDOVER REQUEST ACKNOWLEDGE, PATH SWITCH REQUEST, and a newly defined ng message. The S1 message can be at least one of the following messages: HANDOVER REQUEST ACKNOWLEDGE, PATH SWITCH REQUEST, a newly defined S1 message.

When the UE hands over from the source access node to the target access node or when the UE is connecting to the target access node in RRC INACTIVE state, if the source access node holds the permission to collect the data of the UE, the source access node or core network entity, such as AMF or MME, can send the permission to the target access node through Ng or S1 interface message, the source access node can also send the permission to the target access node through the Xn or X2 interface message. The Ng message can be at least one of the following messages: HANDOVER REQUIRED, HANDOVER REQUEST, PATH SWITCH REQUEST ACKNOWLEDGE, DOWNLINK RAN STATUS TRANSFER, and a newly defined Ng message. The S1 message can be at least one of the following messages: HANDOVER REQUIRED, HANDOVER REQUEST, PATH SWITCH REQUEST ACKNOWLEDGE, a newly defined S1 message. The Xn message can be at least one of the following messages: HANDOVER REQUEST, RETRIEVE UE CONTEXT RESPONSE, and a newly defined Xn message. The X2 message can be at least one of the following messages: HANDOVER REQUEST, RETRIEVE UE CONTEXT RESPONSE, a newly defined x2 message.

The target access node determines whether the data of the UE can be collected according to the received permission to collect the data of the specific UE.

When the UE is configured with dual connectivity, the secondary node can request permission to collect the data of the specific UE from the master node using Xn or X2 interface message. The Xn message can be at least one of the following messages: S-NODE ADDITION REQUEST ACKNOWLEDGE, S-NODE MODIFICATION REQUEST ACKNOWLEDGE, S-NODE MODIFICATION REQUIRED, and a newly defined Xn message. The X2 message can be at least one of the following messages: SGNB ADDITION REQUEST ACKNOWLEDGE, SGNB MODIFICATION REQUEST ACKNOWLEDGE, SGNB MODIFICATION REQUIRED, SENB ADDITION REQUEST ACKNOWLEDGE, SENB MODIFICATION REQUEST ACKNOWLEDGE, SENB MODIFICATION REQUIRED, a newly defined X2 message.

When the UE is configured with dual connectivity, if the master node holds the permission to collect the data of the UE, the master node can send the permission to the secondary node through Xn or X2 interface message. The Xn message can be at least one of the following messages: S-NODE ADDITION REQUEST, S-NODE MODIFICATION REQUEST, S-NODE MODIFICATION CONFIRM, and a newly defined Xn message. The X2 message can be at least one of the following messages: SGNB ADDITION REQUEST, SGNB MODIFICATION REQUEST, SGNB MODIFICATION CONFIRM, SENB ADDITION REQUEST, SENB MODIFICATION REQUEST, SENB MODIFICATION CONFIRM, a newly defined X2 message.

The secondary node determines whether the data of the UE can be collected according to the received permission to collect the data of the specific UE.

When the access node is composed of CU-CP, CU-UP and DU, the CU-CP receives the permission to collect the data of the specific UE from the core network entity or other access nodes. CU-UP or DU can request permission to collect the data of the specific UE from CU-CP through E1 or F1 interface message. The E1 message can be at least one of the following messages: BEARER CONTEXT SETUP RESPONSE, BEARER CONTEXT MODIFICATION RESPONSE, BEARER CONTEXT MODIFICATION REQUIRED, and a newly defined E1 message. The F1 message can be at least one of the following messages: UE CONTEXT SETUP RESPONSE, UE CONTEXT MODIFICATION RESPONSE UE CONTEXT MODIFICATION REQUIRED, and a newly defined F1 message.

CU-CP can send the permission to CU-UP or DU through E1 or F1 interface message in the procedures related to the UE, such as the procedure of CU-CP configuring UE context on CU-CP or DU. The E1 message can be at least one of the following messages: BEARER CONTEXT SETUP REQUEST, BEARER CONTEXT MODIFICATION REQUEST, BEARER CONTEXT MODIFICATION CONFIRM, and a newly defined E1 message. The F1 message can be at least one of the following messages: UE CONTEXT SETUP REQUEST, UE CONTEXT MODIFICATION REQUEST, UE CONTEXT MODIFICATION CONFIRM, and a newly defined F1 message.

The CU-UP or DU determines whether the data of the UE can be collected according to the received permission to collect the data of the specific UE.

When transmitting the list of PLMN which has permission to collect the data of the specific UE, Management Based MDT PLMN List in the above messages can be reused.

In accordance with another aspect of the disclosure, a method for data processing in a wireless communication network is provided. The method includes deploying an AI model to an entity in a wireless communication system, such as an access node, and using the deployed AI model, by the entities in the wireless communication system, to carry out reasonable self optimization according to the output parameters of the AI model, so as to improve the user experience.

The method specifically comprises the following operations:
  entity 1 in the wireless communication system sends AI model deployment related information to entity 2.
  wherein the AI model deployment related information may be at least one of the following information:
  index/identity of AI model,
  name of AI model,
  purpose of AI model,
  one indication information, which is used to identify that this is a complete or partial update to the existing AI model,
  container carrying the AI model,
  model transfer serial number, which is used to identify the model transfer,
  model type, which is used to represent the model type of machine learning. This type can include, but is not limited to, perceptron, feedforward neural network, radial basis network, deep feedforward network, recurrent neural network, long/short-term memory network, gated recurrent unit, auto encoder, and variational auto encoder, denoising auto encoder, sparse auto encoder, Markov chain, Hopfield network, Boltzmann machine, restricted Boltzmann machine, deep belief network, deep convolutional network, deconvolutional network, deep convolutional inverse graphics network, generative adversarial network, liquid state machine, extreme learning machine, echo state network, deep residual network, Kohonen network, support vector machine, neural turing machine, convolutional neural network, artificial neural network, recurrent neural network, deep neural network, etc., characteristic parameters of AI model, training entity information, including but not limited to identity and name of training entity, model download address: used to represent the model download address, including but not limited to at least one of the following information: address and/or port and/or protocol of the download server, URL address.

The characteristic parameters of the AI model include but are not limited to at least one of the following information:

the number of layers, which is used to represent the number of layers of the neural network, the number of neurons in each layer, which is used to represent the number of neurons in each layer of the neural network, weight, which is used to represent the weight of a neuron in the neural network, model input, which is used to represent the type and order of the input parameter of the network. For example, it is represented by n*m bits, each n bits represents a parameter, a total of m parameters, and the input order is the same as the bit representation order. Based on the mapping relationship between n bits and parameters, the parameters and the input order of parameters can be inferred, model output, which is used to represent the output parameter type and order of the network. For example, it is represented by n*m bits, each n bits represents a parameter, a total of m parameters, and the output order is the same as the bit representation order. Based on the mapping relationship between n bits and parameters, the parameters and the output order of parameters can be inferred, preprocessing matrix for preprocessing the collected data for input into the model, post-processing matrix for processing model input parameters for use in the communication network, feedback type, which is used to indicate the feedback type after receiving the network, such as feedback weight, feedback data, feedback updated model, etc.

The entity 1 may be a core network entity, such as AMF or SMF or MME, or an access node, such as NG-RAN node or eNB, or CU-CP of an access node. The entity 2 may be an access node, such as NG-RAN node or eNB, or CU-CP or CU-UP or DU of the access node.

When entity 1 is the core network entity, such as AMF or SMF or MME, and entity 2 is an access node, such as NG-RAN node or eNB, or CU-CP of the access node, entity 1 can send the AI model deployment related information to entity 2 through Ng or S1 interface message. The Ng interface message includes but is not limited to at least one of the following messages: NG SETUP RESPONSE, RAN CONFIGURATION UPDATE ACKNOWLEDGE, AMF CONFIGURATION UPDATE, and a newly defined Ng message. The S1 interface message includes but is not limited to at least one of the following messages: S1 SETUP RESPONSE, ENB CONFIGURATION UPDATE ACKNOWLEDGE, MME CONFIGURATION UPDATE, and a newly defined S1 message.

When both entity 1 and entity 2 are access nodes, such as NG-RAN node or eNB, or CU-CP of the access node, entity 1 can send the AI model deployment related information to entity 2 through Xn or X2 interface message. The Xn interface message includes but is not limited to at least one of the following messages: XN SETUP REQUEST, XN SETUP RESPONSE, NG-RAN NODE CONFIGURATION UPDATE, NG-RAN NODE CONFIGURATION UPDATE ACKNOWLEDGE, and a newly defined Xn message. The X2 interface message includes but is not limited to at least one of the following messages: X2 SETUP REQUEST, X2 SETUP RESPONSE, ENB CONFIGURATION UPDATE, ENB CONFIGURATION UPDATE ACKNOWLEDGE, EN-DC X2 SETUP REQUEST, EN-DC X2 SETUP RESPONSE, EN-DC CONFIGURATION UPDATE, EN-DC CONFIGURATION UPDATE ACKNOWLEDGE, and a newly defined x2 message.

When entity 1 is the CU-CP of the access node and entity 2 is the CU-UP or DU of the access node, entity 1 can send the AI model deployment related information to entity 2 through F1 or E1 interface message. The F1 interface message includes but is not limited to at least one of the following messages: F1 SETUP RESPONSE, GNB-DU CONFIGURATION UPDATE ACKNOWLEDGE, GNB-CU CONFIGURATION UPDATE, and a newly defined F1 message. The E1 interface message includes but is not limited to at least one of the following messages: GNB-CU-UP E1 SETUP RESPONSE, GNB-CU-CP E1 SETUP REQUEST, GNB-CU-UP CONFIGURATION UPDATE ACKNOWLEDGE, GNB-CU-CP CONFIGURATION UPDATE, and a newly defined E1 message.

In accordance with another aspect of the disclosure, a method for data processing in a wireless communication network is provided. The method includes the access node selects an appropriate time to deactivate one or more cells in order to save energy, wherein before deactivating these cells, the access node needs to hand over the UE in the cell to other cells. Specifically, the access node selects an appropriate time to activate one or more cells, then collects data at the access node and other access nodes.

The data to be collected includes two types of information:

The first type of information includes but is not limited to one or more of the following information:

cell state related information of the cell which is requested to report before self optimization, measurement related information of the UE served by the cell which is requested to report before self optimization.

Wherein the cell which is requested to report may be one of the candidate cells that may be selected as a cell which performs self optimization.

The cell state related information may be one or more of the following information:

The cell information of the cell and the cell information of the neighbor cells. The cell information includes but is not limited to at least one of the following information: cell Identifier (ID) (Cell Global Identifier (CGI) and/or Physical Cell Identifier (PCI)), PLMN list supported by the cell, network slice list supported by the cell, frequency band list supported by the cell, beam list supported by the cell, The node identifier of the node where the cell is located. For example, when the node is an access node or CU-CP of an access node, the node identifier includes but is not limited to Global NG-RAN Node ID, or Global gNB ID, or Global ng-eNB ID, or Global eNB ID, or Global en-gNB ID. When the node is CU-UP of an access node, the node identifier includes but is not limited to gNB-CU-UP ID. When the node is DU of the access node, the node identifier includes but is not limited to gNB-DU ID, The load condition of, the node where the cell is located, and/or the cell, and/or a beam of the cell, and/or a network slice on the node and/or the cell, and/or a PLMN on the node and/or the cell, and the load condition of, the node where the neighbor cell is located, and/or the neighbor cell, and/or a beam of the neighbor cell, and/or a network slice on the node where the neighbor cell is located and/or the neighbor cell, and/or a PLMN on the node where the neighbor cell is located and/or the neighbor cell, which are the same as the above, The predicted value of the load condition, of the node where the cell is located, and/or the cell, and/or a beam of the cell, and/or a network slice on the node where the cell is located and/or the cell, and/or a PLMN on the node where the cell is located and/or the cell, optionally, including the reliability (for example, the probability of reliability expressed in percentage), and the predicted value of the load condition, of the node where the neighbor cell is located, and/or the neighbor cell, and/or a beam of the neighbor cell, and/or a network slice on the node where the neighbor cell is located and/or the neighbor cell, and/or a PLMN on the node where the neighbor cell is located and/or the neighbor cell, optionally, including the reliability (for example, the probability of reliability is expressed in percentage), The energy usage of the node where the cell is located and/or the cell, and the energy usage of the node where the neighbor cell is located and/or the neighbor cell. The energy usage includes but is not limited to at least one of the following information: maximum power (unit: Watt), minimum power, average power, energy consumption (unit: KWH), uplink and downlink data volume, the ratio of uplink and downlink data volume to energy consumption, The predicted value of, the energy usage of the node where the cell is located and/or the cell, and the energy usage of the node where the neighbor cell is located and/or the neighbor cell, optionally, including reliability.

The measurement related information of the UE may be one or more of the following information:
 measurement report of UE,
 quality of service related information of UE,
 quality of experience (QoE) report of UE,
 predicted value of quality of service related information of UE and/or QoE report,
 reliability of any of the predicted values in the above information.

The quality of service related information includes but is not limited to at least one of the following information:
 uplink and downlink rate of UE and/or uplink and downlink rate of one or a group of DRBs of UE,
 uplink and downlink packet loss rate of UE and/or uplink and downlink packet loss rate of one or a group of DRBs of UE,
 uplink and downlink transmission delay of UE and/or uplink and downlink transmission delay of one or a group of DRBs of UE.

The second type of information includes but is not limited to one or more of the following information:
 cell state related information of the cell which is requested to report after self optimization,
 measurement related information of UE handed over to other cells after self optimization,
 information reported by the UE generated in the neighbor cell after self optimization, including but not limited to at least one of the following information: radio link failure (RLF) report, connection establishment failure (CEF) report, RACH report and Successful handover (HO) report,
 self optimization related information.

The self optimization related information includes but is not limited to one or more of the following information:
 cell state related information of the cell performing self optimization,
 UE identifier of the relevant UE, which may be allocated before and/or after self optimization,
 cell state related information of the target cell of the relevant UE,
 beam identifier of the relevant UE, including but not limited to the signal/physical broadcast channel block (SSB) index, wherein the beam can be the first and/or last beam configured by the node currently serving, or all or part of the configured beams, and the beam can be configured before and/or after self optimization,
 self optimizing events.

In this method, the self optimization refers to deactivating the cell, optionally including the related UE performing handover to the target cell. The related UE is the UE being served by the cell. The self optimization event refers to deactivating the cell.

The method comprises the following operations:

The access node collects the first type of information.

The access node requests neighbor access nodes to report load condition and/or energy usage condition. If the neighbor access node has the ability to support the deployment of AI model, the access node can request the neighbor access node to report the predicted value of, load condition and/or energy usage condition, optionally including reliability.

The access node can request the neighbor access node to report the load condition, and/or the energy usage condition, and/or the predicted value of the load condition, and/or the predicted value of the energy usage condition through the Xn or X2 interface message, optionally including the reliability. The Xn message may be RESOURCE STATUS REQUEST and/or a newly defined Xn message. The X2 message may be RESOURCE STATUS REQUEST, and/or EN-DC RESOURCE STATUS REQUEST, and/or a newly defined X2 message. The neighbor access node can report the load condition, and/or energy usage condition, and/or the predicted value of the load condition, and/or the predicted value of the energy usage condition through the Xn or X2 interface message, optionally including the reliability. The Xn message may be RESOURCE STATUS UPDATE and/or a newly defined Xn message. The X2 message may be RESOURCE STATUS UPDATE, and/or EN-DC RESOURCE STATUS UPDATE, and/or a newly defined X2 message.

The access node collects the load condition and/or energy usage condition of the node. The access node also collects the predicted values of the load condition and/or energy usage condition of the node, optionally including reliability, for example, if the node has the ability to support the deployment of AI model.

If the access node is composed of CU-CP, CU-UP and DU, the CU-CP of the access node request CU-UP and/or DU to report load condition and/or energy usage condition. The CU-CP of the access node also request the CU-UP and/or DU to report the predicted values of load condition and/or energy usage condition, optionally including reliability, for example, if the CU-UP and/or DU have the ability to support the deployment of AI model.

The CU-CP can request the CU-UP and/or DU to report the load condition, and/or energy usage condition, and/or the predicted value of the load condition, and/or the predicted value of the energy usage condition, optionally including the reliability, through the F1 or E1 interface message. The F1 interface message can be RESOURCE STATUS REQUEST, and/or a newly defined F1 message. The E1 interface message can be RESOURCE STATUS REQUEST and/or a newly defined E1 message. The DU can report the load condition, and/or energy usage condition, and/or the predicted value of the load condition, and/or the predicted value of the energy usage condition through the F1 interface message. The F1 interface message can be RESOURCE STATUS UPDATE and/or a newly defined F1 message. CU-UP can report the load condition, and/or energy usage condition, and/or the predicted value of load condition, and/or the predicted value of energy usage condition through E1 interface message, optionally including reliability. The E1 interface message can be RESOURCE STATUS UPDATE and/or a newly defined E1 message.

The access node collects other data to be collected in the first type of information.

The load condition and/or energy usage condition of the access node can be used to select the most suitable cell for deactivation. The load condition and/or energy usage condition of neighbor access nodes can be used to select an appropriate target access node for the UE being served by the selected cell for deactivation.

According to the collected data, the access node selects a cell for deactivation. At the same time, the access node selects an appropriate target access node for the UE being served by the selected cell for deactivation.

The access node performs a handover procedure for the UE being served by the selected cell for deactivation, and then performs deactivation of the selected cell.

After deactivating the selected cell, the access node collects the second type of information.

The access node requests neighbor access nodes to report load condition and/or energy usage condition.

The access node collects the load condition and/or energy usage condition of the node.

The access node requests the neighbor access node to report or stop reporting the requested data through Xn or X2 interface message. The reporting method can be periodic or aperiodic. If it is periodic, the access node specifies the length of the period of the report and/or the number of reports, if it is aperiodic, the access node specifies a time period during which the data is generated.

The requested data refers to at least one of the second type of information in the above data to be collected, for example, the measurement report of the UE handed over to other cells, and/or the QoS report and/or QoE report of the UE handed over to other cells, and/or the information reported by the UE generated by the neighbor cell.

The Xn message may be NG-RAN NODE CONFIGURATION UPDATE and/or a newly defined Xn message. The X2 message may be ENB CONFIGURATION UPDATE and/or a newly defined Xn message.

The access node can also request the target access node of the UE to report the requested data through the handover procedure related message, for example, the measurement report of the UE handed over to other cells, and/or the QoS report and/or QoE report of the UE handed over to other cells. The reporting method can be periodic or aperiodic. If it is periodic, the access node specifies the length of the period of the report and/or the number of reports, if it is aperiodic, the access node specifies a time period during which the data is generated.

The handover procedure related message may be Xn or X2 or Ng or S1 interface message. The Xn message may be HANDOVER REQUEST, and/or a newly defined Xn message. The X2 message may be HANDOVER REQUEST, and/or newly defined X2 message. The Ng message may be HANDOVER REQUIRED, and/or HANDOVER REQUEST, and/or a newly defined Ng message. The S1 message may be HANDOVER REQUIRED, and/or HANDOVER REQUEST, and/or a newly defined S1 message.

The access node requested to report the data reports the data requested to be reported to the access node through an Xn or X2 or Ng or S1 interface message. The Xn interface message can be at least one of the following messages: ACCESS AND MOBILITY INDICATION, FAILURE INDICATION, HANDOVER REPORT and a newly defined Xn message. The X2 interface message can be at least one of the following messages: RLF INDICATION, HANDOVER REPORT, a newly defined X2 message. The Ng or S1 interface message may be one or more newly defined Ng or S1 messages.

For the Xn or X2 or Ng or S1 interface message, necessary information should be included to enable the cell for deactivation to identify that the message is related to the cell for deactivation. Taking the Xn interface message as an example, it includes at least one of the following information: the cell ID of the current serving cell of the UE, the cell ID of the cell for deactivation, the UE identifier, the measurement report of the UE, the QoS report and/or QoE report of the UE, and the information reported by the UE generated in the coverage area and neighbor areas of the cell for deactivation. In order for the cell for deactivation and the cell requested to report to identify that the information reported by the UE occurs in the coverage area and neighbor areas of the cell for deactivation, the information reported by the UE should include location information, for example, location information should be added to RACH report and Successful HO report. In order for the cell for deactivation and the cell required to report to identify that the events in the information reported by the UE occur after the deactivation of cell is executed, the information reported by the UE should include timestamp information, or example, timestamp information should be added to RLF report, CEF report, RACH Report and Successful HO report. The cell ID may be PCI and/or CGI. The UE identifier includes but is not limited to at least one of the following information: NG-RAN node UE XnAP ID of the UE in the cell for deactivation, NG-RAN node UE XnAP ID of the UE in the current serving cell, Cell-Radio Network Temporary Identifier (C-RNTI) of the UE in the cell for deactivation, C-RNTI of the UE in the current serving cell, RAN UE ID. The location information may use, for example, LocationInfo information defined in 3 GPP specification 38.331. The X2 or Ng or S1 interface message is similar to the Xn interface message.

The measurement report of the UE handed over to other cells and/or the information reported by the UE generated by the neighbor cell can be used to determine whether the wireless signal coverage problem occurs after the access node deactivates the selected cell. The QoS report and/or QoE report of the UE handed over to other cells can be used to determine whether to reduce the quality of service of the affected UE. The load condition of neighbor access nodes and the load condition of this node can be used to determine whether the load of other cells is too high. The energy usage condition of neighbor access nodes and the energy usage condition of this node can be used to determine whether the desired energy-saving effect is achieved.

The above information can be used by the access node to train the AI model. The AI model may include, but is not limited to, at least one of the following models: an AI model for selecting a cell for deactivation, an AI model for selecting a target access node for handover of a specific UE, an AI model for predicting load conditions, and an AI model for predicting energy usage.

The AI model is deployed to the access node.

If the access node is composed of CU-CP, CU-UP and DU, the AI model is deployed to CU-CP. The AI model can also be deployed by CU-CP to DU through F1 interface message, and/or CU-CP to CU-UP through E1 interface message.

CU-CP sends the information of AI model to DU through F1 interface message. The F1 message can be at least one of the following messages: F1 SETUP RESPONSE, GNB-DU CONFIGURATION UPDATE ACKNOWLEDGE, GNB-CU CONFIGURATION UPDATE, a newly defined F1 message.

CU-CP sends the information of AI model to CU-UP through E1 interface message. The E1 message can be at least one of the following messages: GNB-CU-UP E1 SETUP RESPONSE, GNB-CU-CP E1 SETUP REQUEST, GNB-CU-UP CONFIGURATION UPDATE ACKNOWLEDGE, GNB-CU-CP CONFIGURATION UPDATE, a newly defined E1 message.

The information of the AI model includes but is not limited to at least one of the following information: the index/identity of the AI model, the name of the AI model, the purpose of the AI model, the indication information is used to identify that this is a complete or partial update of the existing AI model, and the container carrying the AI model.

The access node collects the first type of information in the data that the access node needs to collect. The AI model uses this information to select the cell for deactivation, and selects the target access node for the UE being served in the cell for deactivation.

The access node performs a handover procedure on the UE being served by the selected cell for deactivation, and then performs deactivation of the selected cell, so as to reduce the energy usage of the network and achieve energy-saving effect.

Through the above process, it can be identified that whether the wireless signal coverage problem occurs, whether the quality of service of the affected UE is reduced, whether the load of other cells is too high, and whether the desired energy-saving effect is achieved after deactivating these cells, so as to carry out reasonable self optimization and improve the user experience.

The above process can be repeated to produce a better AI model and finally achieve better energy-saving effect.

In accordance with another aspect of the disclosure, a method for data processing in a wireless communication network is provided. The method includes when the wireless signal of a UE becomes poor or the access node serving it cannot provide services due to high load, the node performs mobility optimization for the UE, at the same time, the access node selects an appropriate target access node for the UE.

The mobility optimization may be, for example, handing over the UE to other cells or configuring dual connectivity for it, for example, adding or changing SN. If the access node decides to hand over the UE to other access nodes, the target access node is the target access node of the handover, if the access node decides to configure a dual connectivity for the UE, the target access node is SN in the dual connectivity.

Specifically, mobility optimization of the UE includes collecting data at the access node and other access nodes.

The data to be collected includes two types of information:

The first type of information includes but is not limited to one or more of the following information:
cell state related information of the cell which is requested to report before self optimization,
measurement related information of the UE served by the cell which is requested to report before self optimization.
wherein the cell which is requested to report may be one of the candidate cells that may be selected as a cell which performs self optimization.

The second type of information includes but is not limited to one or more of the following information:
measurement related information of UE after self optimization,
information reported by UE after self optimization,
self optimization related information.

In this method, the self optimization refers to performing mobility optimization on the relevant UE, the relevant UE is the UE performing mobility optimization, and the self optimization event refers to the mobility optimization event performed on the relevant UE.

The mobility optimization events include but are not limited to one of the following: handover, SN addition, SN change initiated by MN, SN change initiated by SN.

The method comprises the following operations:

The access node collects the first type of information.

The access node requests neighbor access nodes to report load condition. The access node may request the neighbor access node to report the predicted value of the load condition, optionally including the reliability, for example, if the neighbor access node has the ability to support the deployment of AI model.

The access node can request the neighbor access node to report the load condition and/or the predicted value of the load condition through Xn or X2 interface message, optionally including reliability. The Xn message may be RESOURCE STATUS REQUEST and/or a newly defined Xn message. The X2 message may be RESOURCE STATUS REQUEST, and/or EN-DC RESOURCE STATUS REQUEST, and/or a newly defined X2 message. The neighbor access node can report the load condition and/or the predicted value of the load condition through Xn or X2 interface message, optionally including reliability. The Xn message can be RESOURCE STATUS UPDATE and/or a newly defined Xn message. The X2 message may be RESOURCE STATUS UPDATE, and/or EN-DC RESOURCE STATUS UPDATE, and/or a newly defined X2 message.

The access node collects the load condition of the node. The access node also collects the predicted value of the load condition of the node, optionally including reliability, for example, if the node has the ability to support the deployment of AI model.

If the access node is configured as MN or SN in the dual connectivity scenario, the access node can send the identifier of the beam serving the UE to the other party of the dual connectivity through Xn or X2 interface message. The Xn interface message can be at least one of the following messages: S-NODE ADDITION REQUEST, S-NODE ADDITION REQUEST ACKNOWLEDGE, S-NODE RECONFIGURATION COMPLETE, S-NODE MODIFICATION REQUEST, S-NODE MODIFICATION REQUEST ACKNOWLEDGE, S-NODE MODIFICATION REQUIRED, S-NODE MODIFICATION CONFIRM, S-NODE CHANGE REQUIRED, S-NODE CHANGE CONFIRM, S-NODE RELEASE REQUEST, S-NODE RELEASE REQUEST ACKNOWLEDGE, S-NODE RELEASE REQUIRED, S-NODE RELEASE CONFIRM, a newly defined Xn message. The X2 interface message can be at least one of the following messages: SGNB ADDITION REQUEST, SGNB ADDITION REQUEST ACKNOWLEDGE, SGNB MODIFICATION REQUEST ACKNOWLEDGE, SGNB MODIFICATION REQUIRED, SGNB RELEASE REQUEST ACKNOWLEDGE, SGNB RELEASE REQUIRED, SGNB CHANGE REQUIRED, a newly defined X2 message.

If the access node is composed of CU-CP, CU-UP and DU, the CU-CP of the access node requests CU-UP and/or DU to report the load condition. The access node also requests the CU-UP and/or DU to report the predicted value of load condition, optionally including reliability, for example, if the CU-UP and/or DU have the ability to support the deployment of AI model.

The CU-CP can request the CU-UP and/or DU to report the load condition and/or the predicted value of the load condition through F1 or E1 interface message, optionally including reliability. The F1 interface message can be RESOURCE STATUS REQUEST, and/or a newly defined F1 message. The E1 interface message can be RESOURCE STATUS REQUEST and/or a newly defined E1 message. The DU can report the load condition and/or the predicted value of the load condition through the F1 interface message, optionally including reliability. The F1 interface message can be RESOURCE STATUS UPDATE and/or a newly defined F1 message. CU-UP can report load condition and/or predicted value of load condition through E1 interface message, optionally including reliability. The E1 interface message can be RESOURCE STATUS UPDATE and/or a newly defined E1 message.

DU can report the identifier of the beam serving the UE to the CU-CP through the F1 interface message. The F1 interface message can be at least one of the following messages: UE CONTEXT SETUP RESPONSE, UE CONTEXT RELEASE REQUEST, UE CONTEXT MODIFICATION RESPONSE, UE CONTEXT MODIFICATION REQUIRED, UL RRC MESSAGE TRANSFER, a newly defined F1 message.

The access node collects other data to be collected in the first type of information.

The load condition of the access node can be used to determine whether it is an appropriate time to perform the mobility optimization for a UE. The load condition of neighbor access nodes can be used to select an appropriate target access node or SN for the UE.

According to the collected data, the access node decides to hand over the UE to other access nodes, or configure a dual connectivity for the UE. At the same time, the access node selects an appropriate target access node for the UE.

The access node performs the mobility optimization for the UE, for example, performing handover or configuring dual connectivity.

After performing mobility optimization on the UE, the access node collects the second type of information.

The access node requests the target access node to report the load condition.

The access node collects the load condition of the node.

The access node requests the target access node to report or stop reporting the requested data through Xn or X2 interface message. The reporting method can be periodic or aperiodic. If it is periodic, the access node specifies the length of the period of the report and/or the number of reports, if it is aperiodic, the access node specifies a time period during which the data is generated.

The requested data refers to the data, collected after the access node performs mobility optimization, among the aforementioned data to be collected, including: the measurement report of the UE after mobility optimization, and/or QoS report and/or QoE report of the UE after the mobility optimization, and/or the information reported by the UE after the mobility optimization of the UE The Xn message may be NG-RAN NODE CONFIGURATION UPDATE and/or a newly defined Xn message. The X2 message may be ENB CONFIGURATION UPDATE and/or a newly defined Xn message The access node can also request the target access node to report the requested data, such as UE measurement report, UE QoS report and/or QoE report, through the mobility optimization process, such as handover procedure or SN change or addition procedures. The reporting method can be periodic or aperiodic. If it is periodic, the access node specifies the length of the period of the report and/or the number of reports, if it is aperiodic, the access node specifies a time period during which the data is generated.

The related message of the handover procedure can be Xn or X2 or Ng or S1 interface message. The Xn message may be HANDOVER REQUEST, and/or a newly defined Xn message. The X2 message may be HANDOVER REQUEST, and/or a newly defined X2 message. The Ng message may be HANDOVER REQUIRED, and/or HANDOVER REQUEST, and/or a newly defined Ng message. The S1 message may be HANDOVER REQUIRED and/or HANDOVER REQUEST, and/or a newly defined S1 messages.

The relevant message of the SN change or addition procedures may be an Xn or X2 interface message. The Xn message may be at least one of the following messages: S-NODE ADDITION REQUEST, S-NODE CHANGE REQUIRED, a newly defined Xn message. The X2 message may be at least one of the following messages: SGNB ADDITION REQUEST, SGNB CHANGE REQUIRED, SENB ADDITION REQUEST, a newly defined x2 message.

The access node requested to report the data reports the data requested to be reported to the access node through Xn or X2 or Ng or S1 interface message. The Xn interface message can be at least one of the following messages: ACCESS AND MOBILITY INDICATION, FAILURE INDICATION, HANDOVER REPORT, a newly defined Xn message. The X2 interface message can be at least one of the following messages: RLF INDICATION, HANDOVER REPORT, a newly defined X2 message. The Ng or S1 interface message may be one or more newly defined Ng or S1 messages.

For the Xn or X2 or Ng or S1 interface message, necessary information should be included to enable the cell initiating mobility optimization to identify that the message is related to mobility optimization. Taking the Xn interface message as an example, it includes at least one of the following information: the cell ID of the current serving cell of the UE, the cell ID of the cell initiating mobility optimization, the UE ID, the measurement report of the UE, the QoS report and/or QoE report of the UE, and the information reported by the UE. The cell ID may be PCI and/or CGI. The UE ID may be at least one of the following information:

NG-RAN node UE XnAP ID of the UE before mobility optimization, NG-RAN node UE XnAP ID of the UE in the current serving cell, C-RNTI of the UE in the cell for deactivation, and C-RNTI of the UE in the current serving cell. The X2 or Ng or S1 interface message is similar to the Xn interface message.

The measurement report of the UE and/or the information reported by the UE can be used to determine whether a wireless connection problem occurs after the UE performs mobility optimization. The QoS report and/or QoE report of the UE can be used to determine whether to reduce the service quality of the UE. The load condition of the target access node and the load condition of the node can be used to determine whether the load of other cells is too high. The identifier of the beam serving the UE before and after mobility optimization can be used to select the optimal beam serving the UE after mobility optimization.

The above information can be used by the access node to train the AI model. The AI model may include, but is not limited to, at least one of the following models: an AI model for selecting a UE that needs to perform mobility optimization, an AI model for selecting a target access node for mobility optimization of a specific UE, optionally, including selecting the optimal beam of the specific UE on the target access node for mobility optimization, and an AI model for predicting load condition.

The AI model is deployed to the access node.

If the access node is composed of CU-CP, CU-UP and DU, the AI model is deployed to CU-CP. The AI model can also be deployed by CU-CP to DU through F1 interface message, and/or deployed by CU-CP to CU-UP through E1 interface message.

CU-CP sends the information of AI model to DU through F1 interface message. The F1 message can be at least one of the following messages: F1 SETUP RESPONSE, GNB-DU CONFIGURATION UPDATE ACKNOWLEDGE, GNB-CU CONFIGURATION UPDATE, a newly defined F1 message.

CU-CP sends the information of AI model to CU-UP through E1 interface message. The E1 message can be at least one of the following messages: GNB-CU-UP E1 SETUP RESPONSE, GNB-CU-CP E1 SETUP REQUEST, GNB-CU-UP CONFIGURATION UPDATE ACKNOWLEDGE, GNB-CU-CP CONFIGURATION UPDATE, a newly defined E1 message.

The information of the AI model includes but is not limited to at least one of the following information: the index/identity of the AI model, the name of the AI model, the purpose of the AI model, the indication information is used to identify that this is a complete or partial update of the existing AI model, and the container carrying the AI model.

The access node collects the first type of information in the data that the access node needs to collect. The AI model uses this information to select a UE that needs to perform the mobility optimization event, and/or the mobility optimization event, and/or a target access node in the mobility optimization event for the UE. In addition, the AI model can also select the identifier of the optimal beam on the target access node after the mobility optimization event for the UE. The access node can send this information to the target access node in the mobility optimization related process.

The access node selects a UE and performs a mobility optimization event for the selected UE.

If the mobility optimization event to be performed is handover, the source access node can carry the identifier of the optimal beam on the target access node after handover selected for the UE in the message initiating handover. The message initiating the handover may be an Ng or S1 or Xn or X2 interface message. The Ng interface message may be HANDOVER REQUIRED, and/or HANDOVER REQUEST, and/or a newly defined Ng message. The S1 interface may be HANDOVER REQUIRED, and/or HANDOVER REQUEST, and/or a newly defined S1 message. The Xn interface message may be HANDOVER REQUEST, and/or a newly defined Xn message. The X2 interface message may be HANDOVER REQUEST, and/or a newly defined X2 message.

If the event of the mobility optimization to be performed is an SN addition, and/or an SN change procedure initiated by the MN or SN, the MN or the source SN can carry the identifier of the optimal beam on the target access node after the mobility optimization selected for the UE in the message initiating the mobility optimization event. The message initiating the mobility optimization event may be an Xn or X2 interface message. The Xn message may be S-NODE ADDITION REQUEST, and/or S-NODE CHANGE REQUIRED, and/or a newly defined Xn message. The X2 interface message may be SGNB ADDITION REQUEST, and/or SGNB CHANGE REQUIRED, and/or a newly defined X2 message.

If the target access node is composed of CU-CP, CU-UP and DU, or is composed of CU and DU, the CU-CP or CU of the target access node can send the identifier of the optimal beam selected for the UE to the DU through the F1 interface message. The F1 interface message may be UE CONTEXT SETUP REQUEST, and/or a newly defined F1 message.

The identifier of the beam includes, but is not limited to, an SSB index.

The access node can use the AI model for reasonable self optimization, so as to ensure the user experience and improve the service quality.

Through the above process, it can be identified after the mobility optimization of the UE, whether there is a wireless connection problem, whether the quality of service of the UE is reduced, and whether the load of other cells is too high, so as to perform reasonable self optimization and improve the user experience.

The above process can be repeated to produce better AI model and finally achieve better optimization effect.

In accordance with another aspect of the disclosure, a method for data processing in a wireless communication network is provided. The method includes collecting data, wherein the collected data includes prediction information.

The prediction information may be at least one of the following information:

the predicted value of UE uplink and downlink rate for a period of time in the future, the predicted value of the uplink and downlink rate of a service of UE for a period of time in the future, the uplink and downlink rate of the service includes but is not limited to the uplink and downlink rate of one or more QoS flows or the uplink and downlink rate of one or more E-RAB, the predicted value of the QoE report of a service of the UE for a period of time in the future, the QoE report can include but is not limited to the score obtained according to a MOS scoring method corresponding to the service, the predicted value of the location information of the UE for a period of time in the future, the location information can be at least one of cell ID, Tracking Area identity (TAI) or Tracking Area Code (TAC), longitude and latitude, and area information, the area information includes but is not limited to a group of cell ID or TAI or TAC or longitude and latitude, the predicted value of the state of a specific access node for a period of time in the future, The state of the specific access node includes but is not limited to at least one of the following information: load condition, the number of UEs that the node is serving, the success rate of Protocol Data Unit (PDU) session (PDU Session) establishment, the success rate of handover, and the success rate of SN addition, wherein, the load condition may be the load condition of the specific access node, and/or of a cell of the specific access node, and/or of a beam of the cell, and/or of a network slice of the specific access node and/or a cell or a group of cells on the specific access node, and/or of PLMN of the specific access node and/or a cell or a group of cells on the specific access node, the predicted value of quality of service information of a specific service for a period of time in the future. The service quality information includes but is not limited to at least one of the following information: the average value of QoE report in the specified area, the ratio of UE with similar QoE report to the total number of UEs in the area, and the average value of QoE report in the same network slice, the predicted value of the abnormal event information for a period of time in the future, The abnormal event information includes but is not limited to at least one of the following information: the number of the abnormal event, the level of the abnormal event, the trend of the abnormal event (for example, increasing or decreasing or unchanged or unknown), the area where the abnormal event occurs, and the list of affected UEs, the ratio of the number of affected UEs to the total number of UEs in the area, wherein the area where the abnormal event occurs can be one or a group of TACs or TAIs, or one or a group of cells, and the list of affected UEs is a group of UE identifiers, such as subscription permanent identifier (SUPI), the predicted value of QoS duration information for a period of time in the future, The QoS duration information includes but is not limited to at least one of the following information: a specific area, a specific period of time, reaching or exceeding or below a pre-configured threshold of QoS evaluation score, wherein the QoS evaluation score is the average value of QoS parameters of all UEs in a certain period of time and a certain area, the time length of any of the above predicted values being valid, and/or reliability. The time length can be the start time and end time, or the start time and/or the length of a time period.

The method comprises the following operations:

The access node sends a request to collect data to the mobility management function entity, such as AMF. The request can be sent through the Ng interface message. The Ng interface message may be a newly defined Ng message.

The message carries at least one of the following information:

UE ID, the UE ID is AMF UE NGAP ID and/or RAN UE NGAP ID,
PDU session ID,
network slice ID,
QoS flow ID,
time length, which can be the start time and end time, or the start time and/or the length of a time period,
area information, which can be one or a group of cell lists, or one or a group of TAC or TAI lists,
the type of prediction information requested, including but not limited to at least one of the following information: uplink and downlink rate of UE, uplink and downlink rate of PDU session, uplink and downlink rate of network slice, uplink and downlink rate of QoS flow, QoE report, location information, state of access node, quality of service information, abnormal event information and QoS duration information,
information of whether to report periodically, if it is a periodic report, it also includes the length of the period,
session management container (SM container), which may include at least one of the above information.

The mobility management function entity can obtain the data to be collected and requested by the access node using Network Data Analytics Function (NWDAF) interface according to at least one of the information carried in the received message, for example, the type of prediction information requested, and then send the collected data to the access node as a response message. The response message can be sent through the Ng interface message. The Ng interface message may be a newly defined Ng message.

The message carries at least one of the following information:

UE ID, the UE ID is AMF UE NGAP ID and/or RAN UE NGAP ID,
PDU session ID,
network slice ID,
QoS flow ID,
time length, which can be the start time and end time, or the start time and/or the length of a time period,
area information, which can be one or a group of cell lists, or one or a group of TAC or TAI lists,
the type of prediction information requested, including but not limited to at least one of the following information: uplink and downlink rate of UE, uplink and downlink rate of PDU session, uplink and downlink rate of network slice, uplink and downlink rate of QoS flow, QoE report, location information, state of access node, quality of service information, abnormal event information and QoS duration information,
information of whether to report periodically, if it is a periodic report, it also includes the length of the period,
the requested prediction information.

The mobility management function entity may also send at least one of the information carried in the above message, for example, the SM container, to the session management function entity, for example, SMF. By interpreting the content in the SM container, the session management function entity can use the NWDAF interface to obtain the prediction information requested by the access node, then generate an SM container according to the requested prediction information, and send the SM container to the mobility management function entity. The mobility management function entity sends the SM container to the access node as a response message. The response message can be sent through the Ng interface message. The Ng interface message may be a newly defined Ng message.

The message carries at least one of the following information:

UE ID, the UE ID is AMF UE NGAP ID and/or RAN UE NGAP ID,
PDU session ID,
network slice ID,
QoS flow ID, time length, which can be the start time and end time, or the start time and/or the length of a time period, area information, which can be one or a group of cell lists, or one or a group of TAC or TAI lists, the type of prediction information requested, including but not limited to at least one of the following information: uplink and downlink rate of UE, uplink and downlink rate of PDU session, uplink and downlink rate of network slice, uplink and downlink rate of QoS flow, QoE report, location information, state of access node, quality of service information, abnormal event information and QoS duration information, information of whether to report periodically, if it is a periodic report, it also includes the length of the period, the SM container.

The access node receives the requested prediction information, which can be used to train the AI model which is needed, or to generate reasonable self optimization decisions, so as to ensure the quality of service and improve the user experience.

In accordance with another aspect of the disclosure, a method for data processing in a wireless communication network is provided. The method includes the first node sends a first message containing a resource prediction request to the second node to notify the second node that the resource prediction information needs to be fed back to the first node. The message can be RESOURCE STATUS REQUEST of X2 or Xn or F1 or E1, EN-DC RESOURCE STATUS REQUEST of X2, or a newly defined X2 or Xn or F1 or E1 message. The message includes one or more of the following:

prediction sign/ID: used to indicate the request containing resource prediction.

prediction registration request: used to indicate the start, end, and addition of predictions.

prediction time interval: used to represent the prediction time interval. It can be represented by 2*n bits. For example, the first n bits represent the prediction start time, and the last n bits represent the prediction end time. This time can be a relative time or an absolute time. It can also be represented by a separate field, including one or more of the following:

prediction start time: used to indicate the prediction start time. The start time can be relative time or absolute time.

prediction end time: used to indicate the end time of the prediction. The end time can be relative time or absolute time.

prediction content: used to indicate the parameters needed to be predicted. The prediction parameters include one or more of the following: transport network layer (TNL) capacity indicator, radio resource status, composite available capacity group, composite available resource group, number of active UEs, radio resource control (RRC) connections, slice available capacity, hardware (HW) capacity indicator, S1 TNL load indicator, hardware (HW) load indicator, almost blank subframe (ABS) status, reference signal received power (RSRP) measurement report list, reference signal receiving quality (RSRQ) measurement report list, signal to interference plus noise ratio (SINR) measurement report list, channel state information (CSI) report, cell reporting indicator, jitter of each predicted content parameter, etc. The jitter can be the variance or standard deviation of the parameter.

prediction reporting interval: used to indicate the reporting interval of prediction content in periodic reporting.

The reporting interval can also be the prediction time of the reported data. If there is no content in this field, it means that a single report is sufficient, and the prediction time of a single report is from the prediction start time to the end time.

The second node sends a second message containing a response to the prediction request to the first node according to the configuration information, which is used to feed back the prediction request to notify the first node whether the prediction can be performed. The message can be RESOURCE STATUS RESPONSE or RESOURCE STATUS FAILURE of X2 or Xn or F1 or E1, or EN-DC RESOURCE STATUS RESPONSE of X2 or EN-DC RESOURCE STATUS FAILURE, or a newly defined X2 or Xn or F1 or E1 message. The message can include one or more of the following fields:

prediction request confirmation: it can be a single bit to identify whether predicted resource information can be sent. For example, 1 indicates that predicted resource information can be sent, and 0 indicates that predicted resource information cannot be sent.

individual prediction requested content confirmation: it can be in the form of bitmap, and each bit corresponds to a prediction content. For example, when the bit is 1, it means that the prediction resource information of the corresponding prediction content can be sent, and 0 means that the prediction resource information of the corresponding prediction content cannot be sent. It also can be a separate field to indicate different prediction content confirmations.

cause: used to indicate the reason why the request fails. For example, resource prediction failed.

The second node automatically generates predicted resource status information according to the configuration in the predicted resource request and/or because the predicted resource status in the second node is too high or too low, for example, according to the collected historical data and/or current resource status. The second node sends a third message containing predicted resource status information to the first node for transmitting the predicted resource status in the second node. The message can be RESOURCE STATUS UPDATE of X2 or Xn or F1 or E1, EN-DC RESOURCE STATUS UPDATE of X2, or a newly defined X2 or Xn or F1 or E1 message. The predicted resource status information includes one or more of the following:

prediction content prediction sign/ID: used to indicate whether the resource status is prediction content or not. This field can be represented by a single bit. For example, 1 indicates that the state information is the predicted content, and 0 indicates that the state information is the actual state content.

prediction content prediction interval: used to indicate the prediction start and end time of the resource status. It can be represented by 2*n bits. For example, the first n bits represent the prediction start time, and the last n bits represent the prediction end time. This time can be relative time or absolute time. It can also be represented by a separate field, including one or more of the following:

prediction content prediction start time: used to indicate the prediction start time of the resource status. The start time can be relative time or absolute time.

prediction content prediction end time: used to indicate the prediction end time of the resource status. The end time can be relative time or absolute time.

resource status: used to indicate resource status. Resource status parameters include one or more of the following:

transport network layer (TNL) capacity indicator, radio resource status, composite available capacity group, composite available resource group, number of active UEs, radio resource control (RRC) connections, slice available capacity, hardware (HW) capacity indicator, hardware (HW) load indicator, S1 TNL load indicator, almost blank subframe (ABS) status, reference signal received power (RSRP) measurement report list, reference signal receiving quality (RSRQ) measurement report list, signal to interference plus noise ratio (SINR) measurement report list, channel state information (CSI) report, cell reporting indicator, jitter of each resource status parameter, etc. The jitter can be the variance or standard deviation of the parameter.

prediction result: used to indicate the prediction result of the requested prediction parameter. The prediction parameters include one or more of the following: transport network layer (TNL) capacity indicator, radio resource status, composite available capacity group, composite available resource group, number of active UEs, radio resource control (RRC) connections, slice available capacity, hardware (HW) capacity indicator, hardware (HW) load indicator, S1 TNL load indicator, almost blank subframe (ABS) status, reference signal received power (RSRP) measurement report list, reference signal receiving quality (RSRQ) measurement report list, signal to interference plus noise ratio (SINR) measurement report list, channel state information (CSI) report, cell reporting indicator, jitter of each prediction result parameter, etc. The jitter can be the variance or standard deviation of the parameter.

The first node receives the requested prediction information, which can be used to train the AI model which is needed, or to generate reasonable self optimization decisions, so as to ensure the quality of service and improve the user experience.

In accordance with another aspect of the disclosure, a method for data processing in a wireless communication network is provided. The method includes the second node generates predicted resource warning information, for example, according to the collected historical data and/or current resource status.

The second node sends a fourth message containing predicted resource warning information to the first node, so as to notify the first node of the predicted load in the second node is too high or too low. The message can be RESOURCE STATUS UPDATE of X2 or Xn or F1 or E1, EN-DC RESOURCE STATUS UPDATE of X2, or a newly defined X2 or Xn or F1 or E1 message. In one implementation, the content of the predicted resource warning information includes one or more of the following:

prediction content warning: used to indicate the warning state of the prediction resource status. This field contains one or more of the following:

warning content: the warning content parameters include one or more of the following: transport network layer (TNL) capacity indicator, radio resource status, composite available capacity group, composite available resource group, number of active UEs, radio resource control (RRC) connections, slice available capacity, hardware (HW) capacity indicator, hardware (HW) load indicator, S1 TNL load indicator, almost blank subframe (ABS) status, reference signal received power (RSRP) measurement report list, reference signal receiving quality (RSRQ) measurement report list, signal to interference plus noise ratio (SINR) measurement report list, channel state information (CSI) report, cell reporting indicator, jitter of each warning content parameter, etc. The jitter can be the variance or standard deviation of the parameter.

warning flag: this warning flag can include low, high, and especially high.

prediction content prediction interval: used to indicate the prediction start and end time of the resource status. It can be represented by 2*n bits. For example, the first n bits represent the prediction start time, and the last n bits represent the prediction end time. This time can be relative time or absolute time. It can also be represented by a separate field, including one or more of the following:

prediction content prediction start time: used to indicate the prediction start time of the resource status. The start time can be relative time or absolute time.

prediction content prediction end time: used to indicate the prediction end time of the resource status. The end time can be relative time or absolute time.

If the fourth message containing prediction resource warning does not include prediction content prediction end time, the second node needs to send the fifth message containing prediction content warning end notification to the first node. The message includes one or more of the following: prediction content warning end time, resource status, first node ID or name, second node ID or name. The message can be RESOURCE STATUS UPDATE of X2 or Xn or F1 or E1, EN-DC RESOURCE STATUS UPDATE of X2, or a newly defined X2 or Xn or F1 or E1 message.

After receiving the prediction resource warning, the first node can take appropriate actions in advance, or generate reasonable self optimization decisions, so as to ensure the quality of service and improve the user experience.

The parameters in the prediction content in the first message, the resource status and prediction result in the third message, and the warning content in the fourth message can be specifically as follows:

The transport network layer (TNL) capacity indicator can be used to indicate the offered and available capacity of Transmission Network experienced by a node or cell. For example, the transmission network layer capacity indicator can be used to indicate offered and available capacity of the Transport Network experienced by the NG RAN cell. The transmission network layer capacity indicator can be the transmission network layer capacity indicator in 38.423 and/or 36.423, the transmission network layer capacity indicator can also be used to indicate the offered and available capacity of the Transport Network experienced by the gNB-DU. The transmission network layer capacity indicator can be the transmission network layer capacity indicator (TNL capacity indicator) in 38.473, the transmission network layer capacity indicator can also be used to indicate offered and available capacity of the Transport Network. The transmission network layer capacity indicator can be the transmission network layer available capacity indicator in 38.463. The transmission network layer capacity may include one or more of the following: DL and/or UL TNL offered capacity, DL and/or UL TNL available capacity, etc.

The radio resource status is used to indicate the usage of physical resource block (PRB) for downlink and/or uplink traffic and/or the usage of physical downlink control channel element (PDCCH CCE) for downlink and/or uplink scheduling. For example, the radio resource status is used to indicate the usage of physical resource block (PRB) of all downlink and uplink traffic per cell and per synchronization signal/physical broadcast channel block (SSB) area and the usage of physical downlink control channel element (PDCCH CCE) of downlink and uplink scheduling. The radio resource status can be the radio resource status in 38.473 and/or NR Radio resource status in 36.423, the radio resource status can also be used to indicate the usage of PRBs per cell and per SSB area for all downlink and uplink traffic, and the radio resource status can be the radio resource status in 38.473, the radio resource status can also be used to indicate the usage of PRBs for all downlink and uplink traffic and the usage of PDCCH CCEs for downlink and uplink scheduling. The radio resource status can be the radio resource status in 36.423. The radio resource status may include one or more of the following: uplink and/or downlink guaranteed bit rate (GBR) PRB usage, uplink and/or downlink non-GBR PRB usage, uplink and/or downlink total PRB usage, uplink and/or downlink scheduling PDCCH CCE usage, SSB area uplink and/or downlink GBR PRB usage, SSB area uplink and/or downlink non-GBR PRB usage, SSB area uplink and/or downlink total PRB usage, uplink and/or downlink scheduling PDCCH CCE usage, etc.

The composite available capacity group is used to indicate overall available resource levels of downlink and/or uplink. For example, the composite available capacity group is used to indicate overall available resource levels of per cell and per SSB area in the cell in downlink and uplink. The composite available capacity group can be Composite Available Capacity Group in 38.423 and/or 38.473 and/or NR Composite Available Capacity Group in 36.423, the composite available capacity group is also used to indicate overall available resource levels of downlink and uplink. The composite available capacity group can be Composite Available Capacity Group in 36.423. The composite available capacity group may include one or more of the following: composite available capacity group uplink and/or downlink, cell capacity class value, capacity class value, capacity value, SSB area capacity value, etc.

The slice available capacity is used to indicate the amount of resources per network slice that are available per cell relative to the total resources per cell and/or per node. For example, the slice available capacity is used to indicate the amount of resources per network slice that are available per cell relative to the total NG-RAN resources per cell. The slice available capacity can be Slice Available Capacity in 38.423. The slice available capacity is also used to indicate the amount of resources per network slice that are available per cell relative to the total gNB-DU resources per cell. The slice available capacity can be Slice Available Capacity in 38.473. The slice available capacity may include one or more of the following: the slice available capacity value uplink and/or downlink, etc.

The number of active UEs is used to indicate the mean number of active UEs, which may be Number of Active UEs in 38.423 and/or 38.473 and/or 36.423. The number of active UEs may include a mean number of active UEs, etc.

The radio resource control (RRC) connections are used to indicate the overall status of RRC connections per cell. The radio resource control connections can be the RRC Connections in 38.423. The number of radio resource control connections may include the number of RRC connections, an available RRC connection capacity value, etc.

The hardware (HW) capacity indicator is used to indicate the offered and available throughput experienced by the node. For example, the hardware (HW) capacity indicator is used to indicate the offered and available throughput experienced by gNB-CU-UP, which may be HW Capacity Indicator in 38.463. The hardware capacity indicator may include offered throughput, available throughput, and so on.

The hardware (HW) load indicator is used to indicate the status of hardware load. For example, the hardware load indicator is used to indicate the status of hardware load experienced by a cell. The hardware load indicator may be Hardware Load Indicator in 36.423. The hardware load indicator can also indicate the status of hardware load, and the hardware load indicator can be Hardware Load Indicator in 38.473. The hardware load indicator may include uplink and/or downlink hardware load indicator, load indicator, etc.

S1 TNL load indicator is used to indicate the status of the S1 Transport Network Load experienced by the cell. The S1 TNL load indicator may be S1 TNL Load Indicator in 36.423. The S1 TNL load indicator may include uplink and/or downlink S1 TNL load indicator, load indicator, etc.

Almost Blank Subframe (ABS) status is used to aid the nodes designing ABS to evaluate the needs for modification of the ABS pattern. For example, the ABS status can be used to aid the eNB designating ABS to evaluate the need for modification of the ABS pattern. The ABS status can be the ABS status in 36.423. The ABS status may include downlink ABS status, usable ABS pattern information, etc.

Reference Signal Received Power (RSRP) measurement report list is used to provide RSRP measurement report of UEs served by the sending node. For example, RSRP measurement report list can be used to provide RSRP measurement report of UEs served by the sending eNB, and the reference signal reception power measurement report list can be RSRP Measurement Report List in 36.423. The reference signal reception power measurement report list may include RSRP measured, etc.

Channel State Information (CSI) report is used to provide CSI reports of the UE served by the cell for which the information is provided. The channel state information report may be CSI Report in 36.423. The channel state information report may include one or more of the following: Rank Indicator (RI), wideband channel quality indicator (CQI), subband size, subband CQI, subband index, 4-bit CQI, 3-bit spatial differential CQI, 2-bit subband differential CQI, 2-bit differential CQI, 2-bit differential CQI, 2-bit subband differential CQI, Precoding Matrix Indicator (PMI), CSI-RS Resource Indicator (CRI), Layer Indicator (LI), L1-L1-RSRP.

Jitter of the parameter can be the jitter of the above parameters and/or the parameters contained therein, where the jitter can be the standard deviation and/or variance of the parameters. The jitter condition is applicable to the prediction content in the first message, the resource status and prediction result in the third message, and the warning content in the fourth message. Specifically, the jitter condition may include one or more of the following:

Transport network layer (TNL) capacity jitter, which may include one or more of the following: DL and/or UL TNL offered capacity jitter, DL and/or UL TNL available capacity jitter, etc.

Radio resource status jitter, which may include one or more of the following: uplink and/or downlink Guaranteed Bit Rate (GBR) PRB usage jitter, uplink and/or downlink non-GBR PRB usage jitter, uplink and/or downlink total PRB usage jitter, uplink and/or downlink scheduling PDCCH CCE usage jitter, SSB area uplink and/or downlink GBR PRB usage jitter, SSB area uplink and/or downlink non-GBR PRB usage jitter, SSB area uplink and/or downlink total PRB usage jitter, uplink and/or downlink scheduling PDCCH CCE usage jitter, etc.

Composite available capacity group jitter, which can include one or more of the following: composite available capacity group uplink and/or downlink jitter, cell capacity class value jitter, capacity class value jitter, capacity value jitter, SSB area capacity value jitter, etc.

Slice available capacity jitter, which can include one or more of the following: slice available capacity value uplink and/or downlink jitter, etc.

The number of active UEs jitter, which can include the mean number of active UEs jitter, etc.

Radio resource control (RRC) connections jitter, which can include the number of RRC connections jitter, available RRC connection capacity value jitter, etc.

Hardware (HW) capacity indicator jitter, which can include provided throughput jitter, available throughput jitter, etc.

Hardware load indicator jitter, which can include uplink and/or downlink hardware load indicator jitter, load indicator jitter, etc.

S1 TNL load indicator jitter, which can include uplink and/or downlink S1 TNL load indicator jitter, load indicator jitter, etc.

Almost blank subframe (ABS) status jitter, which can include downlink ABS status jitter, usable ABS pattern information jitter, etc.

Reference Signal Received Power (RSRP) measurement report list jitter, which can include RSRP measured jitter, etc.

Channel State Information (CSI) reports jitter, which can include one or more of the following: Rank Indicator (RI) jitter, wideband Channel quality indicator (CQI) jitter, subband size jitter, subband CQI jitter, subband index jitter, 4-bit CQI jitter, 3-bit spatial differential CQI jitter, 2-bit subband differential CQI jitter, 2-bit differential CQI jitter, 2-bit subband differential CQI jitter, Precoding Matrix Indicator (PMI) jitter, CSI-RS Resource Indicator (CRI) jitter, Layer Indicator (LI) jitter, L1-L1-RSRP jitter.

In accordance with another aspect of the disclosure, a method for data processing in a wireless communication network is provided. The method includes the first node sends a sixth message containing a load migration request to the second node to request that the load be migrated to the second node in a certain period of time, so as to avoid the overload of the first node. The message can be RESOURCE STATUS REQUEST or RESOURCE STATUS UPDATE of X2 or Xn or F1 or E1, EN-DC RESOURCE STATUS REQUEST or EN-DC RESOURCE STATUS UPDATE of X2, or newly defined X2 or Xn or F1 or E1 message, the message content includes one or more of the following:

Request load migration interval: used to indicate the expected start time and expected end time of load migration. It can be represented by 2*n bits. For example, the first n bits represent the expected start time of load migration, and the last n bits represent the expected end time of load migration. This time can be relative time or absolute time. It can also be represented by a separate field, including one or more of the following:
  request load migration start time: used to indicate the expected start time of load migration. The start time can be relative time or absolute time.
  request load migration end time: used to indicate the expected end time of load migration. The end time can be relative time or absolute time.
  requested load migration amount: used to indicate the amount of load that needs to be migrated.
  quality of service requirements for requesting load migration: used to represent the quality of service requirements for the load to be migrated, so that the message receiver can evaluate whether the quality of service can be met to determine whether to accept the load migration or not.
slice information requesting load migration: used to represent the slice information of the load to be migrated, such as Network Slice Selection Assistance Information or Single Network Slice Selection Assistance Information, and so on, so that the message receiver can evaluate whether the slice requirements can be met to determine whether to accept the load migration or not.
urgency: used to indicate the urgency of the request for the message receiver to evaluate the required action. For example, if the urgency is particularly high, the message receiver can transfer its load to other areas to accept the load of the request transmitter. If the urgency is low, the message receiver can accept or reject the load migration according to its own load condition.

The second node generates load migration information, for example, according to the collected historical data and/or the current load state.

The second node sends a seventh message containing load migration information to the first node according to its own load prediction. The message can be RESOURCE STATUS RESPONSE, RESOURCE STATUS FAILURE or RESOURCE STATUS UPDATE of X2 or Xn or F1 or E1. It can also be EN-DC RESOURCE STATUS RESPONSE, or EN-DC RESOURCE STATUS FAILURE, or EN-DC RESOURCE STATUS UPDATE of X2, or newly defined X2 or Xn or F1 or E1 message. The load migration information includes one or more of the following:
  load migration confirmation: used to indicate whether to accept the load migration request. It can be divided into full acceptance, partial acceptance and no acceptance.
  load migration interval: used to indicate the expected start time and end time of load migration. It can be represented by 2*n bits. For example, the first n bits represent the estimated start time of load migration, and the last n bits represent the estimated end time of load migration. This time can be relative time or absolute time. It can also be represented by a separate field, including one or more of the following:
  load migration start time: used to indicate the acceptable start time of load migration. The start time can be relative time or absolute time. This field can indicate that the node gives the start time of load migration when it does not accept the start time of migration in the load migration request.
  load migration end time: used to indicate the acceptable end time of load migration. The end time can be relative time or absolute time. This field can indicate that the node gives the end time of load migration when it does not accept the end time of migration in the load migration request.
migratable amount of load: used to indicate the amount of load migration that can be received. This field can represent the amount of load that can be received by the node when it does not accept the amount of load migration in the load migration request.
slice information of migratable load: used to represent slice information of migratable load, such as Network Slice Selection Assistance Information or Single Network Slice Selection Assistance Information, and so on.
QoS requirements of load migration: used to represent the upper limit of QoS requirements for load that can be received.

Through this method, the node can determine the appropriate load that can be migrated to the second node in the process of load migration, so as to reduce the probability of migration failure and save resources.

In accordance with another aspect of the disclosure, a method for data processing in a wireless communication network is provided. The method includes the first node sends an eighth message containing a cell activation request to the second node to request the second node to activate some switched-off cells. The message can be CELL ACTIVATION REQUEST of X2 or Xn message, EN-DC CELL ACTIVATION REQUEST of X2, or newly defined X2 or Xn message. The message contains one or more of the following fields:

requested amount of load migration: used to indicate the amount of load to be migrated.

QoS requirements for requesting load migration: used to represent the QoS requirements for the load to be migrated, so that the message receiver can evaluate whether the QoS can be met to determine whether the load migration request can be accepted.

UE measurement report: used to transfer the measurement report of UEs to be migrated.

slice information: used to transfer slice information of users to be migrated, such as Network Slice Selection Assistance Information or Single Network Slice Selection Assistance Information, and so on.

The second node generates cell activation response information, for example, according to the collected cell status related information.

The second node feeds back a ninth message containing cell activation response information to the first node. If the cell which is requested to activate is not activated, the second node feeds back the suggested cell according to the planning and/or prediction results, and the suggested cell can be used to receive the load requested to be migrated from the first node. If all cells which are requested to activate are not activated, the message can be CELL ACTIVATION FAILURE of X2 or Xn message, or EN-DC CELL ACTIVATION FAILURE of X2, or newly defined X2 or Xn message. If some cells which are requested to activate are not activated, the message can be CELL ACTIVATION RESPONSE of X2 or Xn message or EN-DC CELL ACTIVATION RESPONSE of X2 or a newly defined X2 or Xn message.

The cell activation response information includes one or more of the following:
 a list of successfully activated cells, the list including the IDs of one or more successfully activated cells,
 a list of cells that have not been successfully activated, the list including the IDs of one or more cells that have not been successfully activated,
 a list of suggested cells, the list including the IDs of one or more suggested cells.

Through this method, the node can more accurately select the cell to be activated, so as to reduce the probability of activation failure and save resources.

In the disclosure, the self optimization decision may be one or more of the following:
 load balancing: load migration, load reception, target cell selection, target node selection, source cell selection, source node selection, amount of load migration decision, amount of load reception decision, load migration time decision, load reception time decision, etc.,
 energy saving: cell switch off/deactivation, cell switch on/activation, symbol switch off/deactivation, symbol switch on/activation, carrier switch off/deactivation, carrier switch on/activation, switch off/deactivation time decision, switch on/activation time decision, etc.,
 mobility management: handover target cell selection, handover target node selection, handover timing selection, handover source cell selection, handover source node selection, second node addition, second node change, second node release, etc.,
 path selection: path planning, next-hop node selection, QoS segmentation, etc.,
 path selection: path planning, next hop node selection, QoS segmentation, etc.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 to 23 discussed below and various embodiments for describing the principles of the disclosure in this patent document are only for illustration and should not be interpreted as limiting the scope of the disclosure in any way. Those skilled in the art will understand that the principles of the disclosure can be implemented in any suitably arranged system or device.

Figure 1:
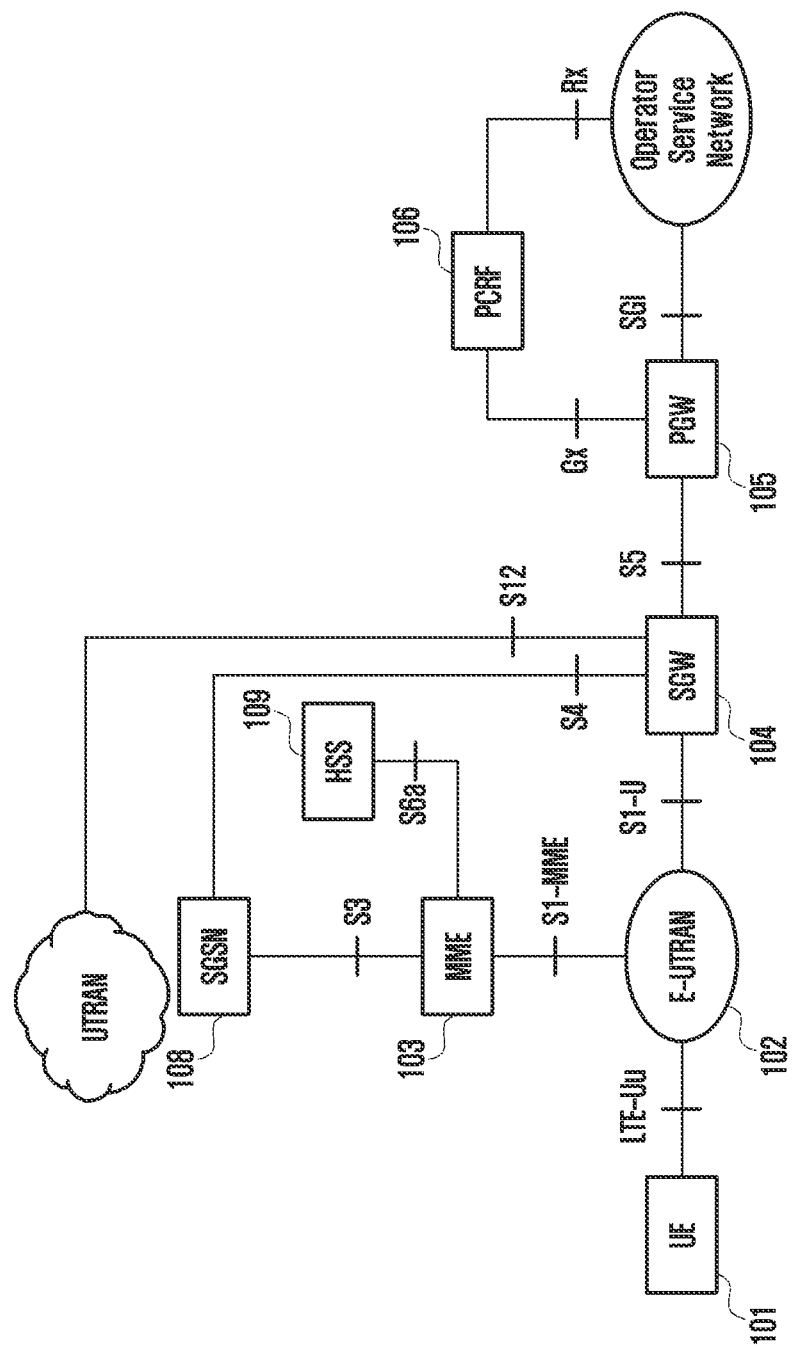
FIG. 1 is a schematic diagram showing a system architecture of system architecture evolution (SAE) according to an embodiment of the disclosure.

FIG. 1 is a system architecture 100 of system architecture evolution (SAE) according to an embodiment of the disclosure.

Referring to FIG. 1, user equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
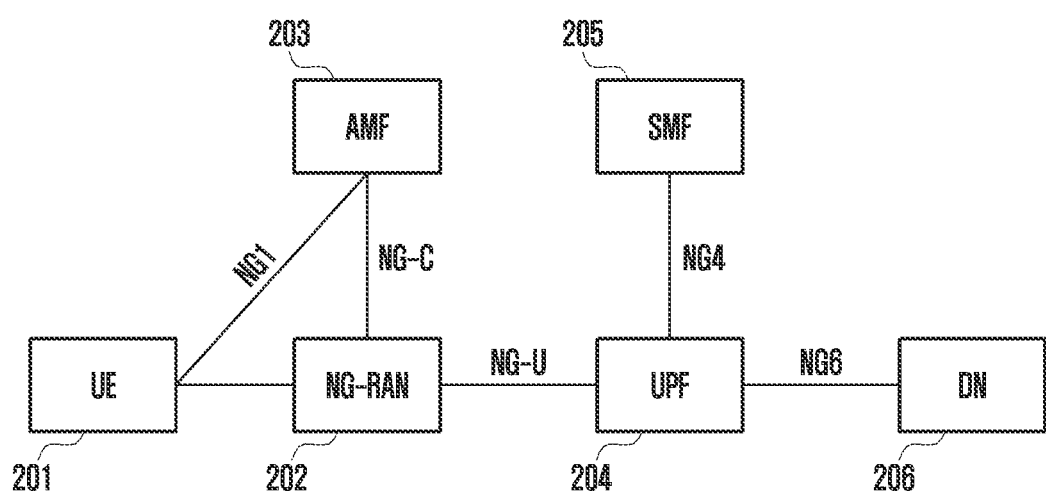
FIG. 2 is a schematic diagram showing a system architecture according to an embodiment of the disclosure.

FIG. 2 is a system architecture 200 according to an embodiment of the disclosure. Other embodiments of the system architecture 200 can be used without departing from the scope of the disclosure.

Referring to FIG. 2, user equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

Different entities in wireless communication network can be divided into user equipment (UE), access node, mobility management function entity, session management function entity, data plane function entity, and so on.

Taking 5G communication network as an example, the access node can be gNB, the mobility management function entity is AMF, the session management function entity is SMF, the data plane function entity is UPF, and the network data analysis function entity is NWDAF.

The access node can be composed of a centralized unit (CU) and a distributed unit (DU). One CU can be connected to multiple DUs. CU can also be composed of CU control plane (CU-CP) and CU user plane (CU-UP). E1 interface is between CU-CP and CU-UP, F1-C interface is between CU-CP and DU, and F1-U interface is between CU-UP and DU.

Figure 3:
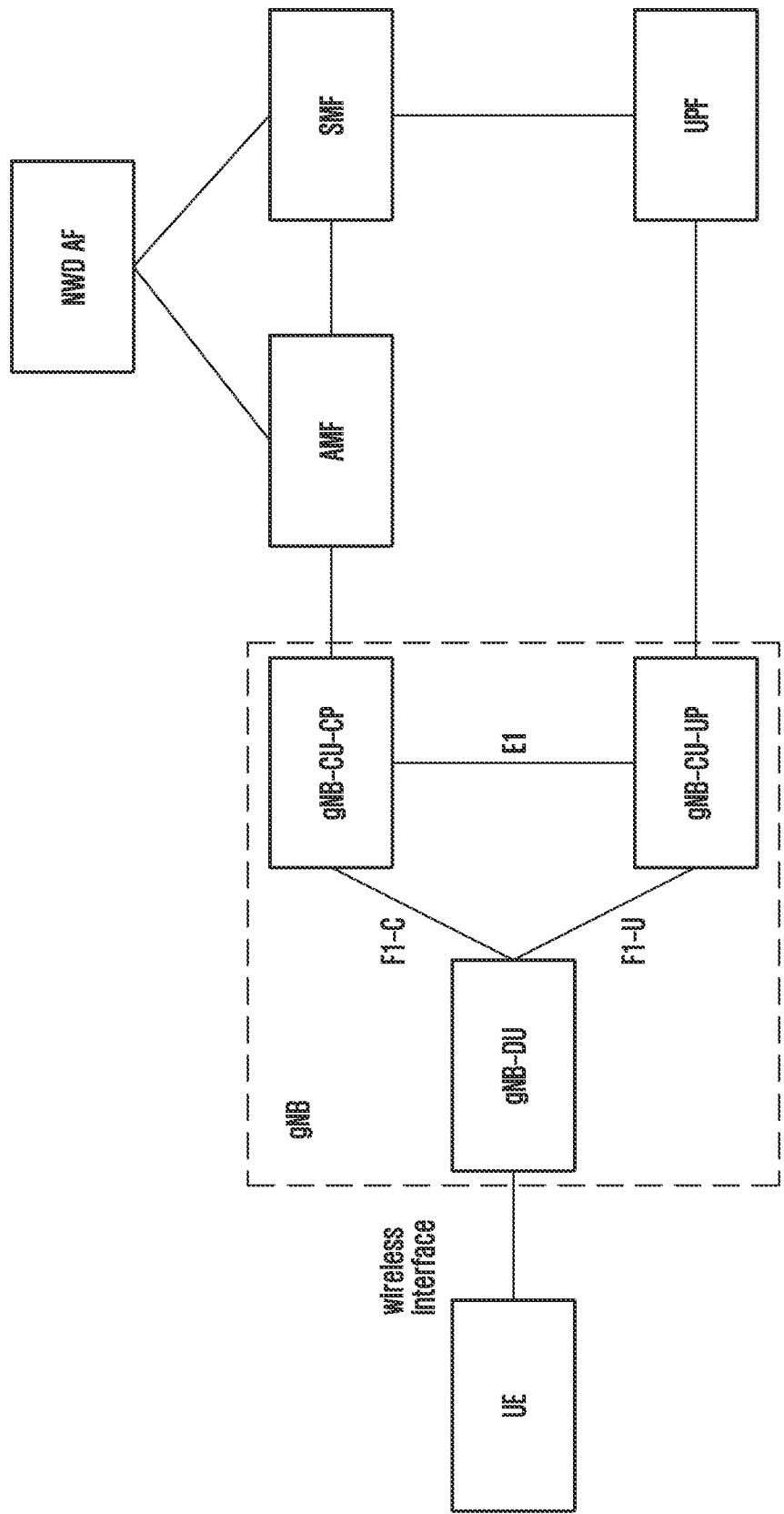
FIG. 3 is a schematic diagram of a system architecture in a 5G communication system according to an embodiment of the disclosure.

FIG. 3 is a schematic diagram of a system architecture in a 5G communication system according to an embodiment of the disclosure.

During specific deployment, UE can establish a wireless connection with one access node, and establish a wireless connection with another access node at the same time. The first access node is called the master node (hereinafter referred to as MN), and the second access node is called the secondary node (hereinafter referred to as SN). This scenario is called dual connectivity.

Figure 4:
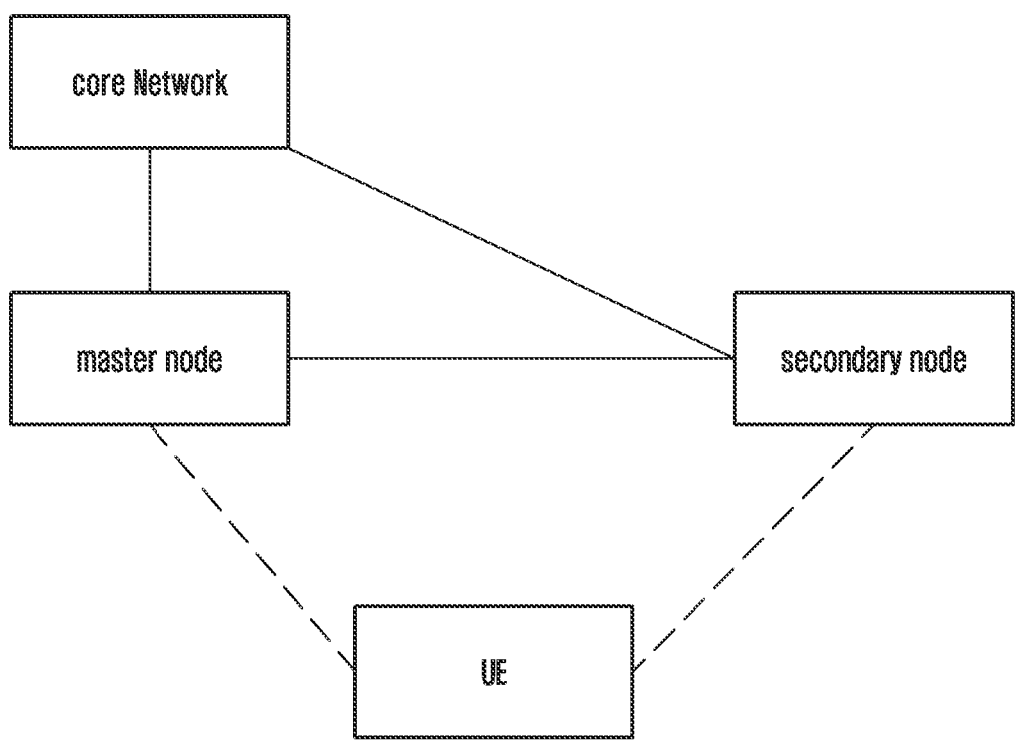
FIG. 4 is a schematic diagram of UE establishing wireless connection with MN and SN at the same time in 5G communication network according to an embodiment of the disclosure.

FIG. 4 is a schematic diagram of UE establishing wireless connection with MN and SN at the same time in 5G communication network according to an embodiment of the disclosure.

AI is an emerging technology. AI technology needs to collect some data, which can be used for AI model training or use.

AI can be used for the optimization of wireless communication network. In this way, wireless communication network needs to process data for the training or use of AI model, and finally optimize the network and improve user QoS.

The various embodiments of the disclosure are further described below in connection with the accompanying drawings.

The text and the accompanying drawings are provided only as examples to help understand the disclosure. They should not be construed as limiting the scope of the disclosure in any way. Although some embodiments and examples have been provided, based on the contents disclosed herein, it will be apparent to those skilled in the art that the illustrated embodiments and examples can be changed without departing from the scope of the disclosure.

The present application provides a method for supporting handover in a mobile communication network. In order to make the purpose, technical scheme and advantages of the application more clear, the application is further described in detail below with reference to the attached drawings and examples.

Figure 5:
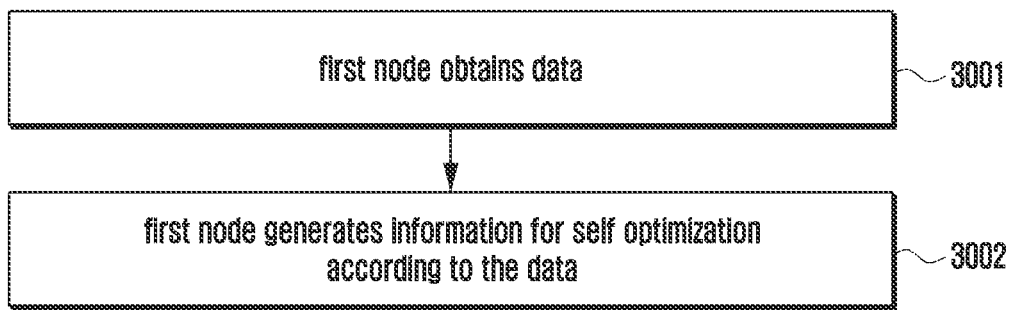
FIG. 5 is a flowchart showing a method for data processing according to an embodiment of the disclosure.

FIG. 5 is a flowchart showing a method for data processing according to an embodiment of the disclosure, including the following operations:

Operation 3001: the first node obtains data.

Operation 3002: the first node generates information for self optimization according to the obtained data.

Embodiment 1 describes a case where an entity in a wireless communication system reports its ability to support the deployment of an AI model to another entity. The first node can be the access node, or the CU-UP or DU of the access node, or the MN or SN in the dual connectivity scenario, and the second node can be the mobility management function entity, or the access node, or the CU-CP of the access node, or the SN or MN in the dual connectivity scenario.

Figure 6:
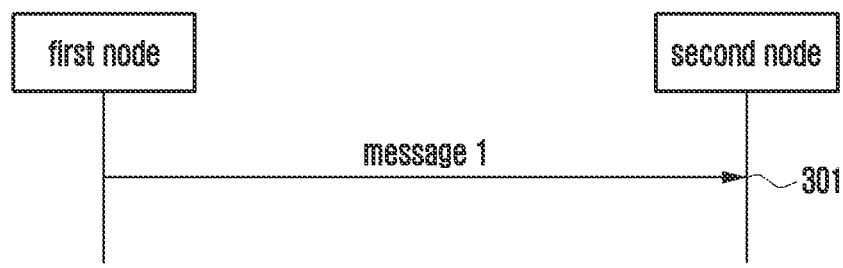
FIG. 6 schematically illustrates embodiment 1 according to an embodiment of the disclosure.

FIG. 6 is a schematic diagram of embodiment 1 according to an embodiment of the disclosure, including the following operations:

Operation 301: the second node sends a message 1 to the first node. The message 1 carries the ability of the first node to support the deployment of AI model.

The ability to support the deployment of AI model may be a list of information of the AI model deployed on the node, and/or an indication information.

The indication information is used to indicate whether the node supports the deployment of AI model.

The information of the AI model includes but is not limited to at least one of the following information:
  index/identity of AI model;
  name of AI model;
  purpose of AI model;
  type of AI model, which is used to represent the model type of machine learning. This type can include, but is not limited to, perceptron, feedforward neural network, radial basis network, deep feedforward network, recurrent neural network, long/short-term memory network, gated recurrent unit, auto encoder, and variational auto encoder, denoising auto encoder, sparse auto encoder, Markov chain, Hopfield network, Boltzmann machine, restricted Boltzmann machine, deep belief network, deep convolutional network, deconvolutional network, deep convolutional inverse graphics network, generative adversarial network, liquid state machine, extreme learning machine, echo state network, deep residual network, Kohonen network, support vector machine, neural turing machine, convolutional neural network, artificial neural network, recurrent neural network, deep neural network, etc.;
  characteristic parameters of AI model.

The purpose of the AI model can be, for example, to predict the load conditions of the node, or of a cell on the node, or of a beam of the cell on the node, or of a network slice on the node and/or the cell on the node, or of a public land mobile network PLMN on the node and/or the cell on the node, within a certain time. The load condition includes but is not limited to at least one of the following information: wireless resource usage, transport network layer (TNL) resource usage, hardware resource usage, the number of UEs being served, and the number of RRC (radio resource control) connections. Each kind of information included in the load condition may be the maximum value of the information available to be used, and/or the value of the information currently used, and/or the value currently available to be used, and/or the ratio of the value of the information currently used to the maximum value of the information available to be used, and/or the ratio of the value currently available to be used to the maximum value of the information available to be used.

The characteristic parameters of the AI model include but are not limited to at least one of the following information:
  the number of layers, which is used to represent the number of layers of the neural network;
  the number of neurons in each layer, which is used to represent the number of neurons in each layer of the neural network;
  weight, which is used to represent the weight of a neuron in the neural network.

The first node can decide whether to add, update or delete the AI model on the first node according to the ability of the second node to support the deployment of the AI model, and can also decide which data can be obtained from the second node.

Embodiment 2 describes a case where an entity in a wireless communication system sends a permission to collect data of a specific UE to another entity. The first node can be the access node, or the CU-UP or DU of the access node, or the SN in the dual connectivity scenario, and the second node can be the mobility management function entity, or the access node, or the CU-CP of the access node, or the MN in the dual connectivity scenario.

Figure 7:
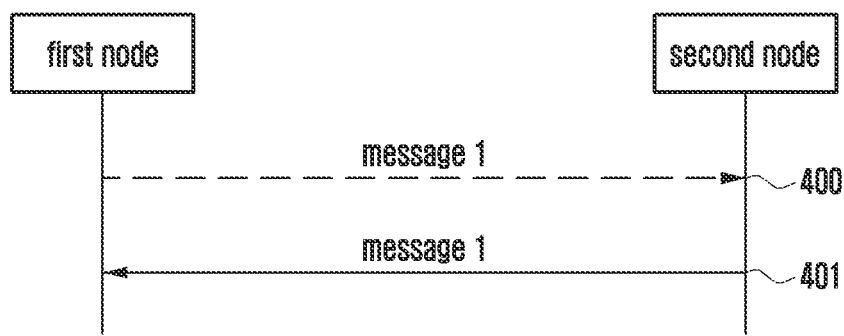
FIG. 7 schematically illustrates embodiment 2 according to an embodiment of the disclosure.

FIG. 7 is a schematic diagram of embodiment 2 according to an embodiment of the disclosure, including the following operations:

Operation 400: the first node sends a message 1 to the second node. The message 1 carries the request information for the permission information of the data to be collected of the specific UE, optionally, and the UE ID of the UE.

This operation is not necessary.

Operation 401: the second node sends message 2 to the first node. The message 2 carries permission information for collecting data of the specific UE.

The permission to collect the data of the specific UE includes but is not limited to at least one of the following information: a list of PLMNs that are allowed to collect data of a specific UE, a list of network slices that are allowed to collect data of a specific UE, and a list of identifiers of non-public networks (NPNs) that are allowed to collect data of a specific UE.

The second node can decide whether to collect the data of the UE on the node according to the permission to collect the data of the specific UE.

Embodiment 3 describes a case where an entity in a wireless communication system requests another entity to collect data. The first node can be the access node, or the CU-CP of the access node, or the MN or SN in the dual connectivity scenario, and the second node can be the access node, or the CU-CP of the access node, or the SN in the dual connectivity scenario.

Figure 8:
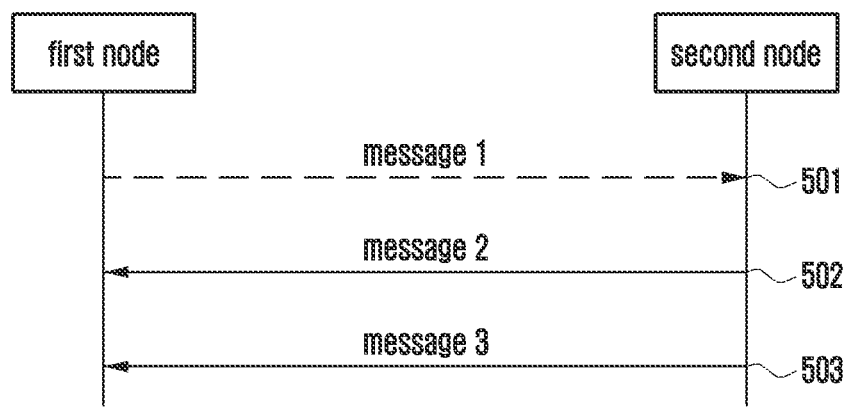
FIG. 8 schematically illustrates embodiment 3 according to an embodiment of the disclosure.

FIG. 8 is a schematic diagram of embodiment 3 according to an embodiment of the disclosure, including the following operations:

Operation 501: the first node sends a message 1 to the second node. The message 1 carries the information that the first node requests the second node to collect data.

The information includes but is not limited to at least one of the following information:
  ID of data collection;
  indication information to start or stop collecting data;
  reporting mode, which can be periodic or aperiodic;
  the period length of the report, optionally, including the number of reports;
  time period for collecting data, which can be the start time and end time, or the start time and/or the length of the time period;
  data to be collected includes but is not limited to at least one of the following information: measurement report of UE, QoS and/or QoE report of UE, and the information reported by UE.

The information reported by UE includes but is not limited to at least one of the following information: RLF report, CEF report, RACH report and Successful HO report. The ID of the data collection is used to distinguish different processes of collecting data.

Operation 502: the second node sends message 2 to the first node. The message 2 may indicate that the second node confirms to accept all or part of the request of the first node in message 1, or that the second node refuses to accept the request of the first node in message 1.

If the second node partially accepts the request of the first node in message 1, the second node contains the accepted data to be collected in message 2, including but not limited to at least one of the following information: measurement report of UE, QoS and/or QoE report of UE, and information reported by UE; or contain the data rejected to be collected, including but not limited to at least one of the following information: measurement report of UE, QoS and/or QoE report of UE, information reported by UE, and cause for rejection.

If the second node refuses to accept the request of the first node in message 1, the second node includes the cause for the rejection in message 2.

Operation 503: if the second node confirms to accept all or part of the request of the first node in message 1, the second node sends message 3 to the first node. The message 3 carries the data requested to be collected in the message 1.

In the SN change procedure initiated by SN, the first node can be the source SN and the second node can be the target SN. If there is no interface between the source SN and the target SN, the message 1, message 2 and message 3 need to be sent to the MN first, and then sent to the second node by the MN.

The first node can use the collected data as input parameters for AI model training or usage, and can also be used to generate reasonable self optimization decisions, so as to ensure the QoS and improve the user experience.

Embodiment 4 describes a case where a NG-RAN Node in a 5G network reports its ability to support the deployment of AI models to AMF or another NG-RAN Node. The NG-RAN Node is the second node and the AMF or another NG-RAN Node is the first node. Centralized Unit-Control Plane (CU-CP), Centralized Unit-User Plane (CU-UP) and Distributed Unit (DU) belong to NG-RAN Node1.

Figure 9:
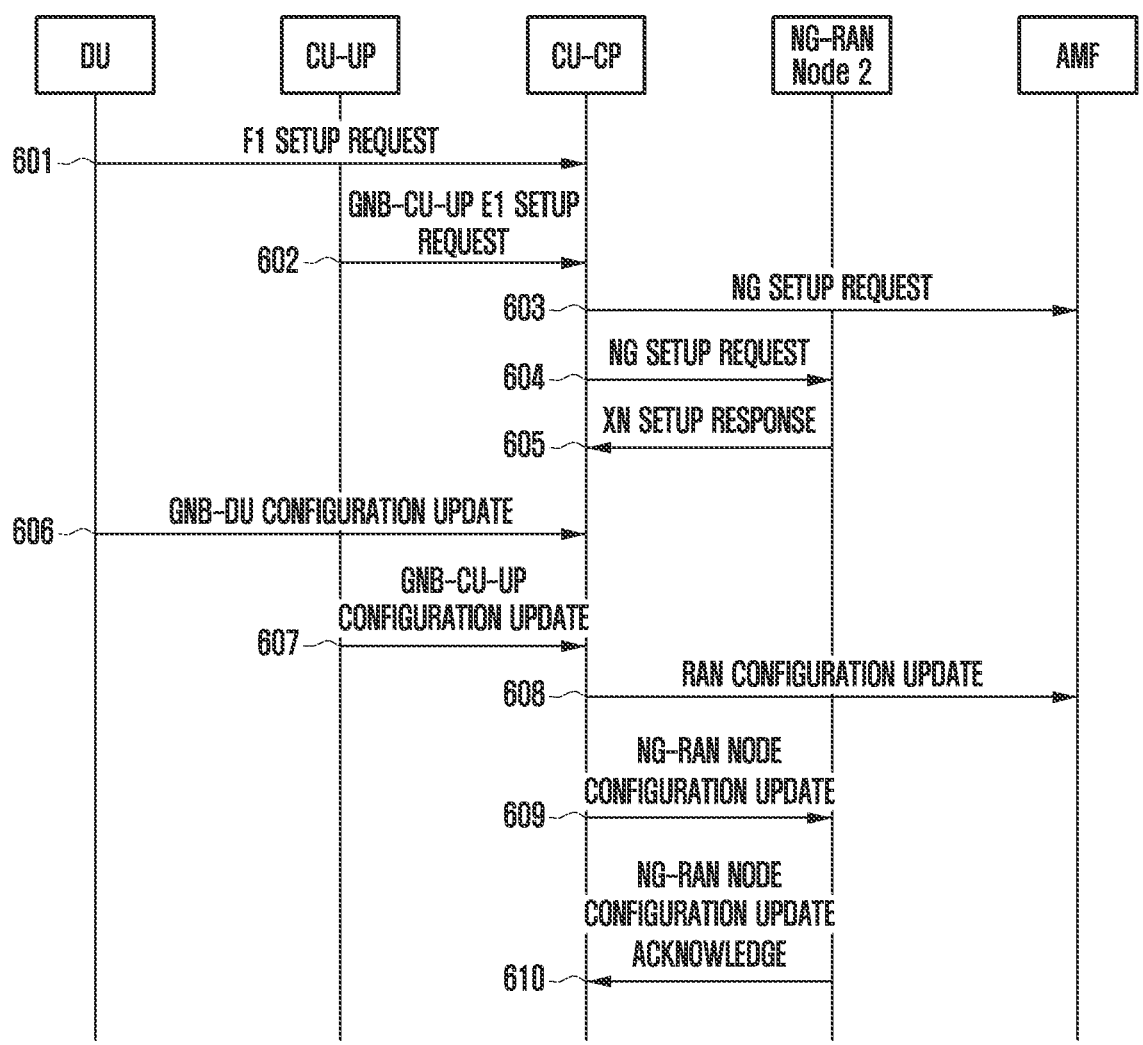
FIG. 9 schematically illustrates embodiment 4 according to an embodiment of the disclosure.

FIG. 9 is a schematic diagram of embodiment 4 according to an embodiment of the disclosure, including the following operations:

Operation 601: DU (second node) sends an F1 SETUP REQUEST message to CU-CP (first node). The message carries the ability of DU to support the deployment of AI model.

The ability to support the deployment of AI model may be a list of information of the AI model deployed on the node, and/or an indication information.

The indication information is used to indicate whether the node supports the deployment of AI model.

The information of the AI model includes but is not limited to at least one of the following information:
  index/identity of AI model;
  name of AI model;
  purpose of AI model;
  type of AI model, which is used to represent the model type of machine learning. This type can include, but is not limited to, perceptron, feedforward neural network, radial basis network, deep feedforward network, recurrent neural network, long/short-term memory network, gated recurrent unit, auto encoder, and variational auto encoder, denoising auto encoder, sparse auto encoder, Markov chain, Hopfield network, Boltzmann machine, restricted Boltzmann machine, deep belief network, deep convolutional network, deconvolutional network, deep convolutional inverse graphics network, generative adversarial network, liquid state machine, extreme learning machine, echo state network, deep residual network, Kohonen network, support vector machine, neural turing machine, convolutional neural network, artificial neural network, recurrent neural network, deep neural network, etc.;
  characteristic parameters of AI model.

The purpose of the AI model can be, for example, to predict the load conditions of the node, or of a cell on the node, or of a beam of the cell on the node, or of a network slice on the node and/or the cell on the node, or of a public land mobile network PLMN on the node and/or the cell on the node, within a certain time. The load condition includes but is not limited to at least one of the following information: wireless resource usage, transport network layer (TNL) resource usage, hardware resource usage, the number of UEs being served, and the number of RRC (radio resource control) connections. Each kind of information included in the load condition may be the maximum value of the information available to be used, and/or the value of the information currently used, and/or the value currently available to be used, and/or the ratio of the value of the information currently used to the maximum value of the information available to be used, and/or the ratio of the value currently available to be used to the maximum value of the information available to be used.

The characteristic parameters of the AI model include but are not limited to at least one of the following information:
  the number of layers, which is used to represent the number of layers of the neural network;
  the number of neurons in each layer, which is used to represent the number of neurons in each layer of the neural network;
  weight, which is used to represent the weight of a neuron in the neural network.

Operation 602: CU-UP sends GNB-CU-UP E1 SETUP REQUEST message to CU-CP. The message carries the ability of CU-UP to support the deployment of AI model.

Operation 603: CU-CP determines the ability of NG-RAN Node1 to support the deployment of AI model according to the ability of DU and/or CU-UP to support the deployment of AI model and its own ability to support the deployment of AI model. The CU-CP sends NG SETUP REQUEST message to the AMF, which carries the ability of NG-RAN Node1 to support the deployment of AI models.

The CU-CP can determine whether to obtain the output parameters of the deployed AI model from the DU and/or CU-UP according to the ability of the DU and/or CU-UP to support the deployment of AI model.

AMF can determine whether to obtain the output parameters of the deployed AI model from NG-RAN Node1 according to the ability.

Operation 604: CU-CP sends XN SETUP REQUEST message to NG-RAN Node2. The message carries the ability of NG-RAN Node1 to support the deployment of AI model.

Operation 605: NG-RAN Node2 sends XN SETUP RESPONSE message to CU-CP. The message carries the ability of NG-RAN Node2 to support the deployment of AI model.

NG-RAN Node1 can determine whether to obtain the output parameters of the deployed AI model from NG-RAN Node2 according to the ability of NG-RAN Node2 to support the deployment of AI model.

NG-RAN Node2 can determine whether to obtain the output parameters of the deployed AI model from NG-RAN Node1 according to the ability of NG-RAN Node1 to support the deployment of AI model.

Operation 606: DU sends GNB-DU CONFIGURATION UPDATE message to CU-CP, for example, when the ability of DU to support the deployment of AI models is changed. The message carries the ability of DU to support the deployment of AI model.

Operation 607: CU-UP sends GNB-CU-UP CONFIGURATION UPDATE message to CU-CP, for example, when the ability of CU-UP to support the deployment of AI models is changed. The message carries the ability of CU-UP to support the deployment of AI model.

Operation 608: CU-CP determines the ability of NG-RAN Node1 to support the deployment of AI model according to the ability of DU and/or CU-UP to support the deployment of AI model and its ability to support the deployment of AI model. CU-CP sends RAN CONFIGURATION UPDATE message to AMF, which carries the ability of NG-RAN Node1 to support the deployment of AI models.

CU-CP can determine whether to obtain the output parameters of the deployed AI model from the DU and/or CU-UP according to the ability of DU and/or CU-UP to support the deployment of AI model.

AMF can determine whether to obtain the output parameters of the deployed AI model from NG-RAN Node1 according to the ability.

Operation 609: CU-CP sends NG-RAN NODE CONFIGURATION UPDATE message to NG-RAN Node2, for example, when the ability of NG-RAN Node1 to support AI model deployment is changed. The message carries the ability of NG-RAN Node1 to support the deployment of AI model.

Operation 610: NG-RAN Node2 sends NG-RAN NODE CONFIGURATION UPDATE ACKNOWLEDGE message to CU-CP. When the ability of NG-RAN Node2 to support the deployment of AI model is changed, the message carries the ability of NG-RAN Node2 to support the deployment of AI model.

NG-RAN Node1 can determine whether to obtain the output parameters of the deployed AI model from NG-RAN Node2 according to the ability of NG-RAN Node2 to support the deployment of AI model.

NG-RAN Node2 can determine whether to obtain the output parameters of the deployed AI model from NG-RAN Node1 according to the ability of NG-RAN Node1 to support the deployment of AI model.

Embodiment 5 describes a case where NG-RAN Node in a 5G network obtains permission to collect the data of the specific UE. CU-CP, CU-UP and DU belong to NG-RAN Node1.

Figure 10:
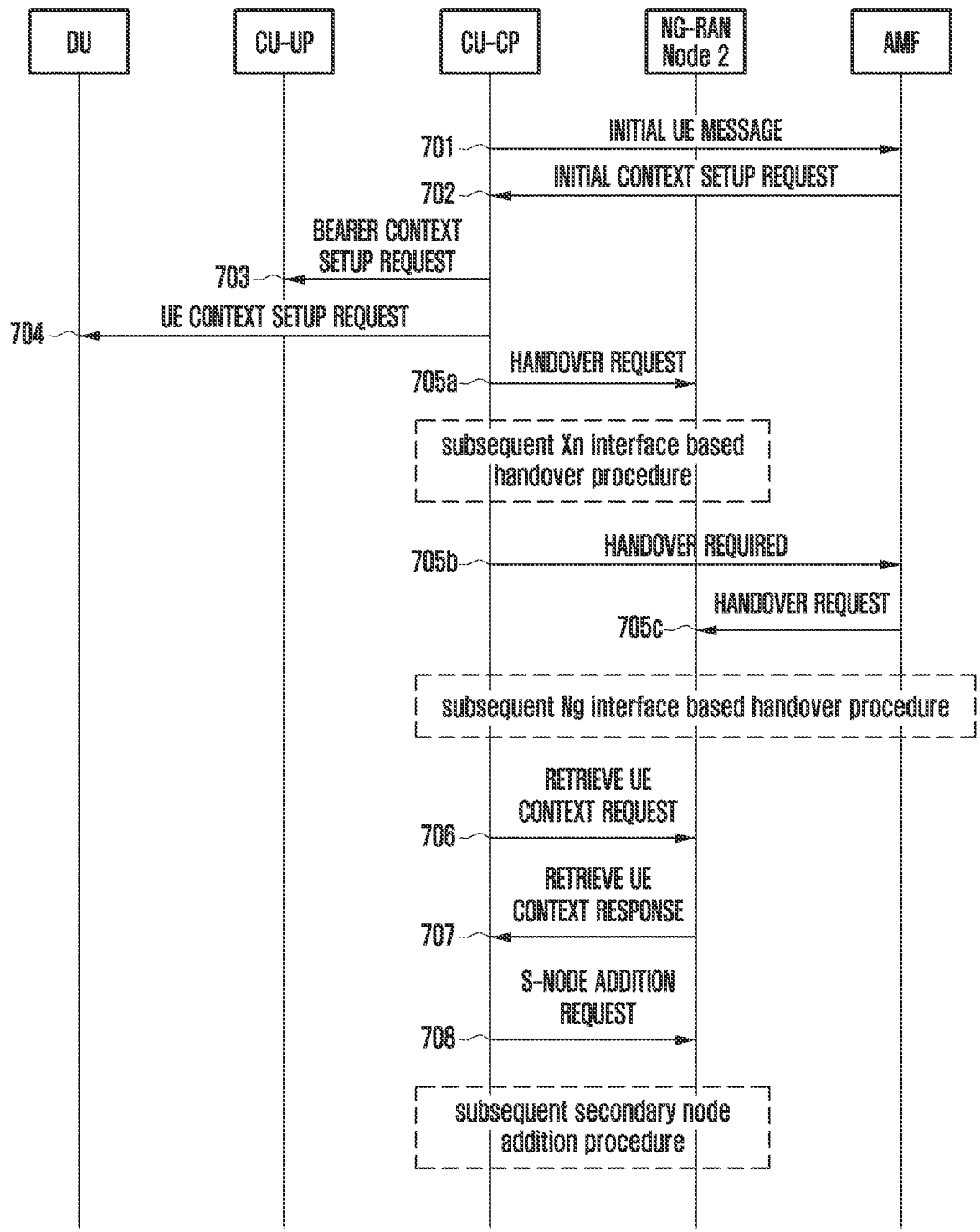
FIG. 10 schematically illustrates embodiment 5 according to an embodiment of the disclosure.

FIG. 10 is a schematic diagram of embodiment 5 according to an embodiment of the disclosure, including the following operations:

Operation 701: UE initiates the registration procedure. CU-CP sends INITIAL UE MESSAGE message to AMF.

Operation 702: AMF sends INITIAL CONTEXT SETUP REQUEST message to CU-CP. The message carries a permission to collect the data of the specific UE.

The permission to collect the data of the specific UE includes, but is not limited to, at least one of the following information: a list of PLMNs that are allowed to collect the data of the specific UE, a list of network slices that are allowed to collect the data of the specific UE, and a list of identifiers of non-public networks (NPNs) that are allowed to collect the data of the specific UE.

CU-CP determines whether the data of the UE can be collected on NG-RAN Node1 according to the received permission to collect the data of the specific UE.

Operation 703: CU-CP sends BEARER CONTEXT SETUP REQUEST message to CU-UP. The message carries a permission to collect the data of the specific UE.

CU-UP determines whether the data of the UE can be collected on CU-UP according to the received permission to collect the data of the specific UE.

Operation 704: CU-CP sends UE CONTEXT SETUP REQUEST message to the DU. The message carries a permission to collect the data of the specific UE.

DU determines whether the data of the UE can be collected on DU according to the received permission to collect the data of the specific UE.

Operation 705a: CU-CP can determine to initiate the Xn based handover procedure to NG-RAN Node2. CU-CP sends HANDOVER REQUEST message to NG-RAN Node2. The message carries the permission to collect the data of the specific UE.

Operation 705b: CU-CP can also determine to initiate the Ng based handover procedure to NG-RAN Node2. CU-CP sends HANDOVER REQUIRED message to AMF. The message carries the permission to collect the data of the specific UE.

Operation 705c: AMF sends HANDOVER REQUEST message to NG-RAN Node2. The message carries the permission to collect the data of the specific UE.

NG-RAN Node2 can determine whether the data of the UE can be collected on NG-RAN Node2 according to the received permission to collect the data of the specific UE.

Operation 706: if the UE moves from the coverage of NG-RAN Node2 to the coverage of NG-RAN Node1 after entering RRC-INACTIVE state, the UE can connect to NG-RAN Node1 and return to RRC-ACTIVE state.

CU-CP sends RETRIEVE UE CONTEXT REQUEST message to NG-RAN Node2 to request to obtain UE context information.

Operation 707: NG-RAN Node2 sends RETRIEVE UE CONTEXT RESPONSE message to CU-CP. The message carries the permission to collect the data of the specific UE.

CU-CP determines whether the data of the UE can be collected on NG-RAN Node1 according to the received permission to collect the data of the specific UE.

Operation 708: CU-CP can determine to configure dual connectivity for the UE, and CU-CP selects NG-RAN Node2 as the secondary node of the UE.

CU-CP sends S-NODE ADDITION REQUEST message to NG-RAN Node2. The message carries the permission to collect the data of the specific UE.

NG-RAN Node2 can determine whether the data of the UE can be collected on NG-RAN Node2 according to the received permission to collect the data of the specific UE.

Embodiment 6 describes the case where NG-RAN Node in the 5G network collects data for training the AI model. The AI model can be used to determine whether one cell needs to be deactivated to achieve energy-saving effect. CU-CP, CU-UP and DU belong to NG-RAN Node1.

Figure 11:
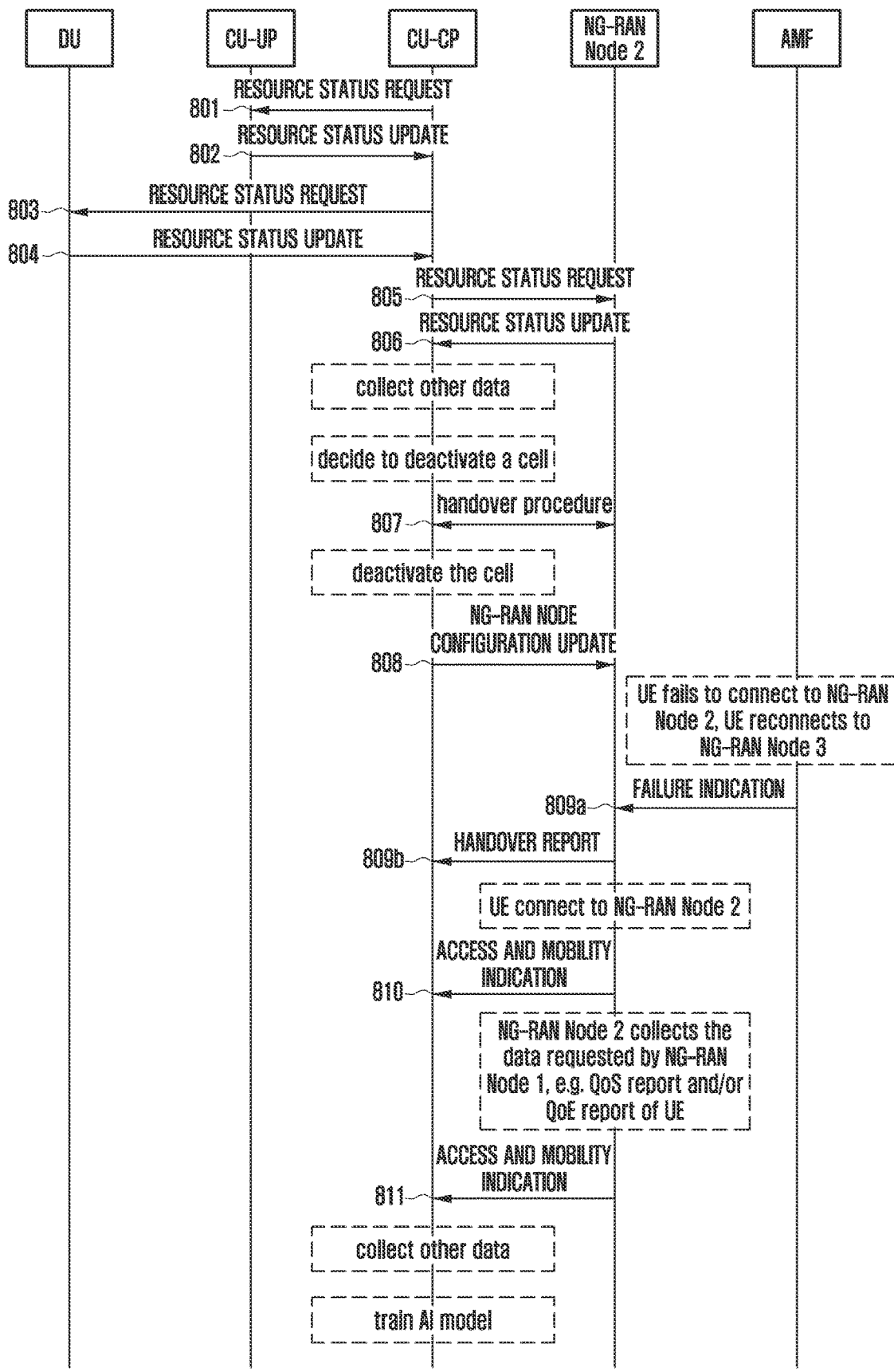
FIG. 11 schematically illustrates embodiment 6 according to an embodiment of the disclosure.

FIG. 11 is a schematic diagram of embodiment 6 according to an embodiment of the disclosure, including the following operations:

Operation 801: CU-CP requests CU-UP to report the load condition and/or energy usage condition through the E1 interface message, optionally, and the predicted value of the load condition and/or energy usage condition, optionally, including the reliability of the predicted value. The E1 interface message can be RESOURCE STATUS REQUEST and/or a newly defined E1 message. The message carries the type of information requested to be reported by CU-UP and/or the period of the report. The type of the information may be at least one of the following: the load condition of CU-UP, and/or the energy usage condition, the predicted value of the load condition, and/or the predicted value of the energy usage condition, and optionally, including the reliability of the predicted value.

Operation 802: CU-UP reports the data requested to be reported by CU-CP in the last operation through E1 interface message. The E1 interface message may be RESOURCE STATUS UPDATE and/or a newly defined E1 message. The message carries the information reported by CU-UP. The information may be at least one of the following information: the load condition of CU-UP and/or energy usage condition, the predicted value of load condition and/or the predicted value of energy usage condition, and optionally, including the reliability of the predicted value.

Operation 803: CU-CP requests the DU to report the load condition and/or energy usage condition through the F1 interface message, optionally, and the predicted value of the load condition and/or energy usage condition, optionally, including the reliability of the predicted value. The F1 interface message can be RESOURCE STATUS REQUEST and/or a newly defined F1 message. The message carries the type of information requested to be reported by DU and/or the period of the report. The type of the information may be at least one of the following: the load condition of DU, and/or the energy usage condition, the predicted value of the load condition, and/or the predicted value of the energy usage condition, and optionally, including the reliability of the predicted value.

Operation 804: DU reports the data requested in the last operation through F1 interface message. The F1 interface message may be RESOURCE STATUS UPDATE and/or a newly defined F1 message. The message carries the information reported by DU. The information may be at least one of the following information: the load condition of DU, and/or the energy usage condition, the predicted value of the load condition, and/or the predicted value of the energy usage condition, and optionally, including the reliability of the predicted value.

Operation 805: CU-CP requests the neighbor access node NG-RAN Node 2 to report the load condition and/or energy usage condition through the Xn interface message, optionally, and the predicted value of the load condition and/or energy usage condition, optionally, including the reliability of the predicted value. The Xn interface message may be RESOURCE STATUS REQUEST and/or a newly defined Xn message. The message carries the type of information requested to be reported by NG-RAN Node2 and/or the period of the report. The type of the information may be at least one of the following: the load condition of NG-RAN Node 2, and/or energy usage condition the predicted value of the load condition and/or the predicted value of the energy usage condition, and optionally, including the reliability of the predicted value.

Operation 806: NG-RAN Node 2 reports the data requested in the last operation through Xn interface message. The Xn interface message may be RESOURCE STATUS UPDATE and/or a newly defined Xn message. The message carries the information reported by NG-RAN Node 2. The information may be at least one of the following information: the load condition of NG-RAN Node 2 and/or energy usage condition, the predicted value of load condition and/or the predicted value of energy usage condition, and optionally, including the reliability of the predicted value.

CU-CP collects other data to be collected in the first type of information.

The load condition and/or energy usage condition of the access node can be used to select the most suitable cell for deactivation. The load condition and/or energy usage condition of neighbor access nodes, as well as the measurement report, QoS report and/or QoE report of UE can be used to select an appropriate target access node for the UE served by the selected cell for deactivation.

CU-CP can determine to deactivate a cell based on the collected data. At the same time, CU-CP select an appropriate target access node for the UE being served by the cell. For example, NG-RAN Node 2 is selected as the target access node for one of the UEs.

Wherein the determination to deactivate a cell and/or the appropriate target access node selected for the UE may be generated by the AI model, such as an AI model deployed on CU-CP.

Operation 807: CU-CP hands over the selected UE being served by the cell for deactivation to the target access node. The cause for the handover can be set to a value of the cause related to the deactivation of the cell, such as Switch Off Ongoing, or newly defined cause value "Deactivate a Cell", which is used to indicate that the handover is caused by the cell deactivation.

CU-CP indicates the DU which the selected cell for deactivation belongs to deactivate the cell.

Operation 808: CU-CP sends NG-RAN NODE CONFIGURATION UPDATE message to neighbor access nodes (NG-RAN Node 2 is taken as an example from here on). The message carries the cell ID of the cell for deactivation and a deactivation indication information.

The message can also carry information to request NG-RAN Node 2 to report the data to be collected. The information can also be carried by other Xn interface message, such as newly defined Xn interface message. The information may be at least one of the following information:
start or stop reporting;
reporting mode, which can be periodic or aperiodic;
length of period;
number of reports;
designated time period, which can be the start time and end time, or the start time and/or the length of a time period;
type of data requested to be collected, which can be at least one of the second type of information in the aforementioned data to be collected, such as the measurement report of the UE, the QoS report and/or QoE report of the UE, and the information reported by the UE.

Operation 809a: if the UE fails to connect to NG-RAN Node 2, the UE reconnects to another access node NG-RAN Node 3. The failure can be RLF (radio link failure) or CEF (connection establishment failure). UE generates RLF report or CEF report and sends it to NG-RAN Node 3 through RRC message. The UE adds location information and/or time stamp information when the failure occurs to the report. NG-RAN Node 3 determines that the failure occurred in NG-RAN Node 2 according to the information in the report. NG-RAN Node 3 sends the received RLF report or CEF report to NG-RAN Node 2 through Xn interface message. The Xn interface message may be FAILURE INDICATION, and/or ACCESS AND MOBILITY INDICATION, and/or a newly defined Xn message.

Operation 809b: NG-RAN Node 2 can determine that the corresponding failure occurs in the coverage of the cell for deactivation of NG-RAN Node 1 according to the location information carried in the received RLF report or CEF report; and determine that the corresponding failure occurs after NG-RAN Node 1 deactivates the cell according to the timestamp information carried in the received RLF report or CEF report. Based on this information, NG-RAN Node 2 can determine that the report is related to the cell for deactivation of NG-RAN Node 1. NG-RAN Node2 sends the received RLF report or CEF report to CU-CP of NG-RAN Node 1 through Xn interface message. The Xn interface message may be HANDOVER REPORT, and/or ACCESS AND MOBILITY INDICATION, and/or a newly defined Xn message.

Operation 810: if the UE successfully connects to NG-RAN Node 2, but the UE generates RACH report and/or Successful handover report during the connection establishment, the error information generated during the connection establishment is recorded in the report; or the UE fails to connect to NG-RAN Node 2, the UE reconnects to NG-RAN Node 2, and the UE generates RLF report or CEF report. The UE adds location information and/or timestamp information when the failure occurs to the report and sends it to NG-RAN Node 2 through RRC message.

NG-RAN Node 2 can determine that the corresponding failure occurs in the coverage of the cell for deactivation of NG-RAN Node 1 according to the location information carried in the information reported by the UE; and determine that the corresponding failure occurs after NG-RAN Node 1 deactivates the cell according to the timestamp information carried in the received information reported by the UE. Based on the above information, NG-RAN Node 2 can determine that the received information reported by the UE is related to the cell for deactivation of NG-RAN Node 1.

NG-RAN Node2 sends the received information reported by the UE to CU-CP of NG-RAN Node 1 through the Xn interface message. The Xn interface message may be ACCESS AND MOBILITY INDICATION, and/or a newly defined Xn message.

Operation 811: after the UE successfully handovers to NG-RAN Node 2, NG-RAN Node 2 can determine that the handover is caused by the cell deactivation of NG-RAN Node 1 according to the handover cause value. NG-RAN Node 2 collects the data requested by NG-RAN Node 1 in operation 808, such as QoS report and/or QoE report of UE, and/or measurement report of UE.

NG-RAN Node2 sends the collected data to CU-CP of NG-RAN Node 1 through Xn interface message. The Xn interface message may be ACCESS AND MOBILITY INDICATION, and/or a newly defined Xn message.

The collected data includes but is not limited to at least one of the following information:
cell ID of the current serving cell of the UE;
cell ID of the cell initiating mobility optimization;
UE ID;
measurement report of UE;
QoS report and/or QoE report of UE.

The cell ID may be PCI and/or CGI. The UE ID may be at least one of the following information: NG-RAN node UE XnAP ID of the UE before mobility optimization, NG-RAN node UE XnAP ID of the UE in the current serving cell, C-RNTI of the UE in the cell for deactivation, and C-RNTI of the UE in the current serving cell.

After deactivating a cell, CU-CP can also collect the load condition and/or energy usage condition of this access node and/or neighbor access nodes as shown in operations 801 to 806.

CU-CP collects other data to be collected in the second type of information.

The load condition and/or energy usage condition of the access node before and after deactivating the cell, optionally including the predicted value of load condition and/or energy usage condition, can be used to select the most suitable cell for deactivation. The load condition and/or energy usage condition of neighbor access nodes before and after deactivating the cell, optionally including the predicted values of load condition and/or energy usage condition, can be used to select an appropriate target access node for the UE being served by the selected cell for deactivation.

NG-RAN Node 1 can determine whether deactivating the cell is a correct decision according to the above collected data, and can also use the above collected data to train the AI model.

The above process can be repeated to produce a better AI model.

Embodiment 7 describes the case where the AI model is deployed to NG-RAN Node in the 5G network, collects data and generates output parameters. CU-CP, CU-UP and DU belong to NG-RAN Node 1.

Figure 12:
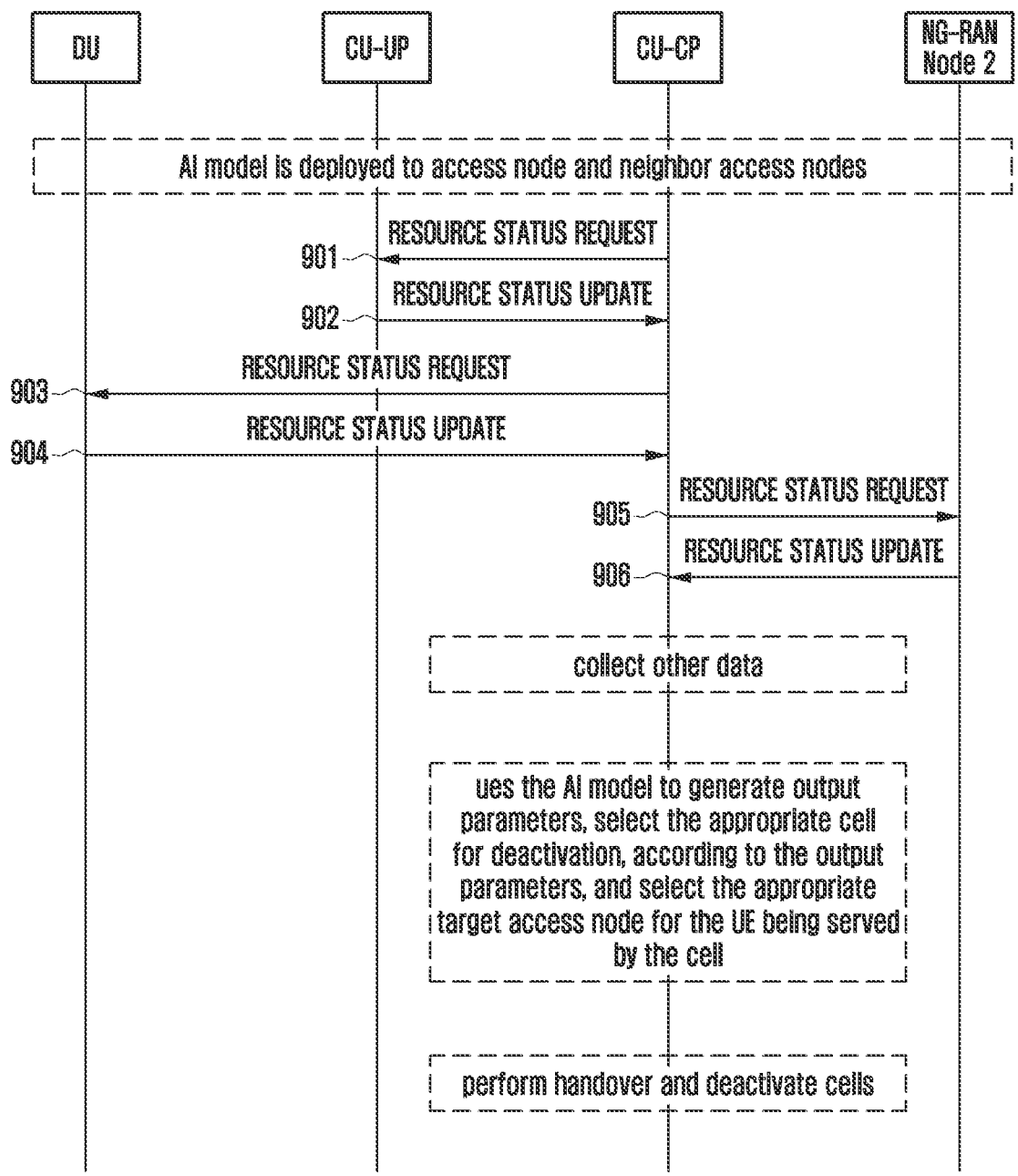
FIG. 12 schematically illustrates embodiment 7 according to an embodiment of the disclosure.

FIG. 12 is a schematic diagram of embodiment 7 according to an embodiment of the disclosure, including the following operations:

The AI model is deployed to an access nodes and neighbor access nodes. The access node is composed of CU-CP, CU-UP and DU. The AI model deployed on CU-CP is used to determine whether a cell needs to be deactivated to achieve energy-saving effect, and to select an appropriate target access node for the UE being served by the cell. AI models deployed on CU-UP and/or DU are used to generate predicted values of load condition and/or energy usage condition.

Operations 901 to 906 are the same as operations 801 to 806 in the last embodiment.

CU-CP collects other data to be collected in the first type of information.

CU-CP takes the collected data as the input parameters of the AI model deployed on CU-CP, and uses the AI model to generate output parameters. The output parameters include but are not limited to: an appropriate cell for deactivation and an appropriate target access node of the UE being served by the cell.

CU-CP performs the handover procedure according to the output parameters, and then deactivates the cell, so as to achieve the energy-saving effect.

Embodiment 8 describes a case where an entity in a wireless communication system sends AI model deployment related information to another entity. The first node may be a core network entity, such as AMF or SMF or MME, or an access node, such as NG-RAN node or eNB, or CU-CP of the access node. The second node may be an access node, such as NG-RAN node or eNB, or CU-CP or CU-UP or DU of the access node.

Figure 13:
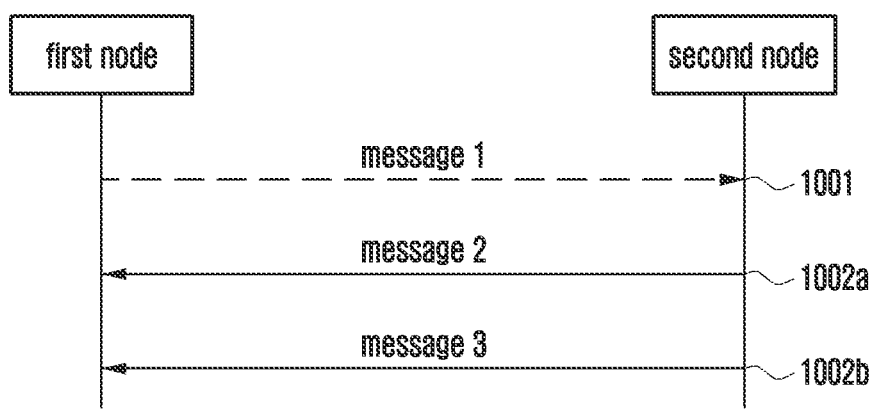
FIG. 13 schematically illustrates embodiment 8 according to an embodiment of the disclosure.

FIG. 13 is a schematic diagram of embodiment 8 according to an embodiment of the disclosure, including the following operations:

Operation 1001: the first node sends a message 1 to the second node. The message 1 carries AI model deployment related information.

The information of the AI model includes but is not limited to at least one of the following information:
  index/identity of AI model;
  name of AI model;
  purpose of AI model;
  indication information, which is used to identify that this is a complete or partial update to the existing AI model;
  container carrying the AI model;
  model transfer serial number, which is used to identify the model transfer;
  model type, which is used to represent the model type of machine learning. This type can include, but is not limited to, perceptron, feedforward neural network, radial basis network, deep feedforward network, recurrent neural network, long/short-term memory network, gated recurrent unit, auto encoder, and variational auto encoder, denoising auto encoder, sparse auto encoder, Markov chain, Hopfield network, Boltzmann machine, restricted Boltzmann machine, deep belief network, deep convolutional network, deconvolutional network, deep convolutional inverse graphics network, generative adversarial network, liquid state machine, extreme learning machine, echo state network, deep residual network, Kohonen network, support vector machine, neural turing machine, convolutional neural network, artificial neural network, recurrent neural network, deep neural network, etc.; characteristic parameters of AI model;
  training entity information, including but not limited to: ID and name of training entity;
  model download address: used to represent the model download address, including but not limited to at least one of the following information: address and/or port and/or protocol of the download server, URL address.

The characteristic parameters of the AI model include but are not limited to at least one of the following information:
  the number of layers, which is used to represent the number of layers of the neural network;
  the number of neurons in each layer, which is used to represent the number of neurons in each layer of the neural network;
  weight, which is used to represent the weight of a neuron in the neural network.
  model input, which is used to represent the input parameter type and order of the network. For example, it is represented by n*m bits, each n bits represents a parameter, a total of m parameters, and the input order is the same as the bit representation order. Based on the mapping relationship between n bits and parameters, the parameters and the input order of parameters can be inferred;
  model output, which is used to represent the output parameter type and order of the network. For example, it is represented by n*m bits, each n bits represents a parameter, a total of m parameters, and the output order is the same as the bit representation order. Based on the mapping relationship between n bits and parameters, the parameters and the output order of parameters can be inferred;
  preprocessing matrix for preprocessing the collected data for input into the model;
  post-processing matrix for processing model input parameters for use in the communication network;
  feedback type, which is used to indicate the feedback type after receiving the network, such as feedback weight, feedback data, feedback updated model, etc.

Operation 1002a: if the second node accepts and successfully deploys the AI model described in message 1, the second node sends message 2 to the first node, indicating that the deployment is successful.

Operation 1002b: if the second node does not accept or fails to deploy the AI model described in message 1, the second node sends message 3 to the first node, indicating that the deployment fails.

Operations 1002a and 1002b are not necessary.

If the first node successfully deploys the AI model, the first node can use the AI model, for example, carry out reasonable self optimization according to the output parameters of the AI model to improve the user experience.

Embodiment 9 describes the case where CU-CP in the 5G network deploys the AI model to CU-UP and DU.

Figure 14:
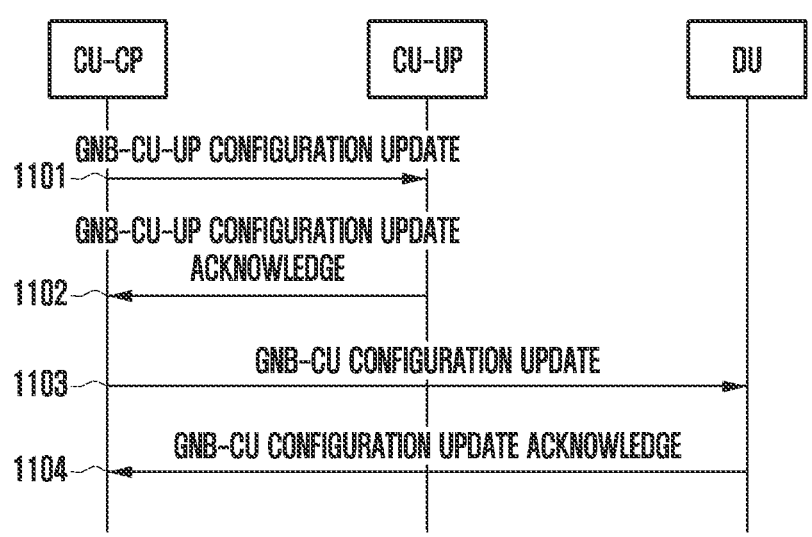
FIG. 14 schematically illustrates embodiment 9 according to an embodiment of the disclosure.

FIG. 14 is a schematic diagram of embodiment 9 according to an embodiment of the disclosure, including the following operations:

Operation 1101: CU-CP sends GNB-CU-CP CONFIGURATION UPDATE to CU-UP. The message carries AI model deployment related information.

The information of the AI model includes but is not limited to at least one of the following information:
  index/identity of AI model;
  name of AI model;
  purpose of AI model;
  indication information, which is used to identify that this is a complete or partial update to the existing AI model;
  container carrying the AI model;
  model transfer serial number, which is used to identify the model transfer;
  model type, which is used to represent the model type of machine learning. This type can include, but is not limited to, perceptron, feedforward neural network, radial basis network, deep feedforward network, recurrent neural network, long/short-term memory network, gated recurrent unit, auto encoder, and variational auto encoder, denoising auto encoder, sparse auto encoder, Markov chain, Hopfield network, Boltzmann machine, restricted Boltzmann machine, deep belief network, deep convolutional network, deconvolutional network, deep convolutional inverse graphics network, generative adversarial network, liquid state machine, extreme learning machine, echo state network, deep residual network, Kohonen network, support vector machine, neural turing machine, convolutional neural network, artificial neural network, recurrent neural network, deep neural network, etc.; characteristic parameters of AI model;
  training entity information, including but not limited to: ID and name of training entity;
  model download address: used to represent the model download address, including but not limited to at least one of the following information: address and/or port and/or protocol of the download server, URL address.

The characteristic parameters of the AI model include but are not limited to at least one of the following information:
  the number of layers, which is used to represent the number of layers of the neural network;
  the number of neurons in each layer, which is used to represent the number of neurons in each layer of the neural network;
  weight, which is used to represent the weight of a neuron in the neural network.
  model input, which is used to represent the input parameter type and order of the network. For example, it is represented by n*m bits, each n bits represents a parameter, a total of m parameters, and the input order is the same as the bit representation order. Based on the mapping relationship between n bits and parameters, the parameters and the input order of parameters can be inferred;
  model output, which is used to represent the output parameter type and order of the network. For example, it is represented by n*m bits, each n bits represents a parameter, a total of m parameters, and the output order is the same as the bit representation order. Based on the mapping relationship between n bits and parameters, the parameters and the output order of parameters can be inferred;
  preprocessing matrix for preprocessing the collected data for input into the model;
  post-processing matrix for processing model input parameters for use in the communication network;
  feedback type, which is used to indicate the feedback type after receiving the network, such as feedback weight, feedback data, feedback updated model, etc.

Operation 1102: CU-UP can read the AI model to be deployed on CU-UP from the container of the AI model carried in the last message, or download the AI model to be deployed on CU-UP according to the information of the model download address in the last message.

CU-UP successfully deployed the AI model according to other parameters in the last message.

CU-UP sends GNB-CU-CP CONFIGURATION UPDATE ACKNOWLEDGE to CU-CP, indicating that the AI model is successfully deployed on CU-UP.

Operation 1103: CU-CP sends GNB-CU CONFIGURATION UPDATE to DU. The message carries AI model deployment related information.

Operation 1104: DU can read the AI model to be deployed on the DU from the container of the AI model carried in the last message, or download the AI model to be deployed on the DU according to the information of the model download address in the last message.

The DU successfully deployed the AI model according to other parameters in the last message.

The DU sends GNB-CU CONFIGURATION UPDATE ACKNOWLEDGE to CU-CP, indicating that the AI model is successfully deployed on the DU.

Embodiment 10 describes the case where NG-RAN Node in the 5G network collects data for training the AI model. The AI model can be used to select UE that needs mobility optimization, determine optimization events, and select appropriate target nodes. The optimization event may be handover, adding or changing SN. CU-CP, CU-UP and DU belong to NG-RAN Node 1.

Figure 15:
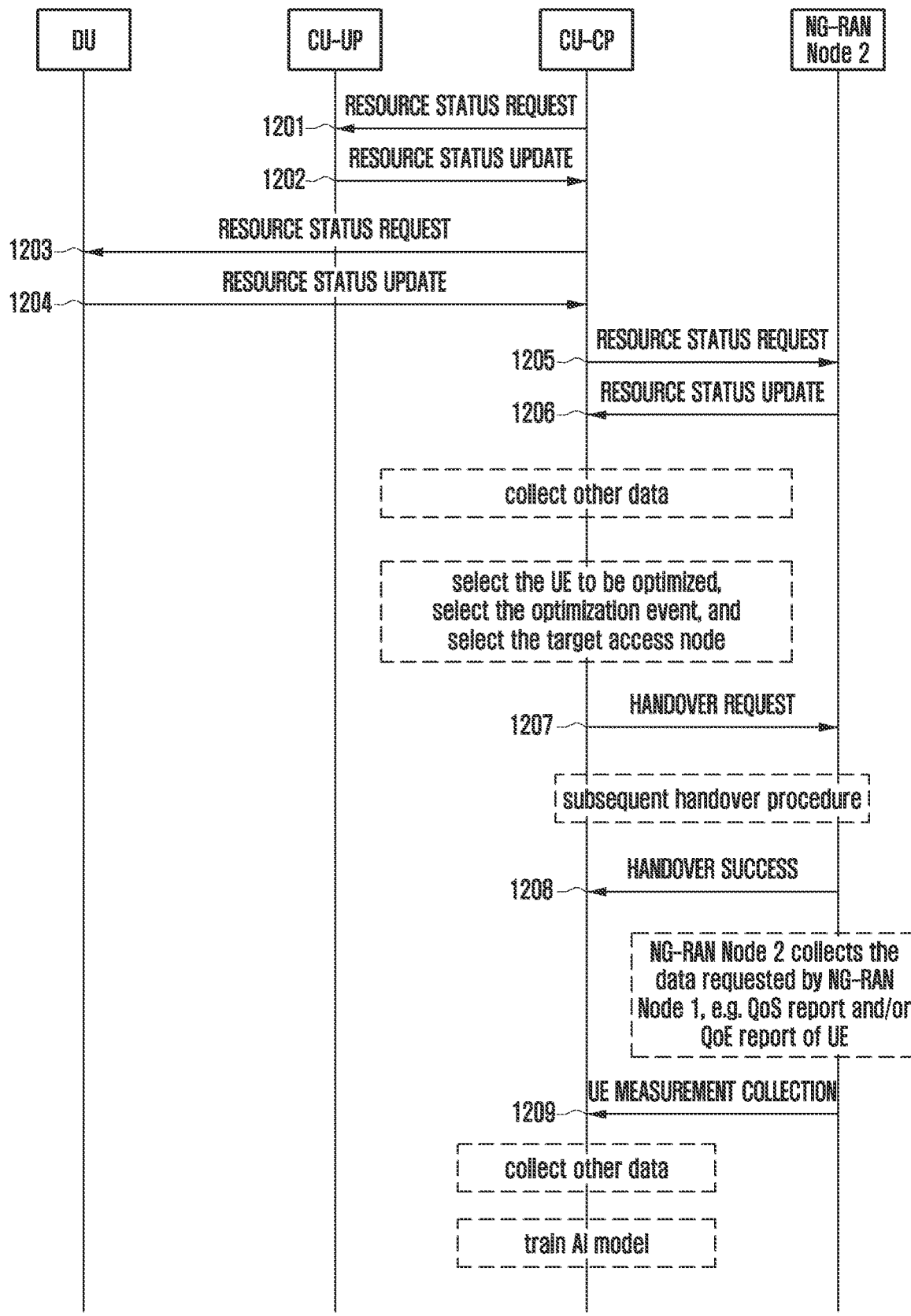
FIG. 15 schematically illustrates embodiment 10 according to an embodiment of the disclosure.

FIG. 15 is a schematic diagram of embodiment 10 according to an embodiment of the disclosure, including the following operations:

Operation 1201: CU-CP requests CU-UP to report the load condition, optionally, and the predicted value of the load condition through the E1 interface message, optionally, including the reliability of the predicted value. The E1 interface message can be RESOURCE STATUS REQUEST and/or a newly defined E1 message. The message carries the type of information requested to be reported by CU-UP and/or the period of the report. The type of the information may be at least one of the following: the load condition of CU-UP, the predicted value of the load condition, and optionally, including the reliability of the predicted value.

Operation 1202: CU-UP reports the data requested to be reported by CU-UP in the last operation through E1 interface message. The E1 interface message may be RESOURCE STATUS UPDATE and/or a newly defined E1 message. The message carries the information reported by CU-UP. The information may be at least one of the following information: load condition of CU-UP, predicted value of load condition, optionally, including reliability of the predicted value.

Operation 1203: CU-CP requests DU to report the load condition through the F1 interface message, optionally, and the predicted value of the load condition, optionally, including the reliability of the predicted value. The F1 interface message can be RESOURCE STATUS REQUEST and/or a newly defined F1 message. The message carries the type of information requested to be reported by DU and/or the period of the report. The type of the information may be at least one of the following: the load condition of DU, the predicted value of the load condition, and optionally, including the reliability of the predicted value.

Operation 1204: DU reports the data requested to be reported by DU in the last operation through F1 interface message. The F1 interface message may be RESOURCE STATUS UPDATE and/or a newly defined F1 message. The message carries the information reported by DU. The information may be at least one of the following information: the load condition of DU, the predicted value of the load condition, and optionally, including the reliability of the predicted value.

Operation 1205: CU-CP requests the neighbor access node (taking NG-RAN Node 2 as an example) to report the load condition, optionally, and the predicted value of the load condition through the Xn interface message, optionally, including the reliability of the predicted value. The Xn interface message may be RESOURCE STATUS REQUEST and/or a newly defined Xn message. The message carries the type of information requested to be reported by NG-RAN Node 2 and/or the period of the report. The type of the information may be at least one of the following: the load condition of NG-RAN Node 2, the predicted value of the load condition, and optionally, including the reliability of the predicted value.

Operation 1206: NG-RAN Node 2 reports the data requested in the last operation through Xn interface message. The Xn interface message may be RESOURCE STATUS UPDATE and/or a newly defined Xn message. The message carries the information reported by NG-RAN Node 2. The information may be at least one of the following information: the load condition of NG-RAN Node 2, the predicted value of the load condition, and optionally, including the reliability of the predicted value.

CU-CP collects other data to be collected in the first type of information, such as the measurement report of the UE served by NG-RAN Node1, the QoS report and/or QoE report of the UE, and the ID of the beam serving the UE.

The measurement report, QoS report and/or QoE report of the UE can be used to select the UE that needs mobility optimization. The load condition of the access node and/or neighbor access nodes, optionally including the predicted value of the load condition, can be used to determine the optimization event and the appropriate target access node. The measurement report of UE can be used to determine the appropriate target access node.

CU-CP selects a UE that needs mobility optimization according to the collected data, determines the mobility optimization event, and selects an appropriate target access node for the UE. Optionally, it includes selecting the optimal beam of the UE on the target access node. In this embodiment, NG-RAN Node 2 is selected as the appropriate target access node.

Wherein the UE that needs mobility optimization, and/or the mobility optimization event selected for the UE, and/or the appropriate target access node selected for the UE, optionally including the optimal beam for the UE on the target access node, can be generated by an AI model, for example, an AI model deployed on CU-CP.

Operation 1207: if CU-CP determines that the mobility optimization event is handover, CU-CP initiates a handover procedure to NG-RAN Node 2. The handover procedure can be a handover procedure based on Xn interface or Ng interface. This embodiment is a handover procedure based on Xn interface.

HANDOVER REQUEST message can carry information that requests NG-RAN Node 2 to report the collected data. The information can also be carried by other Xn interface message, such as a newly defined Xn interface message. Wherein the information may be at least one of the following information:
  start or stop reporting;
  reporting mode, which can be periodic or aperiodic;
  length of period;
  number of reports;
  designated time period, which can be the start time and end time, or the start time and/or the length of a time period;
  type of data requested to be collected, which can be at least one of the second type of information in the aforementioned data to be collected, such as the measurement report of the UE, the QoS report and/or QoE report of the UE, and the information reported by the UE.

The information reported by UE is collected according to the existing mechanism.

HANDOVER REQUEST message can also carry the beam ID used by the UE before handover, including but not limited to SSB index.

HANDOVER REQUEST message can also carry ID of the optimal beam of the UE on the target access node after handover, including but not limited to SSB index. The target access node can configure the optimal beam on the target access node after the handover for the UE, or configure other beams.

If the handover procedure is a handover procedure based on the Ng interface, the Ng messages HANDOVER REQUIRED and HANDOVER REQUEST can also carry the beam ID used by the UE before handover, including but not limited to SSB index.

The Ng messages HANDOVER REQUIRED and HANDOVER REQUEST can also carry ID of the optimal beam of the UE on the target access node after handover, including but not limited to SSB index. The target access node can configure the optimal beam on the target access node after the handover for the UE, or configure other beams.

If CU-CP determines that the mobility optimization event is an SN addition or change initiated by the MN, NG-RAN Node 1 acts as MN and NG-RAN Node 2 acts as the SN. CU-CP initiates SN addition procedure to NG-RAN Node 2.

S-NODE ADDITION REQUEST message can carry information that requests NG-RAN Node 2 to report the collected data. The information can also be carried by other Xn interface message, such as a newly defined Xn interface message. Wherein the information may be at least one of the following information:
  start or stop reporting;
  reporting mode, which can be periodic or aperiodic;
  length of period;
  number of reports;
  designated time period, which can be the start time and end time, or the start time and/or the length of a time period;
  type of data requested to be collected, which can be at least one of the second type of information in the aforementioned data to be collected, such as the measurement report of the UE, the QoS report and/or QoE report of the UE, and the information reported by the UE.

The information reported by UE is collected according to the existing mechanism.

S-NODE ADDITION REQUEST message can also carry the beam ID used by the UE before adding or changing SN.

The beam ID used by the UE before adding or changing the SN includes but is not limited to at least one of the following information:
  beam ID used by UE on MN before adding or changing SN;
  beam ID used by the UE on the last SN before changing the SN.

The beam ID includes but is not limited to SSB index.

S-NODE ADDITION REQUEST message can also carry the ID of the optimal beam on the target access node after the UE adds or changes SN, including but not limited to SSB index. The target access node can configure the optimal beam on the target access node after the handover for the UE, or configure other beams.

If the target access node is composed of CU-CP, CU-UP and DU, or CU and DU, CU-CP or CU of the target access node can send the ID of the optimal beam of the UE on the target access node to DU through the F1 interface message. The F1 interface message may be UE CONTEXT SETUP REQUEST.

The ID of the beam may be SSB index.

Operation 1208: if CU-CP determines that the mobility optimization event is handover, NG-RAN Node 2 sends HANDOVER SUCCESS to CU-CP to indicate that the handover is successful. The message can also carry the beam ID used by the UE after handover, including but not limited to SSB index.

The beam ID can also be carried in UE CONTEXT RELEASE.

If the handover procedure is a handover procedure based on the Ng interface, the Ng message HANDOVER NOTIFY and/or HANDOVER SUCCESS and/or UE CONTEXT RELEASE COMMAND can also carry the beam ID used by the UE after the handover, including but not limited to SSB index.

If CU-CP determines that the mobility optimization event is SN addition or change initiated by MN, NG-RAN Node 1 acts as the MN and NG-RAN Node 2 acts as the SN. NG-RAN Node 2 sends S-NODE ADDITION REQUEST ACKNOWLEDGE to CU-CP.

Operation 1209: after the UE successfully connects to NG-RAN Node 2, NG-RAN Node 2 collects the data requested by NG-RAN Node 1 in operation 1207, such as the QoS report and/or QoE report of the UE, and/or the measurement report of the UE.

NG-RAN Node2 sends the collected data to CU-CP of NG-RAN Node 1 through Xn interface message. The Xn interface message may be a newly defined Xn message, such as UE MEASUREMENT COLLECTION, and/or existing Xn message, such as ACCESS AND MOBILITY INDICATION.

The message includes but is not limited to at least one of the following information:
- cell ID of the current serving cell of the UE;
- cell ID of the cell initiating mobility optimization;
- UE ID;
- beam ID used by the UE after mobility optimization, including but not limited to SSB index;
- measurement report of UE;
- QoS report and/or QoE report of UE.

The cell ID may be PCI and/or CGI. The UE ID may be at least one of the following information: NG-RAN node UE XnAP ID of the UE before mobility optimization, NG-RAN node UE XnAP ID of the UE in the current serving cell, C-RNTI of the UE in the cell for deactivation, and C-RNTI of the UE in the current serving cell.

CU-CP can also collect the load condition of this access node and/or neighbor access nodes as shown in operations 1201 to 1206.

CU-CP collects other data to be collected in the second type of information.

The above data collected after mobility optimization can be used to determine whether the selected UE really needs mobility optimization, whether the correct mobility optimization event is selected, whether the appropriate target access node is selected, and whether the optimal beam of the UE on the target access node is selected.

NG-RAN Node 1 can determine whether the mobility optimization of the selected UE is a correct decision according to the above collected data, and can also use the above collected data to train the AI model.

The above process can be repeated to produce a better AI model.

Embodiment 11 describes the case where NG-RAN Node in the 5G network collects data for training the AI model. The AI model can be used to select UE that needs mobility optimization, determine optimization events, and select appropriate target nodes. The optimization event may be to SN change. CU-CP, CU-UP and DU belong to NG-RAN Node 1.

Figure 16:
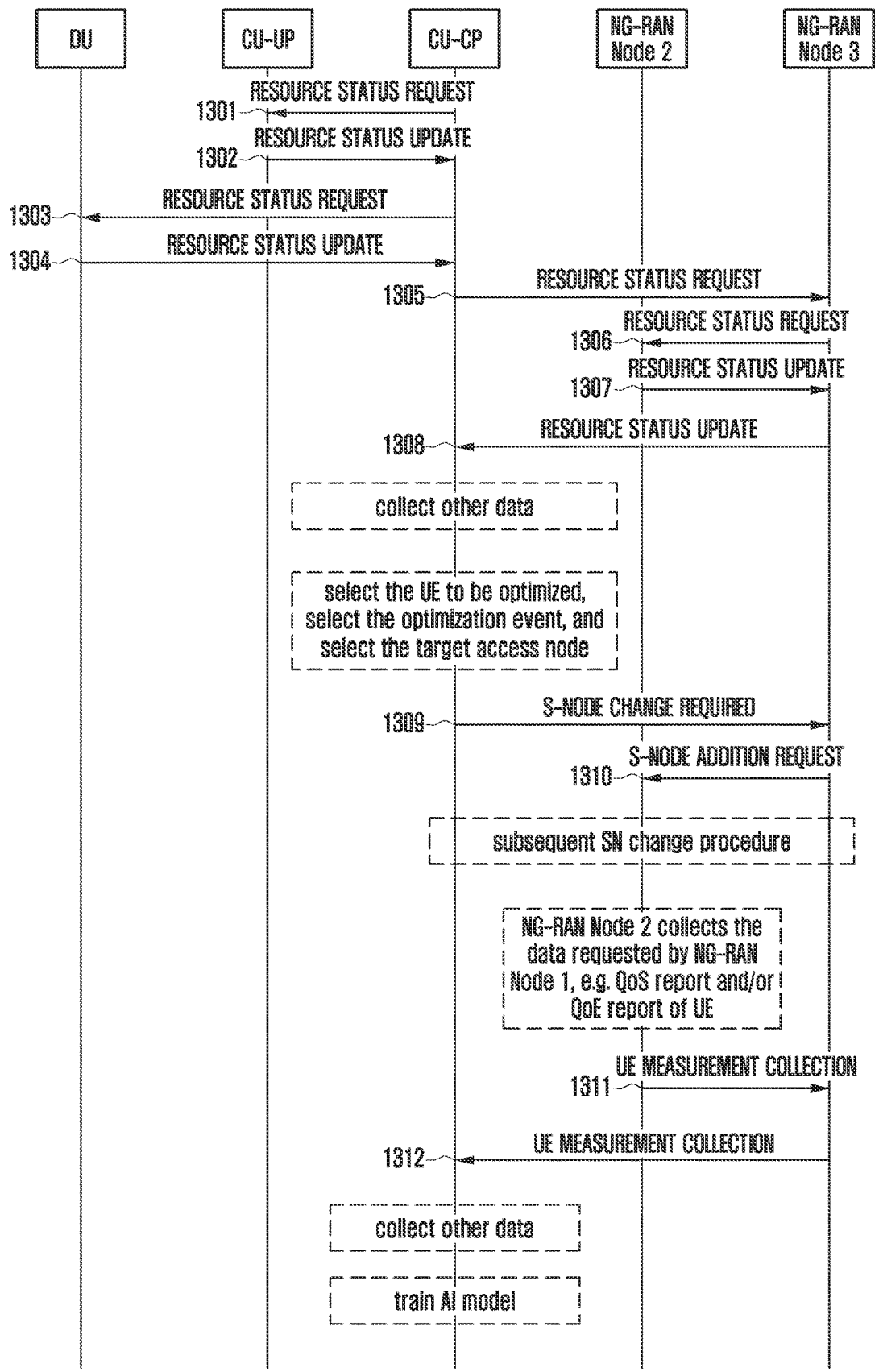
FIG. 16 schematically illustrates embodiment 11 according to an embodiment of the disclosure.

FIG. 16 is a schematic diagram of embodiment 11 according to an embodiment of the disclosure, including the following operations:

Operation 1301: CU-CP requests CU-UP to report the load condition, optionally, and the predicted value of the load condition through the E1 interface message, optionally, including the reliability of the predicted value. The E1 interface message can be RESOURCE STATUS REQUEST and/or a newly defined E1 message. The message carries the type of information requested to be reported by CU-UP and/or the period of the report. The type of the information may be at least one of the following: the load condition of CU-UP, the predicted value of the load condition, and optionally, including the reliability of the predicted value.

Operation 1302: CU-UP reports the data requested to be reported by CU-CP in the last operation through E1 interface message. The E1 interface message may be RESOURCE STATUS UPDATE and/or a newly defined E1 message. The message carries the information reported by CU-UP. The information may be at least one of the following information: load condition of CU-UP, predicted value of load condition, optionally, including reliability of the predicted value.

Operation 1303: CU-CP requests DU to report the load condition through the F1 interface message, optionally, and the predicted value of the load condition, optionally, including the reliability of the predicted value. The F1 interface message can be RESOURCE STATUS REQUEST and/or a newly defined F1 message. The message carries the type of information requested to be reported by DU and/or the period of the report. The type of the information may be at least one of the following: the load condition of DU, the predicted value of the load condition, and optionally, including the reliability of the predicted value.

Operation 1304: DU reports the data requested to be reported by DU in the last operation through F1 interface message. The F1 interface message may be RESOURCE STATUS UPDATE and/or a newly defined F1 message. The message carries the information reported by DU. The information may be at least one of the following information: the load condition of DU, the predicted value of the load condition, and optionally, including the reliability of the predicted value.

Operation 1305: CU-CP requests the neighbor access node (taking NG-RAN Node 2 as an example) to report the load condition, optionally, and the predicted value of the load condition, optionally, including the reliability of the predicted value.

If there is no Xn interface between NG-RAN Node 2 and NG-RAN Node 1, CU-CP can send the request to MN through Xn interface message, and MN then sends the request to NG-RAN Node 2 through Xn interface message.

The Xn interface message used can be RESOURCE STATUS REQUEST and/or a newly defined Xn message. The message carries at least one of the following information:
- node ID of the access node initiating the request;
- node ID of the access node requested to report;
- a list of cells which is requested to report, including one or more cell IDs;
- a list of beams which is requested to report, including one or more beam IDs;
- a list of network slices requested to be reported, including one or more network slice IDs, which may include PLMN, and/or S-NSSAI;
- type of information that is requested to be reported by NG-RAN Node 2, and/or the period of the report.

The type of the information may be at least one of the following: the load condition of NG-RAN Node 2, the predicted value of the load condition, and optionally, including the reliability of the predicted value.

Operation 1306: MN determines that the message should be sent to NG-RAN Node 2 according to the node ID of the access node requested to report carried by the message in the last operation. MN uses the Xn interface message to send the information carried in the message in the last operation to NG-RAN Node 2.

The Xn interface message used can be RESOURCE STATUS REQUEST and/or a newly defined Xn message.

Operation 1307: NG-RAN Node 2 reports the data requested to be reported in the last operation through the Xn interface message. The Xn interface message may be RESOURCE STATUS UPDATE and/or a newly defined Xn message. The message carries the information reported by NG-RAN Node 2. The information may be at least one of the following information: the node ID of the access node initiating the request, the node ID of the access node requested to report, the load condition of NG-RAN Node 2, the predicted value of the load condition, and optionally, including the reliability of the predicted value.

Operation 1308: MN determines that the message should be sent to NG-RAN Node 1 according to the node ID of the access node initiating the request carried by the message in the last operation. MN uses the Xn interface message to send the information carried in the message in the last operation to NG-RAN Node 1.

The Xn interface message used can be RESOURCE STATUS UPDATE and/or a newly defined Xn message.

CU-CP collects other data to be collected in the first type of information, such as the measurement report of the UE, the QoS report and/or QoE report of the UE, and the ID of the beam serving the UE.

The measurement report, QoS report and/or QoE report of the UE can be used to select the UE that needs mobility optimization. The load condition of the access node and/or neighbor access nodes, optionally including the predicted value of the load condition, can be used to determine the optimization event and the appropriate target access node. The measurement report of UE can be used to determine the appropriate target access node.

CU-CP selects a UE that needs mobility optimization according to the collected data, determines the mobility optimization event, and selects an appropriate target access node for the UE, Optionally, including the optimal beam of the UE on the target access node.

Wherein the UE that needs mobility optimization, and/or the mobility optimization event selected for the UE, and/or the appropriate target access node selected for the UE, and/or the optimal beam of the UE on the target access node can be generated by an AI model, for example, the AI model deployed on CU-CP.

In this embodiment, CU-CP determines that the mobility optimization event is SN change initiated by SN, and NG-RAN Node 2 is selected as the appropriate target access node.

Operation 1309: CU-CP initiates SN initiated SN change procedure to NG-RAN Node 3. CU-CP sends S-NODE CHANGE REQUIRED message to NG-RAN Node 3.

The message may carry information to request NG-RAN Node 2 to report the collected data. The information can also be carried by other Xn interface message, such as newly defined Xn interface message. Wherein the information may be at least one of the following information:
- node ID of the access node initiating the request;
- node ID of the access node requested to report;
- start or stop reporting;
- reporting mode, which can be periodic or aperiodic;
- length of period;
- number of reports;
- designated time period, which can be the start time and end time, or the start time and/or the length of a time period;
- type of data requested to be collected, which can be at least one of the second type of information in the aforementioned data to be collected, such as the measurement report of the UE, the QoS report and/or QoE report of the UE, and the information reported by the UE.

The information reported by UE is collected according to the existing mechanism.

The message can also carry the beam ID used by the UE in NG-RAN Node 1 before mobility optimization, including but not limited to SSB index.

The message can also carry ID of the optimal beam of the UE on the target access node after mobility optimization, including but not limited to SSB index. The target access node can configure the optimal beam on the target access node after the mobility optimization for the UE, or configure other beams.

Operation 1310: NG-RAN Node 3 sends S-NODE ADDITION REQUEST message to NG-RAN Node 2.

The message may carry the information carried in the last message. The message can also carry the beam ID used by the UE in NG-RAN Node 3 before mobility optimization, including but not limited to SSB index.

Operation 1311: after the UE successfully connects to NG-RAN Node 2, NG-RAN Node 2 collects the data requested by NG-RAN Node 3 in operation 1309, such as the QoS report and/or QoE report of the UE, and/or the measurement report of the UE.

NG-RAN Node2 can send the collected data to MN through Xn message, and MN sends the collected data to NG-RAN Node 3 through Xn message. Operation 1312: NG-RAN Node 3 sends the received collected data to CU-CP.

The Xn interface message may be newly defined Xn message, such as UE MEASUREMENT COLLECTION, and/or an existing Xn message, such as ACCESS AND MOBILITY INDICATION.

The message includes but is not limited to at least one of the following information:
- node ID of the access node initiating mobility optimization;
- node ID of the access node currently serving the UE;
- cell ID of the current serving cell of the UE;
- cell ID of the cell initiating mobility optimization;
- UE ID;
- beam ID used by the UE after mobility optimization, including but not limited to SSB index;
- measurement report of UE;
- QoS report and/or QoE report of UE.

The cell ID may be PCI and/or CGI. The UE ID may be at least one of the following information: NG-RAN node UE XnAP ID of the UE before mobility optimization, NG-RAN node UE XnAP ID of the UE in the current serving cell, C-RNTI of the UE in the cell for deactivation, and C-RNTI of the UE in the current serving cell.

CU-CP can also collect the load condition of this access node and/or neighbor access nodes as shown in operations 1301 to 1308.

CU-CP collects other data to be collected in the second type of information.

The above data collected after mobility optimization can be used to determine whether the selected UE really needs mobility optimization, whether the correct mobility optimization event is selected, and whether the appropriate target access node is selected.

The beam ID used by the UE collected before and after the mobility optimization can be used to determine whether the beam configured to the UE after the mobility optimization is appropriate.

NG-RAN Node 1 can determine whether the mobility optimization of the selected UE is a correct decision according to the above collected data, and can also use the above collected data to train the AI model.

The above process can be repeated to produce a better AI model.

Embodiment 12 describes the case where the AI model is deployed to NG-RAN Node in the 5G network, collects data and generates output parameters. CU-CP, CU-UP and DU belong to NG-RAN Node 1.

Figure 17:
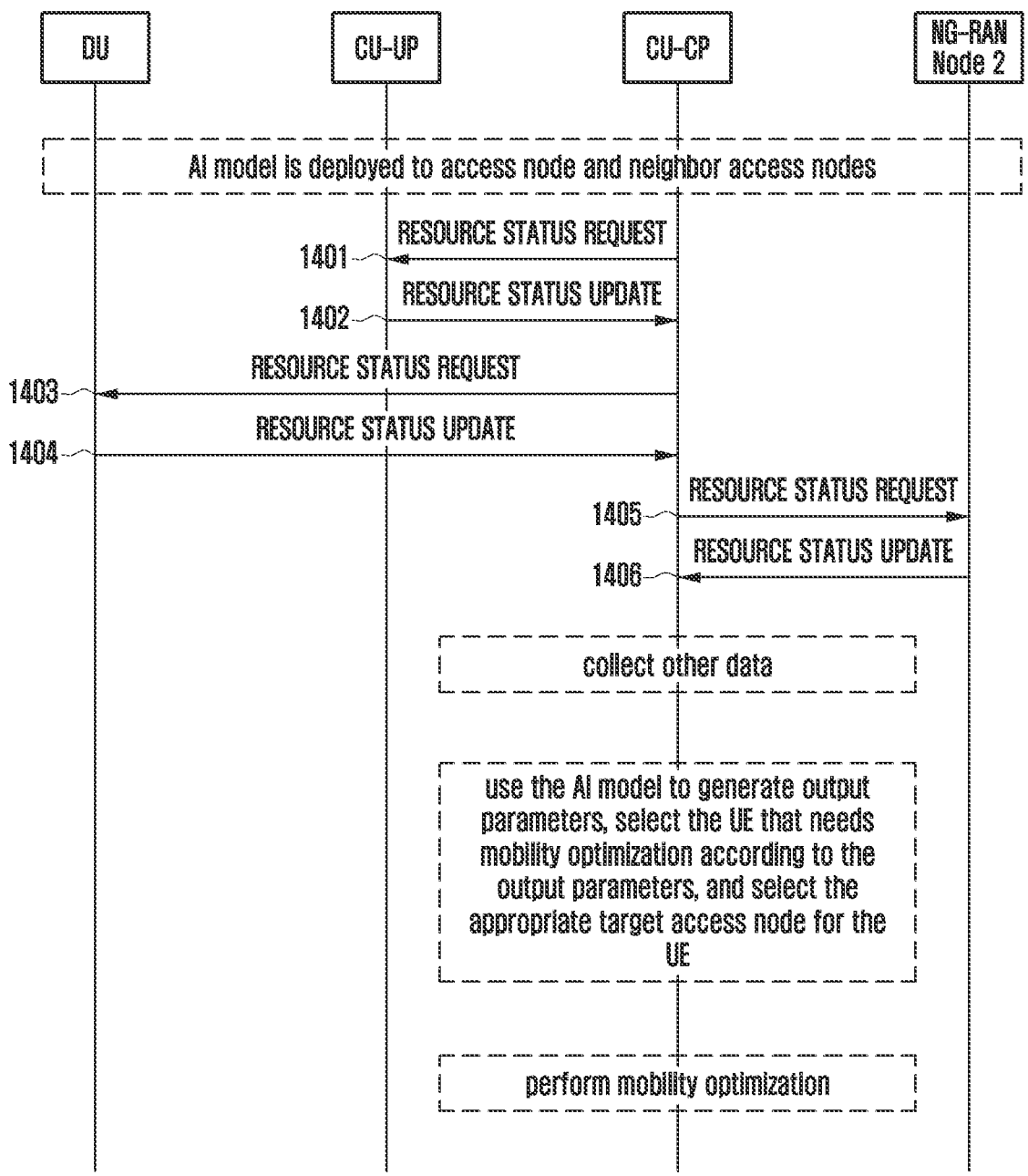
FIG. 17 schematically illustrates embodiment 12 according to an embodiment of the disclosure.

FIG. 17 is a schematic diagram of embodiment 12 according to an embodiment of the disclosure, including the following operations:

The AI model is deployed to an access node and neighbor access nodes. The access node is composed of CU-CP, CU-UP and DU. The AI model deployed on CU-CP is used to determine whether there is a UE that needs mobility optimization, and to select mobility optimization events and appropriate target access nodes for the UE. AI models deployed on CU-UP and/or DU are used to generate predicted values of load condition.

Operations 1401 to 1406 are the same as operations 1201 to 1206 in embodiment 10.

If NG-RAN Node 1 is SN in a dual connectivity scenario, operations 1305 to 1308 in the previous embodiment may also be included.

CU-CP collects other data to be collected in the first type of information, such as the measurement report of the UE, the QoS report and/or QoE report of the UE, and the ID of the beam serving the UE. If NG-RAN Node 1 is SN in a dual connectivity scenario, it can also include ID of the beam serving the UE in the MN.

CU-CP takes the collected data as the input parameters of the AI model deployed on CU-CP, and uses the AI model to generate output parameters. The output parameters include but are not limited to at least one of the following information: UE that needs mobility optimization, appropriate mobility optimization events, appropriate target access node of the UE, optionally, including the optimal beam of the UE on the target access node.

CU-CP performs the mobility optimization event according to the output parameters, so as to optimize the user experience and improve the quality of service.

Embodiment 13 describes a case where an access node in a 5G network acquires data from NWDAF.

Figure 18:
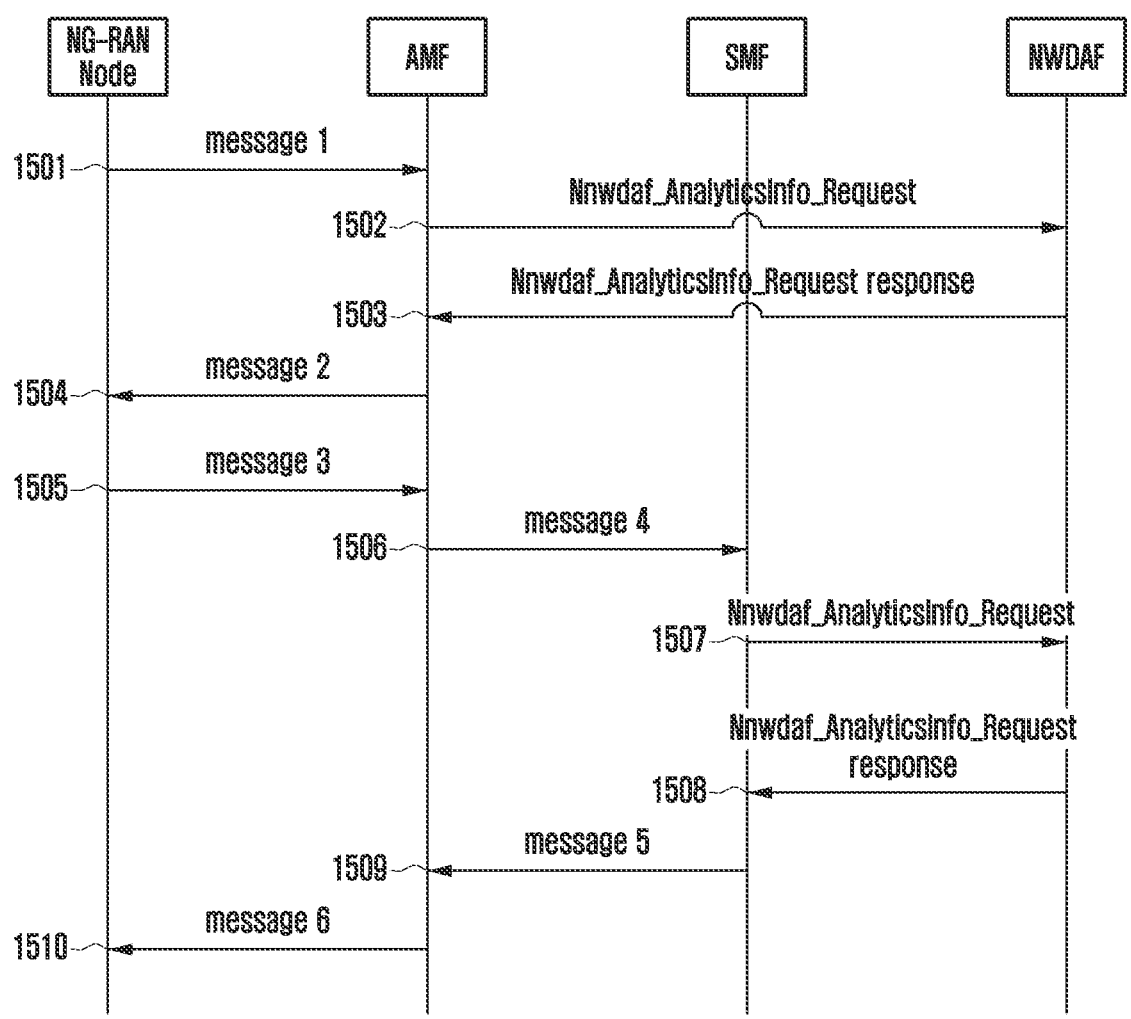
FIG. 18 schematically illustrates embodiment 13 according to an embodiment of the disclosure.

FIG. 18 is a schematic diagram of embodiment 13 according to an embodiment of the disclosure, including the following operations:

The access node can use a method to obtain data from NWDAF, as shown in operations 1501 to 1504.

Operation 1501: the access node sends a request to collect data to the AMF through message 1. The message 1 may be a newly defined Ng message.

The message carries at least one of the following information:

UE ID, the UE ID is AMF UE NGAP ID and/or RAN UE NGAP ID;

network slice ID;

time length, which can be the start time and end time, or the start time and/or the length of a time period;

area information, which can be one or a group of cell lists, or one or a group of TAC or TAI lists;

the type of prediction information requested, including but not limited to at least one of the following information: uplink and downlink rate of UE;

information of whether to report periodically. If it is a periodic report, it also includes the length of the period;

Operation 1502: AMF sends Nnwdaf_AnalyticsInfo_Request message to NWDAF, which carries at least one of the following information:

Analysis ID, whose value is "UE communication";

Target of Analytics Reporting, which can be Subscription Permanent Identifier (SUPI) of the UE, wherein the SUPI corresponds to the UE ID carried in the message 1 of the last operation;

Analysis target period, which can be the same as or derived from the time length carried in message 1 in the last operation;

At least one information carried in message 1 of the last operation.

Operation 1503: NWDAF takes the information carried in the received message as an input parameter to generate an output parameter. The output parameter may be UE Communication Predictions, representing prediction information for the specified UE. The information includes but is not limited to at least one of the following information:

UE ID, which can be the same as Analytics ID in the input parameter;

an information indicating whether the predicted information is periodic;

period information, indicating the length of the period;

start time, indicating the start time of prediction;

time length, indicating the duration of prediction;

traffic characteristics, indicating some restrictions of prediction information, such as IDs of relevant network slices;

predicted uplink and downlink rate of the UE;

reliability of prediction;

Timestamp information.

NWDAF sends Nnwdaf_AnalyticsInfo_Request response message to AMF, which includes prediction information of the specified UE.

Operation 1504: the AMF sends the collected data to the access node through message 2. The message 2 may be a newly defined Ng message.

The message carries at least one of the following information:

UE ID, the UE ID is AMF UE NGAP ID and/or RAN UE NGAP ID;

network slice ID;

at least one of the information carried in the last message.

The access node receives the requested prediction information, which can be used to train the AI model which is needed, or to generate reasonable decisions of self optimization, so as to ensure the quality of service and improve the user experience.

The access node can also use another method to obtain data from NWDAF, as shown in operations 1505 to 1510.

Operation 1505: the access node sends a request to collect data to the AMF through message 3. The request message 3 may be a newly defined Ng message.

The message carries at least one of the following information:

UE ID, the UE ID is AMF UE NGAP ID and/or RAN UE NGAP ID;

PDU session ID;

network slice ID;

QoS flow ID;

time length, which can be the start time and end time, or the start time and/or the length of a time period;

area information, which can be one or a group of cell lists, or one or a group of TAC or TAI lists;

type of prediction information requested, including but not limited to at least one of the following information:

uplink and downlink rate of UE, uplink and downlink rate of PDU session, uplink and downlink rate of network slice, uplink and downlink rate of QoS flow, QoE report, location information, state of access node, quality of service information, abnormal event information and QoS duration information;

information of whether to report periodically. If it is a periodic report, it also includes the length of the period;

session management container (SM container), which may include at least one of the above information.

Operation 1506: AMF sends a request to collect data to SMF through message 4. The request message 4 may be Nsmf Service Based Interface, for example, a newly defined Nsmf Service Based interface message.

The message includes, but is not limited to, at least one of the following information:

UE ID, which can be SUPI of the UE, and the SUPI corresponds to the UE ID carried in the last message;

at least one of the information carried in the last message.

Operation 1507: SMF sends Nnwdaf_AnalyticsInfo_Request message to NWDAF, which carries at least one of the following information:

Analysis ID;

Target of Analytics Reporting, which can be SUPI of the UE;

Analysis target period, which can be the same as or derived from the time length carried in message 3;

at least one of the information carried in the last message.

Operation 1508: NWDAF takes the information carried in the received message as an input parameter to generate an output parameter. The output parameter may be the prediction information, which is requested, of the specified UE. The information includes but is not limited to at least one of the following information:

UE ID, which can be the same as Analytics ID in the input parameter;

an information indicating whether the predicted information is periodic;

period information, indicating the length of the period;

start time, indicating the start time of prediction;

time length, indicating the duration of prediction;

traffic characteristics, indicating some restrictions of prediction information, such as IDs of relevant network slices;

Prediction information, which is the prediction information requested in the last message;

reliability of prediction;

Timestamp information.

NWDAF sends Nnwdaf_AnalyticsInfo_Request response message to AMF, which includes the prediction information, which is requested, of the specified UE.

Operation 1509: SMF sends the collected data to AMF through message 5. The request message 5 may be Nsmf Service Based Interface, for example, newly defined Nsmf Service Based interface message, or Namf Service Based Interface message, for example, newly defined Namf Service Based interface message.

The message carries at least one of the following information:

UE ID, which can be SUPI of UE;

PDU session ID;

network slice ID;

QoS flow ID;

time length, which can be the start time and end time, or the start time and/or the length of a time period;

area information, which can be one or a group of cell lists, or one or a group of TAC or TAI lists;

type of prediction information requested, including but not limited to at least one of the following information: uplink and downlink rate of UE, uplink and downlink rate of PDU session, uplink and downlink rate of network slice, uplink and downlink rate of QoS flow, QoE report, location information, state of access node, quality of service information, abnormal event information and QoS duration information;

information of whether to report periodically. If it is a periodic report, it also includes the length of the period;

session management container (SM container), which may include at least one of the above information.

Operation 1510: the AMF sends the collected data to the access node through message 6. The request message 6 may be a newly defined Ng message.

The message carries at least one of the following information:

UE ID, the UE ID is AMF UE NGAP ID and/or RAN UE NGAP ID;

network slice ID;

at least one of the information carried in the last message.

The access node receives the requested prediction information, which can be used to train the AI model which is needed, or to generate reasonable decisions of self optimization, so as to ensure the quality of service and improve the user experience.

Embodiment 14 describes a schematic diagram of one aspect of supporting data processing in a mobile communication network according to an embodiment of the disclosure.

Figure 19:
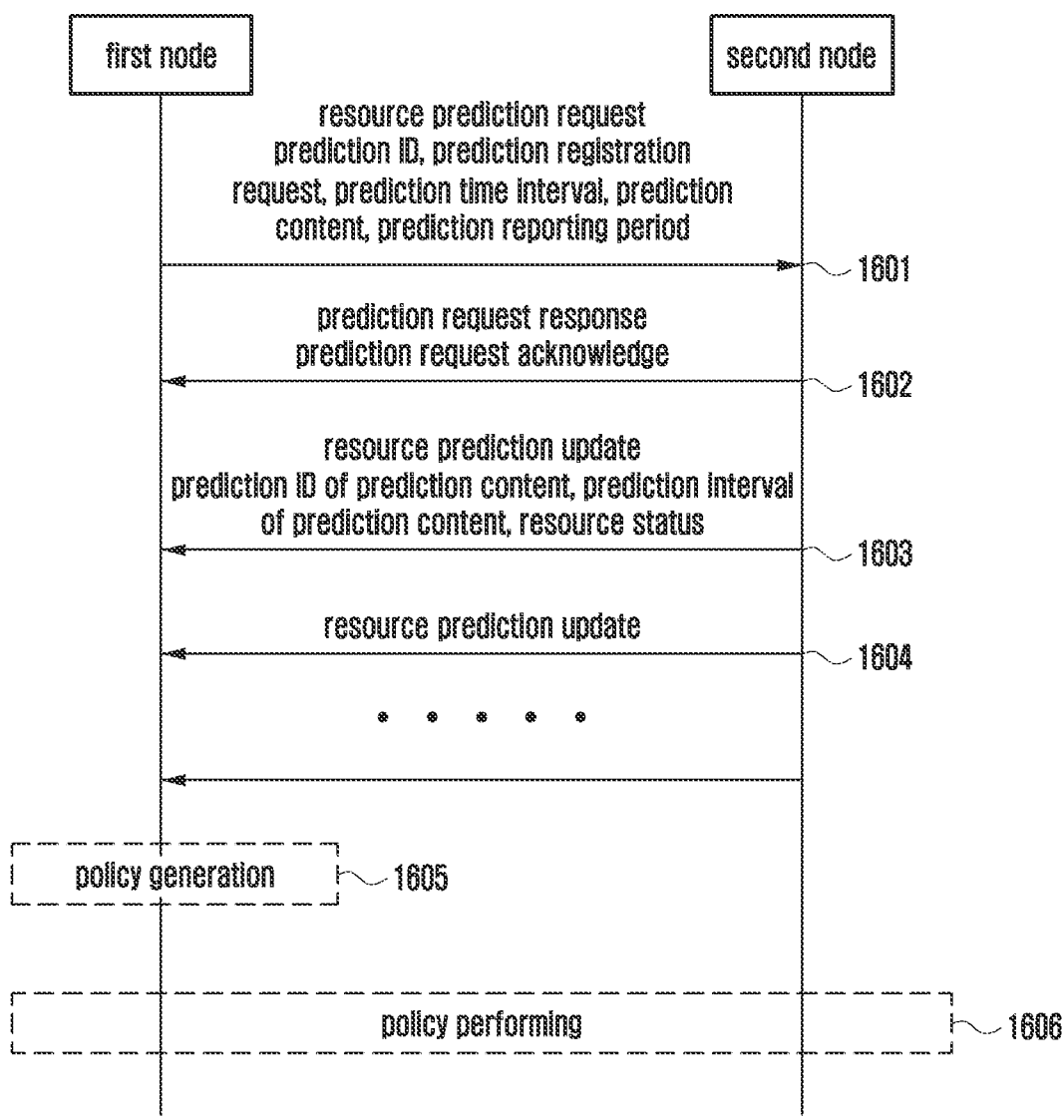
FIG. 19 schematically illustrates embodiment 14 according to an embodiment of the disclosure.

FIG. 19 shows a schematic diagram of one aspect of supporting data processing in a mobile communication network according to an embodiment of the disclosure. Referring to FIG. 19, FIG. 19 shows the exchanging process of resource prediction information between nodes to provide the predicted resource status of nodes in the prediction time period, and provide reference information for energy-saving switch-off, load balancing and handover target node selection, so as to reduce station switch-off/on ping pong, local overload, handover ping pong, etc. In one implementation, for example, the first node may be gNB or gNB CU-CP or en-gNB or eNB or ng-eNB, and the second node may be gNB or gNB CU-CP or en-gNB or eNB or ng-eNB. In another implementation, for example, the first node may be gNB CU and the second node may be gNB DU. In another implementation, the first node can be gNB CU-CP and the second node can be gNB CU-UP.

Referring to FIG. 19, the method comprises the following operations:

Operation 1601: the first node sends a resource prediction request to the second node to notify the second node that the resource prediction information needs to be fed back to the first node. In one implementation, for example, the message may be the aforementioned first message containing the resource prediction request.

Operation 1602: the second node sends a prediction request response to the first node, which is used to feed back the prediction request to inform the first node whether it can do prediction. In one implementation, for example, the message may be the aforementioned second message containing the prediction request response.

If in operation 1602, the second node responds the first node that the second node can predict, proceed to operation 1603 and subsequent operations. If in operation 1602, the second node responds the first node that the second node cannot predict the resource status, operations 1603 and subsequent operations are not performed.

Operation 1603: the second node sends the predicted resource status update to the first node according to the configuration in the resource prediction request, which is used to send the predicted resource status in the second node. In one implementation, for example, the message may be the aforementioned third message containing the predicted resource status update.

If the reporting interval in the resource prediction request in operation 1601 indicates periodic reporting, after operation 1603, the second node will periodically send a third message to report the prediction resource status according to the interval indicated by the reporting interval, such as 1604.

Operation 1605: the first node generates a policy based on the predicted resource status and/or measurement predicted state of itself and the second node. The policy can be, but is not limited to, an energy-saving policy, a load balancing policy, a mobility management policy, etc.

Operation 1606: the first node performs according to the generated policy. The execution may be, but is not limited to, station switch-off, UE handover, etc.

Embodiment 15 describes a schematic diagram of one aspect of supporting data processing in a mobile communication network according to an embodiment of the disclosure.

Figure 20:
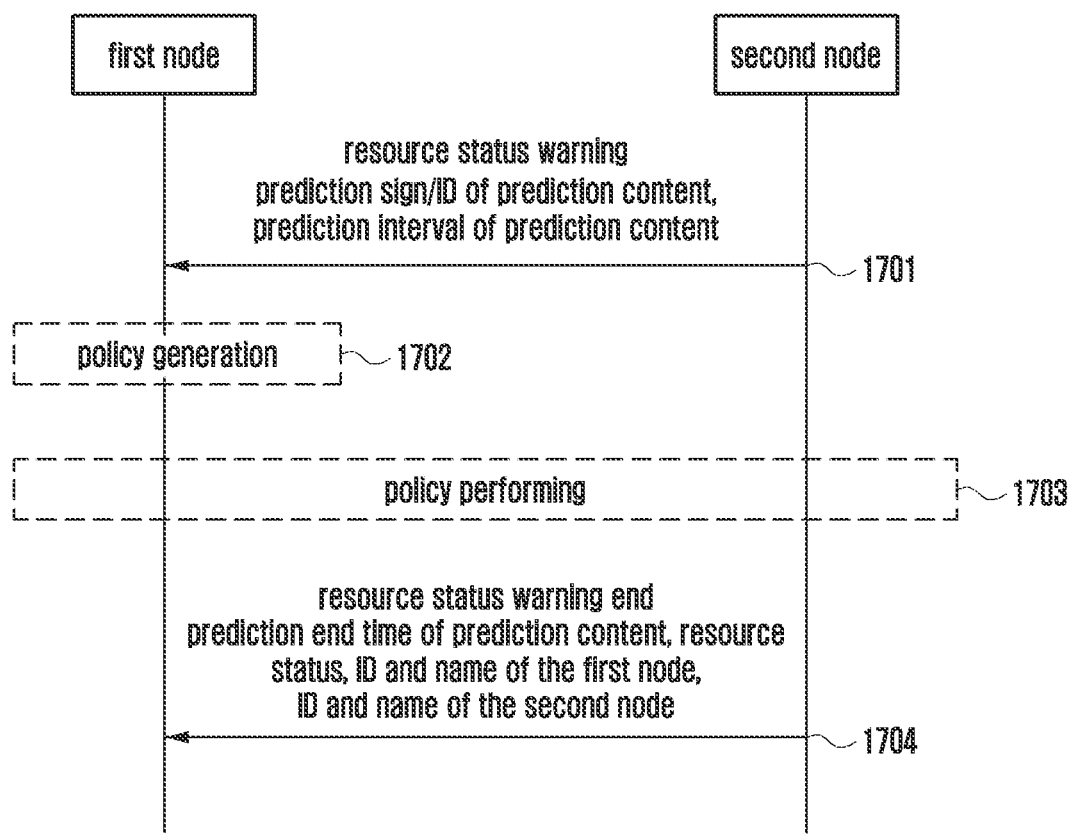
FIG. 20 schematically illustrates embodiment 15 according to an embodiment of the disclosure.

FIG. 20 shows a schematic diagram of one aspect of supporting data processing in a mobile communication network according to an embodiment of the disclosure. Specifically, FIG. 20 shows that a node notifies or warns another node that its predicted resource status is too high or too low, so as to provide reference information to another node for making decisions on energy saving or load balancing or handover. In one implementation, for example, the first node may be gNB or gNB CU-CP or en-gNB or eNB or ng-eNB and the second node may be gNB or gNB CU-CP or en-gNB or eNB or ng-eNB. In another implementation, for example, the first node may be gNB CU and the second node may be gNB DU. In another implementation, the first node can be gNB CU-CP and the second node can be gNB CU-UP.

Operation 1701: the second node sends a predicted resource status warning to the first node to notify the first node that the second node has too many or too few available resources. In one implementation, the message may be the aforementioned third message containing the resource status prediction update. In another implementation, the message may be a fourth message containing the predicted resource warning.

Operation 1702: the first node generates a policy based on the warning resource status and/or predicted resource status and/or measured prediction state of itself and the second node. The strategy can be energy saving policy, load balancing policy, mobility management policy, etc.

Operation 1703: the first node performs according to the generated policy. The execution may be, but is not limited to, station switch-off, UE handover, etc.

If the predicted content prediction end time is not included in the predicted resource warning in operation 1701, operation 1704 needs to inform the first node of the predicted content warning end time.

Operation 1704: the second node sends a prediction content warning end notification to the first node. In one implementation, the message may be the fifth message including the prediction content warning end notification.

Embodiment 16 describes a schematic diagram of one aspect of supporting data processing in a mobile communication network according to an embodiment of the disclosure.

Figure 21:
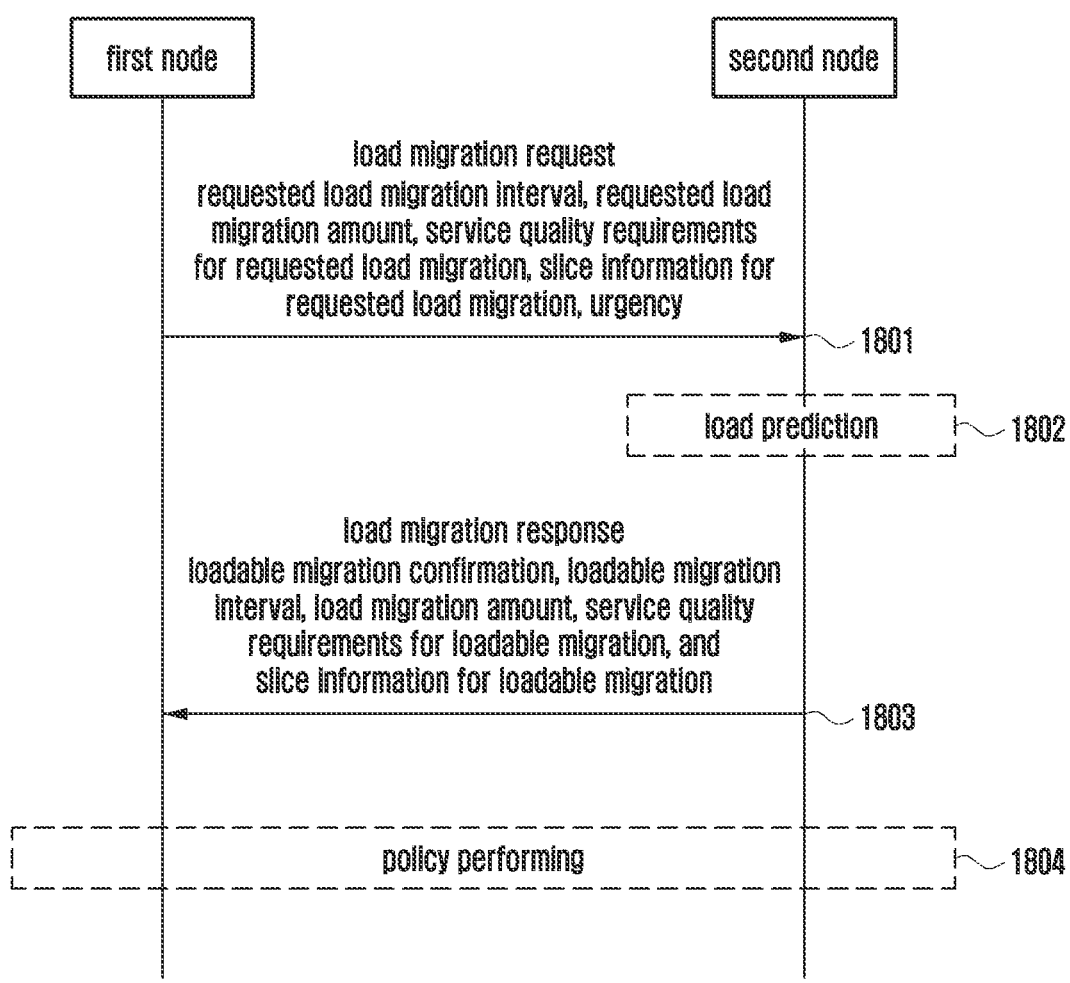
FIG. 21 schematically illustrates embodiment 16 according to an embodiment of the disclosure.

FIG. 21 shows a schematic diagram of one aspect of supporting data processing in a mobile communication network according to an embodiment of the disclosure. Specifically, FIG. 21 shows the process of a node requesting load migration to another node to confirm the migration plan with the neighbor cells in advance to avoid the situation that the load cannot be successfully migrated when the local load increases. In one implementation, for example, the first node may be gNB or gNB CU-CP or en-gNB or eNB or ng-eNB, and the second node may be gNB or gNB CU-CP or en-gNB or eNB or ng-eNB. In another implementation, for example, the first node may be gNB CU and the second node may be gNB DU. In another implementation, the first node can be gNB CU-CP and the second node can be gNB CU-UP.

Operation 1801: the first node sends a load migration request to the second node to request that the load of the first node be migrated to the second node within a certain period of time, so as to avoid overload the first node. In one implementation, the message may be the aforementioned sixth message containing the load migration request.

Operation 1802: the second node performs load prediction based on its own load condition to determine whether it can accept the migrated load at the request time.

Operation 1803: the second node sends a load migration response to the first node according to its own load prediction. In one implementation, the message may be the aforementioned seventh message containing the load migration information.

Operation 1804: load migration is performed between the first node and the second node according to the load migration response.

Embodiment 17 describes a schematic diagram of one aspect of supporting data processing in a mobile communication network according to an embodiment of the disclosure.

Figure 22:
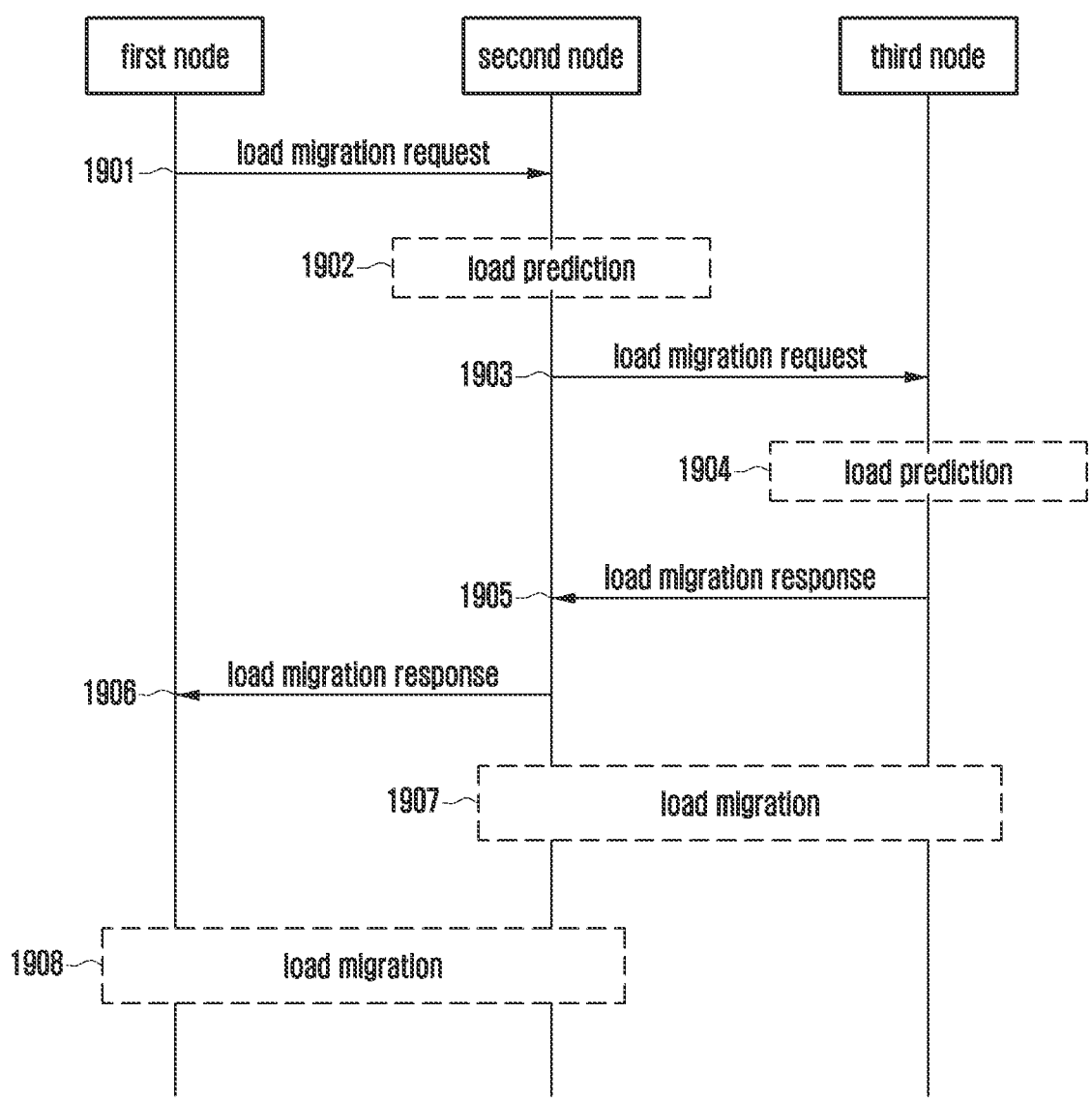
FIG. 22 schematically illustrates embodiment 17 according to an embodiment of the disclosure.

FIG. 22 shows a schematic diagram of one aspect of supporting data processing in a mobile communication network according to an embodiment of the disclosure. Specifically, FIG. 22 shows a process in which a first node requests load migration to the second node, and the load of the second node is close to saturation, so the second node transfers the load to the third node so that the load of the first node can be received. In one implementation, for example, the first node may be gNB or GNB Cu CP or en GNB or eNB or ng-eNB, the second node may be gNB or gNB CU-CP or en-gNB or eNB or ng-eNB, and the third node may be gNB or gNB CU-CP or en-gNB or eNB or ng-eNB.

Operation 1901: the first node sends a load migration request to the second node to request that the load of the first node be migrated to the second node within a certain period of time so as to avoid the load overload of the first node. In one implementation, the message may be the aforementioned sixth message containing the load migration request.

Operation 1902: the second node performs load prediction based on its own load. Based on the load prediction, the second node cannot accept the load of the first node at the requested migration time. Due to the high level of urgency in the load migration request of the first node, the second node seeks the neighbor cells for load migration, so that the load of the first node can be accepted.

Operation 1903: the second node sends a load migration request to the third node. In one implementation, the message may be the aforementioned sixth message containing the load migration request.

Operation 1904: the third node performs load prediction based on its own load condition, so as to determine whether it can accept the load migration request of the second node.

Operation 1905: the third node sends a load migration response to the second node to inform that the third node can accept the load migration of the second node. In one implementation, the message may be the aforementioned seventh message containing the load migration information.

Operation 1906: the second node sends a load migration request response to the first node to inform that the second node can accept the load migration of the first node. In one implementation, the message may be the aforementioned seventh message containing the load migration information.

Operation 1907: the second node migrates the load to the third node.

Operation 1908: the first node migrates the load to the second node.

Operation 1907 may precede operation 1906.

Embodiment 18 describes a schematic diagram of one aspect of supporting data processing in a mobile communication network according to an embodiment of the disclosure.

Figure 23:
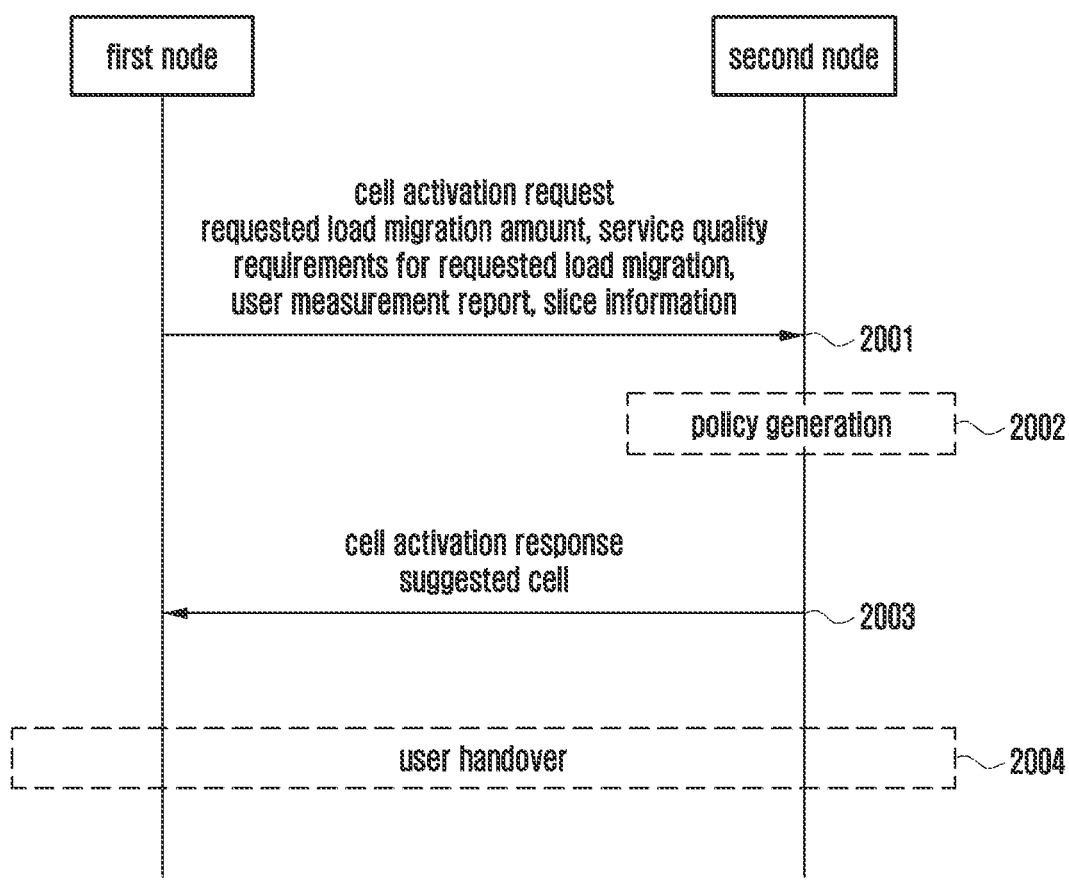
FIG. 23 schematically illustrates embodiment 18 according to an embodiment of the disclosure.

FIG. 23 shows a schematic diagram of one aspect of supporting data processing in a mobile communication network according to an embodiment of the disclosure. Specifically, FIG. 23 shows the process of a node requesting cell activation to another node. The node sends relevant information of UEs that need to be migrated to the other node, and the other node plans according to the collected information and its own information to determine whether to activate the requested cell and find out whether there is a replacement cell. In one implementation, for example, the first node may be gNB or gNB CU-CP or en-gNB or eNB or ng-eNB, and the second node may be gNB or gNB CU-CP oren-gNB or eNB or ng-eNB.

Operation 2001: the first node sends a cell activation request to the second node to request the second node to activate some switched-off cells. In one implementation, the message may be the aforementioned eighth message containing the cell activation request.

Operation 2002: the second node does the planning and/or prediction based on its own cell situation and historical information.

Operation 2003: the second node feeds back the cell activation response to the first node to notify the cell activation. In one implementation, the message may be the ninth message including the cell activation response.

Operation 2004: the first node performs UE handover to the activated cell or recommended cell in the second node.

The disclosure also discloses an electronic device. The electronic device includes: a memory configured to store a computer program; and a processor configured to read the computer program from the memory, run the computer program, and implement the above method.

The term "module" may indicate a unit including one of hardware, software, firmware, or a combination thereof. The term "module" can be used interchangeably with the terms "unit", "logic", "logic block", "component" and "circuit". The term "module" may indicate the smallest unit or part of an integrated component. The term "module" may indicate the smallest unit or part that performs one or more functions. The term "module" refers to a device that can be implemented mechanically or electronically. For example, the term "module" may indicate a device including at least one of an application specific integrated circuit (ASIC), a field programmable gate array (FPGA), or a programmable logic array (PLA) that performs certain operations, which operations are known or will be developed in the future.

According to an embodiment of the disclosure, at least a part of a device (for example, a module or its function) or a method (for example, an operation) may be implemented as instructions stored in a non-transitory computer-readable storage medium, for example, in the form of a programming circuit. When run by a processor, instructions can enable the processor to perform corresponding functions. The non-transitory computer-readable storage medium may be, for example, a memory.

Non-transitory computer-readable storage media may include hardware devices such as hard disks, floppy disks, and magnetic tapes (for example, magnetic tapes), optical media such as compact disk read-only memory (ROM) (CD-ROM) and digital versatile disk (DVD), such as magneto-optical media of optical discs, ROM, random access memory (RAM), flash memory, etc. Examples of program commands may include not only machine language codes, but also high-level language codes that can be executed by various computing devices using an interpreter. The aforementioned hardware devices may be configured to operate as one or more software modules to perform the embodiments of the disclosure, and vice versa.

The circuit or programming circuit according to various embodiments of the disclosure may include at least one or more of the aforementioned components, omit some of them, or further include other additional components. Operations performed by circuits, programming circuits, or other components according to various embodiments of the disclosure may be performed sequentially, simultaneously, repeatedly, or heuristically. In addition, some operations may be performed in a different order, or omitted, or include other additional operations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first node in a wireless communication system, the method comprising:
   transmitting, to a second node, a first message to request reporting of one or more information;
   receiving, from the second node, a second message indicating whether the second node is able to report all or part of the one or more information; and
   receiving, from the second node, a third message comprising at least one information accepted by the second node,
   wherein the one or more information comprises information on predicted resource status, and
   wherein the information on the predicted resource status comprises at least one of radio resource status information, a number of active user equipment (UE), or radio resource control (RRC) connection information.

2. The method of claim 1,
   wherein the first message comprises at least one of information indicating whether the second node start or stop reporting of the one or more information, or information indicating the one or more information requested to report, or
   wherein the first message comprises at least one of information indicating a periodicity associated with reporting of the one or more information, or information indicating a specific point in time associated with a prediction.

3. The method of claim 1,
wherein the one or more information comprises at least one of information on a UE, or information on energy consumption, and
wherein the information on the UE comprises at least one of uplink and downlink rate information, packet delay information, or packet loss information.

4. The method of claim 1,
wherein the second message comprises at least one of information indicating at least one information that cannot be reported among the one or more information, or cause information indicating a reason why cannot be reported.

5. The method of claim 1,
wherein the at least one information accepted by the second node comprises at least one of the information on the predicted resource status, information on a UE, or information on energy consumption,
wherein the information on the predicted resource status comprises at least one of the radio resource status information, the number of the active UE, or the RRC connection information, and
wherein the information on the UE comprises at least one of uplink and downlink rate information, packet delay information, or packet loss information.

6. A method performed by a second node in a wireless communication system, the method comprising:
receiving, from a first node, a first message to request reporting of one or more information;
transmitting, to the first node, a second message indicating whether the second node is able to report all or part of the one or more information; and
transmitting, to the first node, a third message comprising at least one information accepted by the second node,
wherein the one or more information comprises information on predicted resource status, and
wherein the information on the predicted resource status comprises at least one of radio resource status information, a number of active user equipment (UE), or radio resource control (RRC) connection information.

7. The method of claim 6,
wherein the first message comprises at least one of information indicating whether the second node start or stop reporting of the one or more information, or information indicating the one or more information requested to report, or
wherein the first message comprises at least one of information indicating a periodicity associated with reporting of the one or more information, or information indicating a specific point in time associated with a prediction.

8. The method of claim 6,
wherein the one or more information comprises at least one of information on a UE, or information on energy consumption, and
wherein the information on the UE comprises at least one of uplink and downlink rate information, packet delay information, or packet loss information.

9. The method of claim 6,
wherein the second message comprises at least one of information indicating at least one information that cannot be reported among the one or more information, or cause information indicating a reason why cannot be reported.

10. The method of claim 6,
wherein the at least one information accepted by the second node comprises at least one of the information on the predicted resource status, information on a UE, or information on energy consumption,
wherein the information on the predicted resource status comprises at least one of the radio resource status information, the number of the active UE, or the RRC connection information, and
wherein the information on the UE comprises at least one of uplink and downlink rate information, packet delay information, or packet loss information.

11. A first node in a wireless communication system, the first node comprising:
a transceiver; and
at least one processor coupled with the transceiver and configured to:
transmit, to a second node, a first message to request reporting of one or more information,
receive, from the second node, a second message indicating whether the second node is able to report all or part of the one or more information, and
receive, from the second node, a third message comprising at least one information accepted by the second node,
wherein the one or more information comprises information on predicted resource status, and
wherein the information on the predicted resource status comprises at least one of radio resource status information, a number of active user equipment (UE), or radio resource control (RRC) connection information.

12. The first node of claim 11,
wherein the first message comprises at least one of information indicating whether the second node start or stop reporting of the one or more information, or information indicating the one or more information requested to report, or
wherein the first message comprises at least one of information indicating a periodicity associated with reporting of the one or more information, or information indicating a specific point in time associated with a prediction.

13. The first node of claim 11,
wherein the one or more information comprises at least one of information on a UE, or information on energy consumption, and
wherein the information on the UE comprises at least one of uplink and downlink rate information, packet delay information, or packet loss information.

14. The first node of claim 11,
wherein the second message comprises at least one of information indicating at least one information that cannot be reported among the one or more information, or cause information indicating a reason why cannot be reported.

15. The first node of claim 11,
wherein the at least one information accepted by the second node comprises at least one of the information on the predicted resource status, information on a UE, or information on energy consumption,
wherein the information on the predicted resource status comprises at least one of the radio resource status information, the number of the active UE, or the RRC connection information, and
wherein the information on the UE comprises at least one of uplink and downlink rate information, packet delay information, or packet loss information.

16. A second node in a wireless communication system, the second node comprising:
- a transceiver; and
- at least one processor coupled with the transceiver and configured to:
  - receive, from a first node, a first message to request reporting of one or more information,
  - transmit, to the first node, a second message indicating whether the second node is able to report all or part of the one or more information, and
  - transmit, to the first node, a third message comprising at least one information accepted by the second node,
- wherein the one or more information comprises information on predicted resource status, and
- wherein the information on the predicted resource status comprises at least one of radio resource status information, a number of active user equipment (UE), or radio resource control (RRC) connection information.

17. The second node of claim 16,
- wherein the first message comprises at least one of information indicating whether the second node start or stop reporting of the one or more information, or information indicating the one or more information requested to report, or
- wherein the first message comprises at least one of information indicating a periodicity associated with reporting of the one or more information, or information indicating a specific point in time associated with a prediction.

18. The second node of claim 16,
- wherein the one or more information comprises at least one of information on a UE, or information on energy consumption, and
- wherein the information on the UE comprises at least one of uplink and downlink rate information, packet delay information, or packet loss information.

19. The second node of claim 16, wherein the second message comprises at least one of information indicating at least one information that cannot be reported among the one or more information, or cause information indicating a reason why cannot be reported.

20. The second node of claim 16,
- wherein the at least one information accepted by the second node comprises at least one of the information on the predicted resource status, information on a UE, or information on energy consumption,
- wherein the information on the predicted resource status comprises at least one of the radio resource status information, the number of the active UE, or the RRC connection information,
- wherein the information on the UE comprises at least one of uplink and downlink rate information, packet delay information, or packet loss information.

* * * * *